(12) United States Patent
Saiwai et al.

(10) Patent No.: US 10,390,256 B2
(45) Date of Patent: Aug. 20, 2019

(54) BASE STATION AND RADIO TERMINAL

(71) Applicant: KYOCERA CORPORATION, Kyoto (JP)

(72) Inventors: Takahiro Saiwai, Yokohama (JP); Hiroyuki Adachi, Kawasaki (JP); Noriyoshi Fukuta, Inagi (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/812,804

(22) Filed: Nov. 14, 2017

(65) Prior Publication Data
US 2018/0070264 A1    Mar. 8, 2018

Related U.S. Application Data

(63) Continuation of application No. PCT/JP2016/064398, filed on May 13, 2016.
(Continued)

(30) Foreign Application Priority Data

May 25, 2015  (JP) .................................. 2015-105881
Jul. 29, 2015  (JP) .................................. 2015-150081
(Continued)

(51) Int. Cl.
| H04W 28/02 | (2009.01) |
| H04W 72/04 | (2009.01) |
| H04W 92/18 | (2009.01) |
| H04W 76/14 | (2018.01) |
| H04W 72/12 | (2009.01) |
| H04W 88/04 | (2009.01) |

(52) U.S. Cl.
CPC ....... H04W 28/0278 (2013.01); H04W 72/04 (2013.01); H04W 72/042 (2013.01);
(Continued)

(58) Field of Classification Search
CPC . H04W 72/04; H04W 72/121; H04W 72/023; H04W 72/042; H04W 28/0278; H04W 72/03
See application file for complete search history.

(56) References Cited

U.S. PATENT DOCUMENTS

| 2009/0113086 A1* | 4/2009 | Wu .................... H04W 72/1284 710/56 |
| 2010/0232387 A1* | 9/2010 | Marchand ......... H04W 72/1284 370/329 |
| 2017/0127471 A1* | 5/2017 | Yu .......................... H04W 76/30 |

OTHER PUBLICATIONS

"Clarificaion on SCI transmission in ProSe", 3GPP TSG-RAN WG2 Meeting #89; R2-150378; Athens, Greece, Feb. 9-13, 2015; 3pp.
(Continued)

*Primary Examiner* — Anez C Ebrahim
(74) *Attorney, Agent, or Firm* — Studebaker & Brackett PC

(57) ABSTRACT

A communication method according to an embodiment, comprising: transmitting, from a base station to a radio terminal, a list indicating association between an identification of a logical channel group and a priority; generating, by the radio terminal, a buffer status report for direct communication; and transmitting, from the radio terminal to the base station, the buffer status report. The buffer status report includes an index of an destination identifier, an identifier of the logical channel group, and a buffer amount associated with the identifier of the logical channel group. In the generating the buffer status report, the radio terminal generates the buffer status report based on the list.

6 Claims, 61 Drawing Sheets

Related U.S. Application Data

(60) Provisional application No. 62/162,256, filed on May 15, 2015.

(30) Foreign Application Priority Data

Jul. 29, 2015 (JP) ................................. 2015-150171
Jul. 29, 2015 (JP) ................................. 2015-150172

(52) U.S. Cl.
CPC ...... *H04W 72/121* (2013.01); *H04W 72/1242* (2013.01); *H04W 72/1284* (2013.01); *H04W 76/14* (2018.02); *H04W 88/04* (2013.01); *H04W 92/18* (2013.01)

(56) References Cited

OTHER PUBLICATIONS

An Office Action issued by the Japanese Patent Office dated Mar. 20, 2018, which corresponds to Japanese Patent Application No. 2018-026915 and is related to U.S. Appl. No. 15/812,804; with English language concise explanation.

InterDigital Communications, "Group Priorities for ProSe Communications", 3GPP TSG-RAN WG2 #90, Tdoc R2-152679, Fukuoka, Japan, May 25-29, 2015, 6 pages.

International Search Report issued in PCT/JP2016/064398; dated Jul. 26, 2016.

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V12.5.0; Mar. 2015; pp. 1-251; Release 12; 3GPP Organizational Partners.

Qualcomm Incorporated; "eNB Resource Allocation for D2D Broadcast Communication"; 3GPP TSG-RAN WG2 #85 Bis; R2-141685; Mar. 31-Apr. 4, 2014; pp. 1-3; Valencia, Spain.

LG Electronics Inc.; "Discussion on Buffer Status Reporting Procedure"; 3GPP TSG-RAN WG2 #61; R2-081084; Feb. 11-15, 2008; pp. 1-6; Sorrento, Italy.

Samsung; "Priority Handling for D2D Communication"; 3GPP TSG RAN WG1 Meeting #80bis; R1-151615; Apr. 20-24, 2015; pp. 1-3; Belgrade, Serbia.

* cited by examiner

FIG. 11

| FIELD NAME | BIT SIZE | | | | | |
|---|---|---|---|---|---|---|
| | 6RB | 15RB | 25RB | 50RB | 75RB | 100RB |
| RESOURCE FOR PSCCH | 6 | | | | | |
| TPC COMMAND FOR PSCCH & PSSCH | 1 | | | | | |
| FREQUENCY HOPPING FLAG | 1 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |

FIG. 13

| FIELD NAME | BIT SIZE | | | | | |
|---|---|---|---|---|---|---|
| | 6RB | 15RB | 25RB | 50RB | 75RB | 100RB |
| NUMBER OF ASSIGNMENTS | 3 | | | | | |
| TPC COMMAND FOR PSCCH & PSSCH | 1 | | | | | |
| RESOURCE FOR PSCCH | 6 | | | | | |
| FREQUENCY HOPPING FLAG | 1 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |
| RESOURCE FOR PSCCH | 6 | | | | | |
| FREQUENCY HOPPING FLAG | 1 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |
| RESOURCE FOR PSCCH | 6 | | | | | |
| FREQUENCY HOPPING FLAG | 1 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |
| PADDING | N | | | | | |

FIG. 17

| FIELD NAME | BIT SIZE | | | | | |
|---|---|---|---|---|---|---|
| | 6RB | 15RB | 25RB | 50RB | 75RB | 100RB |
| TIME ADVANCE INDICATION | 6 | | | | | |
| NUMBER OF DESTINATIONS | 4 | | | | | |
| FREQUENCY HOPPING FLAG | 1 | | | | | |
| RESOURCE BLOCK ASSIGNMENT & HOPPING RESOURCE ALLOCATION | 5 | 7 | 9 | 11 | 12 | 13 |
| TIME RESOURCE PATTERN | 7 | | | | | |
| MODULATION & CODING SCHEME | 5 | | | | | |
| GROUP DESTINATION ID | 8 | | | | | |
| FREQUENCY HOPPING FLAG | 1 | | | | | |
| RESOURCE BLOCK ASSIGNMENT & HOPPING RESOURCE ALLOCATION | 5 | 7 | 9 | 11 | 12 | 13 |
| TIME RESOURCE PATTERN | 7 | | | | | |
| MODULATION & CODING SCHEME | 5 | | | | | |
| GROUP DESTINATION ID | 8 | | | | | |
| FREQUENCY HOPPING FLAG | 1 | | | | | |
| RESOURCE BLOCK ASSIGNMENT & HOPPING RESOURCE ALLOCATION | 5 | 7 | 9 | 11 | 12 | 13 |
| TIME RESOURCE PATTERN | 7 | | | | | |
| MODULATION & CODING SCHEME | 5 | | | | | |
| GROUP DESTINATION ID | 8 | | | | | |
| PADDING | N | | | | | |

FIG. 18

| FIELD NAME | BIT SIZE | | | | | |
|---|---|---|---|---|---|---|
| | 6RB | 15RB | 25RB | 50RB | 75RB | 100RB |
| NUMBER OF ASSIGNMENTS | 3 | | | | | |
| RESOURCE FOR PSCCH | 6 | | | | | |
| TPC COMMAND FOR PSCCH & PSSCH | 1 | | | | | |
| FREQUENCY HOPPING FLAG | 1 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |
| RESOURCE BLOCK ASSIGNMENT & HOPPING RESOURCE ALLOCATION | 5 | 7 | 8 | 11 | 12 | 13 |
| TIME RESOURCE PATTERN | 7 | | | | | |
| RESOURCE POOL INDEX | 4 | | | | | |
| PADDING | N | | | | | |

FIG. 20

| FIELD NAME | BIT SIZE ||||||
|---|---|---|---|---|---|---|
| | 6RB | 15RB | 25RB | 50RB | 75RB | 100RB |
| FREQUENCY HOPPING FLAG | 1 ||||||
| RESOURCE BLOCK ASSIGNMENT & HOPPING RESOURCE ALLOCATION | 5 | 7 | 9 | 11 | 12 | 13 |
| TIME RESOURCE PATTERN | 7 ||||||
| MODULATION & CODING SCHEME | 5 ||||||
| TIME ADVANCE INDICATION | 6 ||||||
| NUMBER OF DESTINATIONS | 4 ||||||
| GROUP DESTINATION ID | 8 ||||||
| GROUP DESTINATION ID | 8 ||||||
| GROUP DESTINATION ID | 8 ||||||
| GROUP DESTINATION ID | 8 ||||||
| PADDING | N ||||||

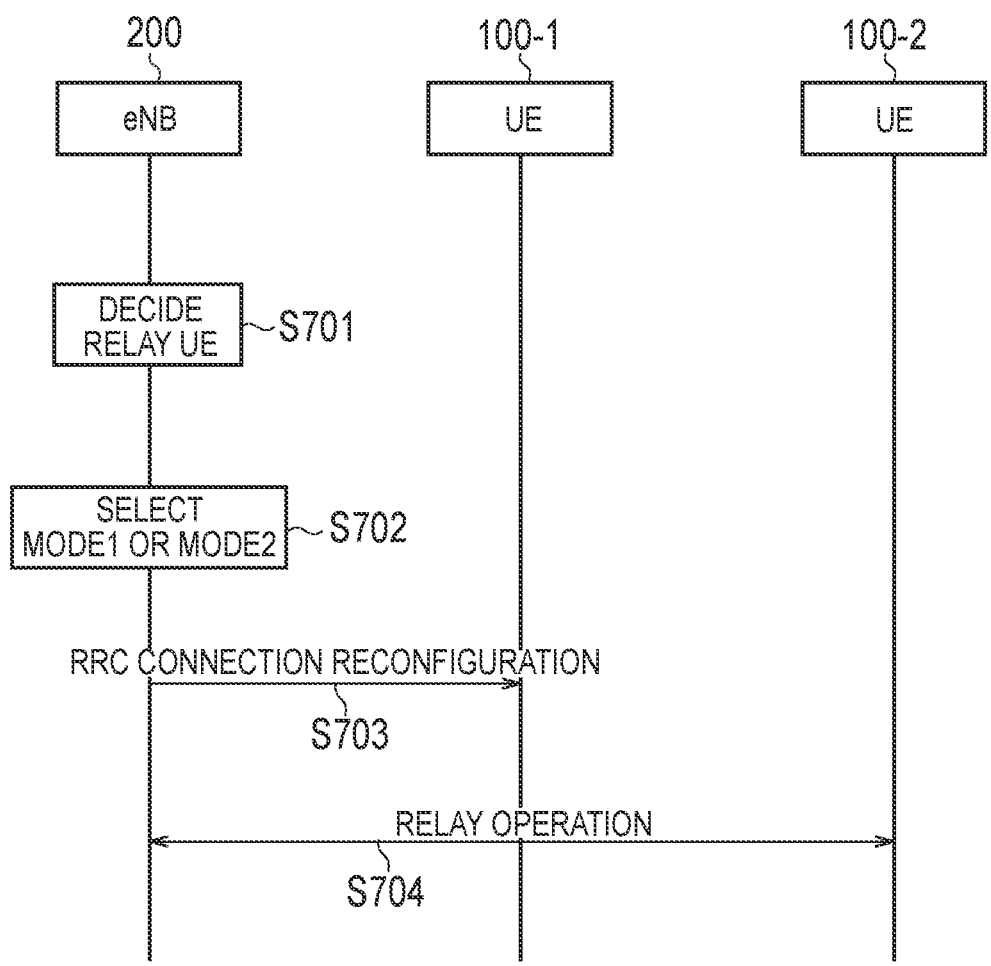

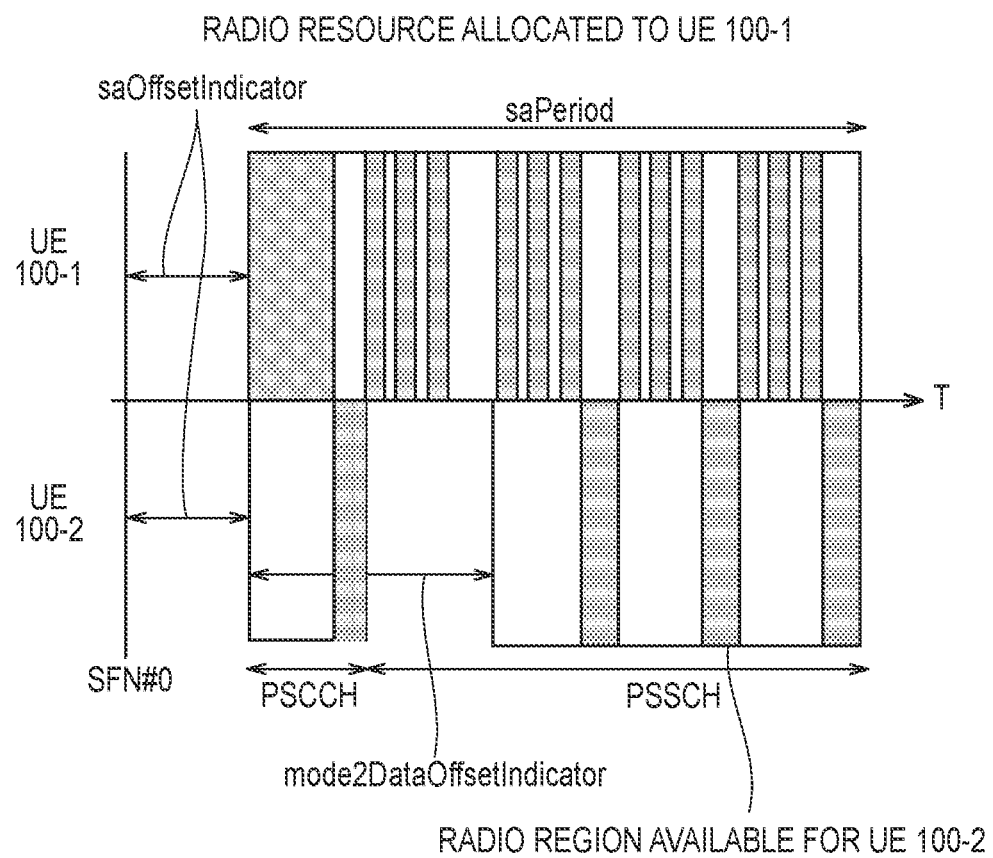

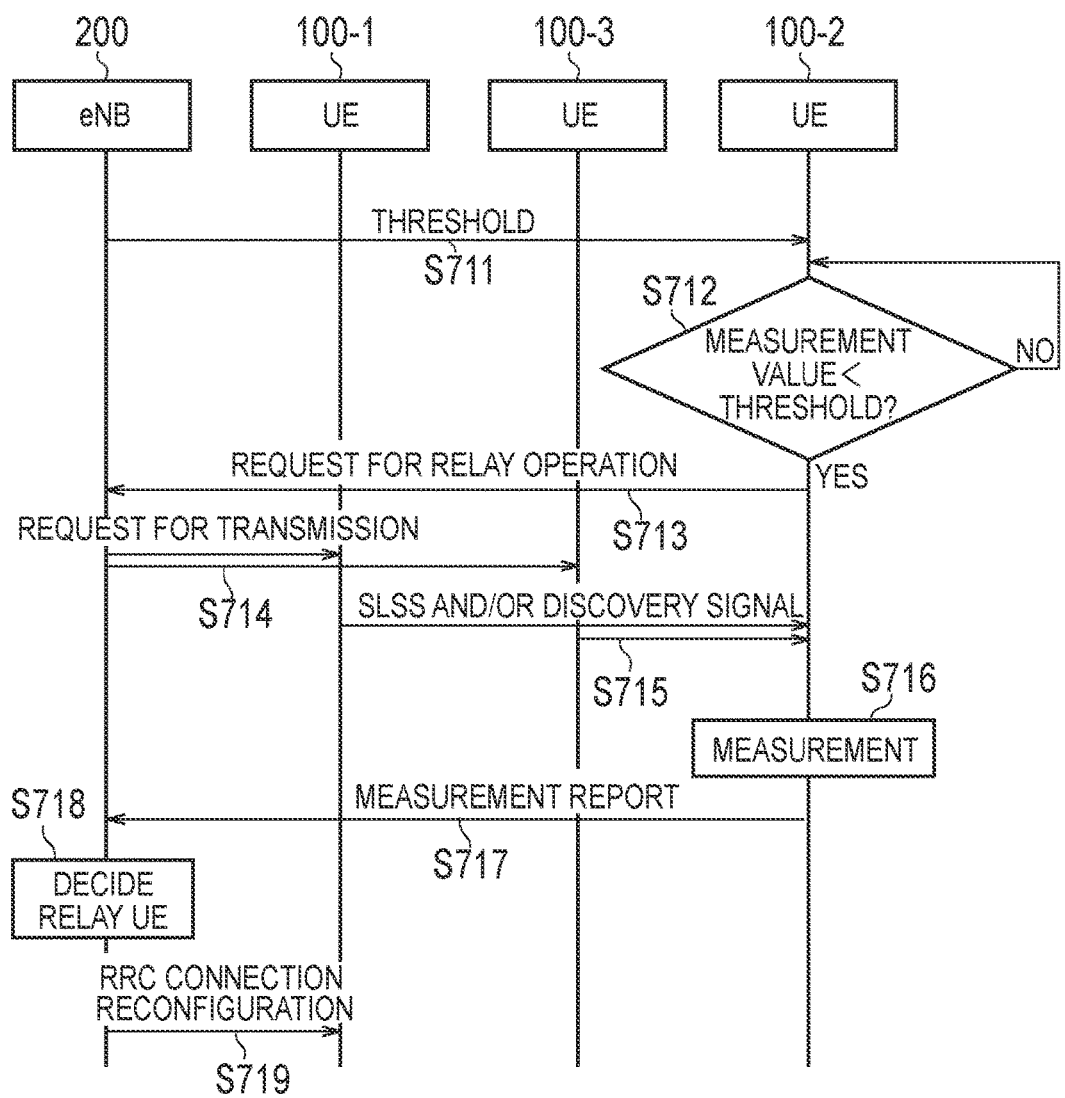

FIG. 56

| FIELDS NAMES | CONTENTS |
|---|---|
| FREQUENCY HOPPING FLAG | 0: NO FREQUENCY HOPPING<br>1: THERE IS FREQUENCY HOPPING |
| RESOURCE BLOCK ASSIGNMENT AND HOPPING RESOURCE ALLOCATION | RESOURCE ALLOCATION INFORMATION IN FREQUENCY DIRECTION |
| TIME RESOURCE PATTERN | SUBFRAME ASSIGNMENT PATTERN INFORMATION IN TIME DIRECTION |
| MODULATION AND CODING SCHEME | MCS |
| TIMING ADVANCE INDICATION | CORRECTION VALUE FOR TRANSMISSION TIMING |
| GROUP DESTINATION ID | TRANSMISSION TARGET ID |
| periodIndicatorField | PARAMETER FOR SPECIFYING SC-PERIOD |

FIG. 57

```
SL-CommTxPoolList-r12 ::=      SEQUENCE (SIZE (1..maxSL-TxPool-r12)) OF SL-CommResourcePool-r12
SL-CommRxPoolList-r12 ::=      SEQUENCE (SIZE (1..maxSL-RxPool-r12)) OF SL-CommResourcePool-r12
SL-CommResourcePool-r12 ::=    SEQUENCE {
    sc-CP-Len-r12                  SL-CP-Len-r12,
    sc-Period-r12                  SL-PeriodComm-r12,
    sc-TF-ResourceConfig-r12       SL-TF-ResourceConfig-r12,
    data-CP-Len-r12                SL-CP-Len-r12,
    dataHoppingConfig-r12          SL-HoppingConfigComm-r12,
    ue-SelectedResourceConfig-r12     SEQUENCE {
        data-TF-ResourceConfig-r12       SL-TF-ResourceConfig-r12,
        trpt-Subset-r12                  SL-TRPT-Subset-r12    OPTIONAL-- Need OP
    }                                                          OPTIONAL,   -- Need OR
    rxParametersNCell-r12          SEQUENCE {
        tdd-Config-r12                 TDD-Config               OPTIONAL,   -- Need OP
        syncConfigIndex-r12            INTEGER (0..15)
    }                                                          OPTIONAL,   -- Need OR
    txParameters-r12               SEQUENCE {
        sc-TxParameters-r12            SL-TxParameters-r12,
        dataTxParameters-r12           SL-TxParameters-r12
    }                                                          OPTIONAL,   -- Cond Tx
    numMulpleSCIs                  INTEGER (0..3)
    ...
}
SL-TRPT-Subset-r12 ::=         BIT STRING (SIZE (3..5))
```

| SL-CommResourcePool field descriptions |
|---|
| sc-Period |
| Indicates the period over which resources allocated in a cell for SC, scheduled and UE selected data transmissions occur, see TS 36.213 [23]. Value in number of subframes. Value sf40 corresponds to 40 subframes, sf80 corresponds to 80 subframes and so on. E-UTRAN configures values sf40, sf80, sf160 and sf320 for FDD and for TDD config 1 to 5, values sf70, sf140 and sf280 for TDD config 0, and finally values sf60, sf120 and sf240 for TDD config 6. |
| syncConfigIndex |
| Indicates the synchronisation configuration that is associated with a reception pool, by means of an index to the corresponding entry of commSyncConfig in SystemInformationBlockType18. |
| tdd-Config |
| TDD configuration associated with the reception pool of the cell indicated by syncConfigIndex the same duplex mode as the cell providing this field and the same UL/DL configuration as indicated by subframeAssignment in SystemInformationBlockType1 in case of TDD. |
| trpt-Subset |
| Indicates the subset of T-RPT available (see TS 36.213 [23, 14.1.1.1.1]). Consists of a bitmap which is used to indicate the set of available 'k' values to be used for sidelink direct communication (see TS 36.213 [23, 14.1.1.3]). If T-RPT subset configuration is not signaled/ preconfigured then UE assumes the whole T-RPT set is available. |
| numMulpleSCIs |
| no. of SCI performing transmission by continuous PRB in frequency direction |

BASE STATION AND RADIO TERMINAL

RELATED APPLICATIONS

This application is a continuation application of international application PCT/JP2016/064398, filed May 13, 2016, which claims benefit of U.S. Provisional Application No. 62/162,256, filed on May 15, 2015, Japanese Patent Application No. 2015-105881, filed on May 25, 2015, Japanese Patent Application No. 2015-150081, filed on Jul. 29, 2015, Japanese Patent Application No. 2015-150171, filed on Jul. 29, 2015, and Japanese Patent Application No. 2015-150172, filed on Jul. 29, 2015, the entirety of all applications hereby expressly incorporated by reference.

TECHNICAL FIELD

The present application relates to a base station and a radio terminal used in a communication system.

BACKGROUND ART

In 3GPP (3rd Generation Partnership Project), which is a project aiming to standardize a mobile communication system, the formulation of specifications of a Device to Device Proximity Service (D2D ProSe) is being carried out.

Direct Communication is stipulated as one of the D2D ProSe.

Direct Communication includes a first mode (Mode 1) in which a base station or a relay node allocates a radio resource, and a second mode (Mode 2) in which a user terminal itself selects a radio resource from a radio resource pool.

SUMMARY

A communication method according to an embodiment, comprising: transmitting, from a base station to a radio terminal, a list indicating association between an identification of a logical channel group and a priority; generating, by the radio terminal, a buffer status report for direct communication; and transmitting, from the radio terminal to the base station, the buffer status report. The buffer status report includes an index of an destination identifier, an identifier of the logical channel group, and a buffer amount associated with the identifier of the logical channel group. In the generating the buffer status report, the radio terminal generates the buffer status report based on the list.

A radio terminal according to an embodiment, comprising: a receiver configured to receive, from a base station, a list indicating association between an identification of a logical channel group and a priority; a controller configured to generate a buffer status report for direct communication; and a transmitter configured to transmit the buffer status report to the base station. The buffer status report includes an index of an destination identifier, an identifier of the logical channel group, and a buffer amount associated with the identifier of the logical channel group. The controller is configured to generate the buffer status report based on the list.

A processor is a processor for controlling a radio terminal. The processor comprises: a memory communicatively coupled to the processor and including instructions, such that when executed by the processor execute the processes of: receiving, from a base station, a list indicating association between an identification of a logical channel group and a priority; generating a buffer status report for direct communication; and transmitting the buffer status report to the base station. The buffer status report includes an index of an destination identifier, an identifier of the logical channel group, and a buffer amount associated with the identifier of the logical channel group. The processor is configured to execute the process of generating the buffer status report based on the list.

A base station according to an embodiment comprises: a transmitter configured to transmit, to a radio terminal, a list indicating association between an identification of a logical channel group and a priority; and a receiver configured to receive, from the radio terminal, a buffer status report for direct communication generated based on the list. The buffer status report includes an index of a destination identifier, an identifier of the logical channel group, and a buffer amount associated with the identifier of the logical channel group.

BRIEF DESCRIPTION OF THE DRAWINGS

FIG. 11 is a diagram of an example of an extended DCI format for describing the operation (part 2) according to the first embodiment.

FIG. 13 is a diagram of an example of an extended DCI format for describing the operation (part 3) according to the first embodiment.

FIG. 17 is a diagram of an example of an extended SCI format for describing an operation (part 1) according to a second embodiment.

FIG. 18 is a diagram of an example of an extended DCI format for describing the operation (part 1) according to the second embodiment.

FIG. 20 is a diagram of an example of an extended SCI format for describing an operation (part 4) according to the second embodiment.

FIG. 28 is a diagram showing a sequence according to the fourth embodiment.

FIG. 29 is a diagram showing an example of allocation of a resource according to the fourth embodiment.

FIG. 34 is a diagram showing an example of a sequence according to the sixth embodiment.

FIG. 56 is a diagram for describing an operation according to other embodiments.

FIG. 57 is a diagram for describing an operation according to other embodiments.

DESCRIPTION OF THE EMBODIMENT

Overview of Embodiment

Figure 1:
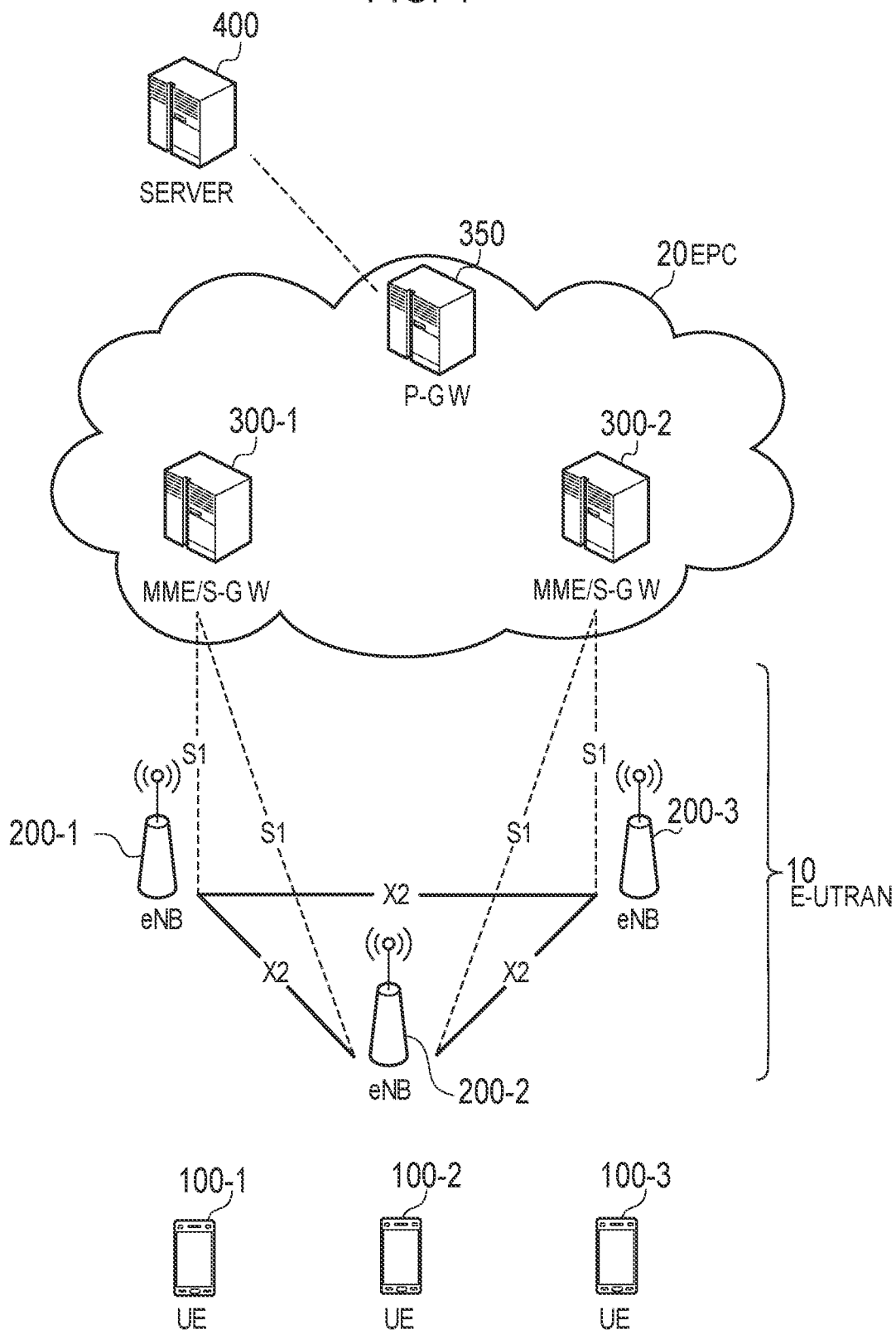
FIG. 1 is a diagram showing a configuration of an LTE system.

A radio terminal according to an embodiment may comprise: a receiver configured to receive, from a base station, a plurality of control information including information about a radio resource used in a proximity service; and a controller configured to determine, on a basis of a notification timing of the plurality of control information, whether or not the information about the radio resource included in each of the plurality of control information are simultaneously available.

A radio terminal according to an embodiment may comprise: a transmitter configured to transmit, to the base station, a buffer status report for reporting a buffer amount of transmission data in a proximity service; and a controller configured to generate the buffer status report on a basis of a priority of a logical channel corresponding to the transmission data.

A radio terminal according to an embodiment may comprise a receiver configured to receive, from a base station, information concerning a plurality of resource pools used in a proximity service, first priority information concerning an association between each of the plurality of resource pools and a priority, and second priority information concerning an association between identification information concerning a logical channel group and a priority.

A base station, according to an embodiment may comprise: a transmitter configured to transmit, to a radio terminal, information concerning a plurality of resource pools used in a proximity service, first priority information concerning an association between each of the plurality of resource pools and a priority, and second priority information concerning an association between identification information concerning a logical channel group and a priority.

It is noted that the embodiments described below also state the below-mentioned contents.

It is assumed that a radio terminal transmits data to each of a plurality of destinations through direct communication.

A base station according to an embodiment comprises a controller configured to assign, to a radio terminal configured to transmit data through direct communication in a proximity service, a plurality of SL identifiers consisting of an SL identifier associated with control information including allocation information of a radio resource used in the direct communication, wherein the controller reserves a radio resource for each of the plurality of SL identifiers, and transmits a plurality of control information corresponding to the plurality of SL identifiers to the radio terminal.

In the embodiment, when the radio terminal is a relay terminal configured to relay data of a remote terminal, which is outside a network area, between the remote terminal and the network, the controller assigns the plurality of SL identifiers to the radio terminal.

In the embodiment, when the number of plurality of destinations exceeds a predetermined value, the controller assigns the plurality of SL identifiers to the radio terminal.

In the embodiment, the controller arranges the plurality of control information in a search space associated with a specific SL identifier from among the plurality of SL identifiers.

A radio terminal according to an embodiment comprises: a receiver configured to receive a plurality of SL identifiers associated with a plurality of control information including allocation information of a radio resource used in direct communication in a proximity service; and a controller configured to transmit data to each of a plurality of destinations through the direct communication on the basis of allocation information of a plurality of radio resources included in each of the plurality of control information corresponding to the plurality of SL identifiers.

A base station according to an embodiment comprises a controller configured to transmit control information including allocation information of a first radio resource used in direct communication in a proximity service, wherein the controller transmits control information including allocation information of a second radio resource used in the direct communication and an index, and the index indicates whether not only the first radio resource but also the second radio resource are available.

A radio terminal according to an embodiment comprises: a receiver configured to receive control information including allocation information of a first radio resource used in direct communication in a proximity service, wherein the receiver receives control information including allocation information of a second radio resource used in the direct communication and an index, and the index indicates whether not only the first radio resource but also the second radio resource are available.

A base station according to an embodiment comprises: a controller configured to reserve a plurality of radio resources in one radio resource pool for a radio terminal configured to transmit data to each of a plurality of destinations through direct communication in a proximity service, wherein the controller transmits, to the radio terminal, one control information including a plurality of allocation information consisting of allocation information of each of a plurality of radio resources.

In the embodiment, the controller includes a respectively different index corresponding to the allocation information of each of a plurality of radio resources in the (one) control information.

A radio terminal according to an embodiment comprises a receiver configured to receive one control information including a plurality of allocation information consisting of allocation information of each of a plurality of radio resources used in direct communication in a proximity service; and a controller configured to transmit data to each of a plurality of destinations through the direct communication on the basis of the plurality of allocation information.

A radio terminal according to an embodiment comprises a controller configured to set a radio resource pool from which a radio resource for transmitting data through direction communication in a proximity service is selected, wherein upon being allowed by a base station, the controller selects a plurality of radio resources for transmitting a plurality of control information including allocation information of data transmitted through the direct communication, from the radio resource pool.

A radio terminal according to an embodiment comprises a controller configured to select a plurality of radio resources for transmitting data to each of a plurality of destinations through direct communication in a proximity service, wherein each of the plurality of radio resources does not overlap each other in a time direction.

A radio terminal according to an embodiment comprises a controller configured to select a plurality of radio resources for transmitting data to each of a plurality of destinations through direct communication in a proximity service; and a transceiver configured to transmit extended control information including allocation information of each of the plurality of radio resources to the plurality of destinations.

In the embodiment, the controller applies, to the extended control information, an MCS (Modulation and Coding Scheme) having a higher transmission rate than the MCS applied to control information including allocation information of a radio resource selected for transmitting data to one destination through the direct communication.

In the embodiment, the transceiver transmits the extended control information by using a radio resource amount that is more than control information including allocation information of a radio resource selected for transmitting data to one destination through the direct communication.

In the embodiment, the controller selects a radio resource for transmitting the extended control information from a previously set radio resource pool.

In the embodiment, when the radio terminal is a relay terminal configured to relay data between a remote terminal, which is outside a network area, and the network through direct communication, the transceiver transmits information about a radio resource pool to the plurality of destinations, and the controller selects a radio resource for transmitting the extended control information from the radio resource pool.

A radio terminal according to an embodiment comprises a controller configured to generate a packet including a plurality of data consisting of data of each of a plurality of destinations; and a transceiver configured to transmit, to the plurality of destinations, control information including a special destination identifier that indicates that the plurality of data of the plurality of destinations is included in the packet, and allocation information of a radio resource for receiving the packet by a plurality of radio terminals corresponding to the plurality of destinations.

In the embodiment, the special destination identifier is an identifier for broadcast.

In the embodiment, the special destination identifier consists of at least a part of an identifier used when the radio terminal is a relay terminal configured to relay data of a remote terminal, which is outside a network area, between the remote terminal and the network.

A radio terminal according to an embodiment comprises a controller configured to generate a packet including a plurality of data consisting of data of each of a plurality of destinations; and a transceiver configured to transmit, to the plurality of destinations, control information including a destination identifier that indicates that the plurality of data of the plurality of destinations is included in the packet, and allocation information of a radio resource for receiving the packet by a plurality of radio terminals corresponding to the plurality of destinations, wherein before transmitting the control information, the transceiver notifies the destination identifier to the plurality of destinations.

A radio terminal according to an embodiment comprises a controller configured to generate a packet including a plurality of data consisting of data of each of a plurality of destinations; and a transceiver configured to transmit, to the plurality of destinations, control information including a plurality of destination identifiers consisting of a destination identifier indicating each of the plurality of destinations, and allocation information of a radio resource for receiving the packet by a plurality of radio terminals corresponding to the plurality of destinations.

A radio terminal according to an embodiment comprises a controller configured to receive, from another radio terminal, control information including a destination identifier that indicates that a plurality of data consisting of data of each of a plurality of destinations is included in a packet transmitted through direct communication in a proximity service, and allocation information of a radio resource for receiving the packet by a plurality of radio terminals corresponding to the plurality of destinations, wherein when the destination identifier is included in the control information, the controller receives the packet on the basis of the allocation information.

In the embodiment, when the data of the radio terminal is not included in the packet, the controller omits the reception of the packet that is re-transmitted from the other radio terminal.

In the embodiment, the allocation information indicates an arrangement of a plurality of packets consisting of the packet and arranged differently in a time direction, and when the data of the radio terminal is not included in a first packet of the plurality of packets, the controller omits the reception of the remaining packets of the plurality of packets.

In the embodiment, the allocation information indicates an arrangement, in a predetermined period, of a plurality of packets consisting of the packet and arranged differently in a time direction, and the controller receives timing information indicating a timing when a plurality of destinations included in the packet can be changed within the predetermined period, and the controller receives a packet transmitted at a timing when the plurality of destinations can be changed from among the plurality of packets on the basis of the timing information.

In the embodiment, when the destination of the radio terminal is not included in a packet transmitted at a timing when the destination changes, from among the plurality of packets, the controller omits the reception of the packet until the next timing when the destination changes.

In the embodiment, when the destination of the radio terminal is not included in a packet transmitted at a final timing indicated by the timing information, from among the plurality of packets, the controller discards the allocation information even before the predetermined period ends.

When data of each of a plurality of destinations is transmitted through direct communication in a proximity service, a radio terminal according to an embodiment comprises a controller configured to set identification information of a different logical channel in each of the plurality of destinations; and a transceiver configured to transport the data of each of the plurality of destinations through a logical channel corresponding to the identification information.

In the embodiment, the transceiver notifies the usage status of the identification information to another radio terminal, and the controller sets identification information of a logical channel selected on the basis of the usage status of the identification information in the other radio terminal.

The transceiver transports data to the other radio terminal through a logical channel corresponding to the identification information of the selected logical channel.

A base station according to an embodiment comprises a controller configured to assign, to a radio terminal configured to transmit data through direct communication in a proximity service, a plurality of respectively different sets consisting of a set of an SL identifier associated with control information including allocation information of a radio resource used in the direct communication; and a radio resource pool, wherein the controller transmits, to the radio terminal, a plurality of control information consisting of the control information corresponding to each of the plurality of sets.

In the embodiment, the controller arranges the plurality of control information in a search space associated with a specific SL identifier included in any of the plurality of control information.

A base station according to an embodiment comprises a controller configured to assign, to a radio terminal configured to transmit data through direct communication in a proximity service, an SL identifier associated with control information including allocation information of a radio resource used in the direct communication, wherein the controller notifies, to the radio terminal, a plurality of radio resource pools associated with the SL identifier, and an index of each of the plurality of radio resource pools; and the controller transmits, to the radio terminal, a plurality of control information consisting of the control information including information indicating an index of a radio resource pool in which a radio resource indicated by the allocation information is included.

In the embodiment, the information indicating the index is a time location in which the allocation information is arranged.

A base station according to an embodiment comprises a controller configured to set, in a radio terminal configured to transmit data through direct communication in a proximity service, a plurality of radio resource pools from which a radio resource for transmitting the data is selected; and a transceiver configured to transmit, to the radio terminal, information about whether or not the plurality of radio resource pools are simultaneously available.

In the embodiment, the information is a list indicating a combination of radio resource pools that are simultaneously available from among the plurality of radio resource pools.

In the embodiment, the information is a list indicating only the radio resource pools that are simultaneously available from among the plurality of radio resource pools.

A radio terminal according to an embodiment comprises a controller configured to receive a plurality of control information transmitted by using a plurality of radio resources continuous in a frequency direction through direct communication in a proximity service, wherein the controller performs the process of receiving the plurality of control information on the basis of the number of patterns in which a plurality of radio resources are arranged.

A radio terminal according to an embodiment comprises a controller configured to receive a plurality of control information transmitted by using a plurality of radio resources continuous in a frequency direction through direct communication in a proximity service, wherein the controller performs the process of receiving the plurality of control information on the basis of information associated with a resource pool in which the plurality of radio resources are arranged.

A radio terminal according to an embodiment comprises a controller configured to transmit a plurality of control information transmitted by using a plurality of radio resources continuous in a frequency direction through direct communication in a proximity service, wherein the controller transmits the plurality of control information either through an OFDM signal or a multi-cluster transmission.

In 3GPP (3rd Generation Partnership Project), which is a project aiming to standardize a mobile communication system, the formulation of specifications of a proximity service (ProSe: Proximity-based Service) is being carried out.

Here, in ProSe, a first radio terminal (ProSe UE-to-Network Relay) includes a UE-to-Network relay configured to relay data (traffic) of a second radio terminal (Remote UE), which is outside the network, between the network and the second radio terminal (For example, see 3GPP Technical report "TS 23.303 V12.4.0" Mar. 19, 2015).

However, since the details of the UE-to-Network relay have not been formulated in the current specification, it may not be possible to effectively use the UE-to-Network relay.

A base station according to an embodiment includes a controller configured to notify, to a second radio terminal configured to be capable of relaying a transmission of data between a first radio terminal and the base station through direct communication with the first radio terminal, a setting for using a radio resource used in the direct communication, wherein the controller notifies, in accordance with predetermined information, to the second radio terminal, a setting for using a radio resource that the base station specifies directly, or a setting for using a radio resource that the first radio terminal selects.

In the embodiment, the predetermined information is at least one of: the resource capacity for transmitting control information in downlink direction; the process load of the base station; the delay in transmission of the control information in downlink direction; and the power status of the second radio terminal.

Preferably, when the controller notifies, to the second radio terminal, the setting for using a radio resource that the base station specifies directly, the controller sets a pattern in a time direction of the radio resource so that the radio resource does not overlap a radio resource used in the direct communication that is previously set in the first radio terminal.

In the embodiment, when the controller notifies, to the second radio terminal, the setting for using a radio resource that the base station specifies directly, the controller sets a pattern in a time direction of the radio resource so that the radio resource does not overlap a radio resource used in the direct communication that the base station specifies directly for the first radio terminal.

In the embodiment, when the controller notifies, to the second radio terminal, the setting for using a radio resource that the base station specifies directly, the controller notifies information concerning the radio resource at a predetermined timing so that the radio resource does not overlap a radio resource used in the direct communication that the base station specifies directly for the first radio terminal.

In the embodiment, when the controller notifies, to the second radio terminal, the setting for using a radio resource that the base station specifies directly, the controller sets a repetition frequency for the allocation of the radio resource.

In the embodiment, when the controller notifies, to the second radio terminal, the setting for using a radio resource that the first radio terminal selects, the controller sets a location in a time direction of the radio resource so that the radio resource does not overlap a radio resource used in the direct communication that is previously set in the first radio terminal.

A base station according to an embodiment includes a controller configured to allocate a plurality of radio resources that are selectable by a user terminal, wherein the controller transmits, on the basis of predetermined information, information expressing a priority of each radio resource in the plurality of allocated radio resources, and the plurality of radio resources are radio resources concerning device-to-device communication.

A base station according to an embodiment includes a controller configured to decide a second radio terminal configured to be capable of relaying the transmission of data between a first radio terminal and the base station through direct communication with the first radio terminal, wherein the controller decides a radio terminal that satisfies a predetermined condition as the second radio terminal.

In the embodiment, the controller determines a radio terminal in which the radio environment with the first radio terminal is equal to or above a predetermined threshold value, a radio terminal in which the radio environment with the base station is equal to or above a predetermined threshold value, or a radio terminal configured to be capable of relaying the transmission of data between the first radio terminal and the base station through direct communication with the first radio terminal as a radio terminal that satisfies the predetermined condition.

In the embodiment, the controller notifies setting information of the second radio terminal to a radio terminal that satisfies the predetermined condition.

Incidentally, the handling of data (packet) having a high priority in direct communication has not been stipulated in the current specification.

A radio terminal according to an embodiment performs direct communication in a proximity service. The radio terminal comprises a controller configured to transmit, to another radio terminal, through the direct communication, control information for notifying a radio resource that has been allocated for transmitting data through the direct communication. When high priority data having a higher priority than data scheduled to be transmitted using a predetermined radio resource that is notified by the control information is generated after the notification of the control information, the controller transmits the high priority data before the data that is scheduled to be transmitted, by using the predetermined radio resource.

In the embodiment, the controller transmits information indicating that the data transmitted using the predetermined radio resource is not the data that is scheduled to be transmitted, but is the high priority data.

In the embodiment, the controller transmits the high priority data using identification information of a logical channel having a higher priority than identification information of a logical channel for the data that is scheduled to be transmitted.

In the embodiment, the controller includes, in the control information, a destination identifier of a candidate terminal that could be a transmission target of the high priority data, in addition to a destination identifier of the data that is scheduled to be transmitted.

In the embodiment, the controller notifies, to the candidate terminal, a resource pool used by the radio terminal for transmitting the high priority data through the direct communication, and a destination identifier of a candidate terminal that could be a transmission target of the high priority data. The predetermined radio resource exists within the resource pool.

In the embodiment, the controller notifies, to the candidate terminal, the resource pool and the destination identifier of the candidate terminal either via a base station, or through a direct discovery procedure in the proximity service.

A radio terminal according to an embodiment performs direct communication in a proximity service. The radio terminal comprises a controller configured to receive, from another radio terminal, through the direct communication, control information for notifying a radio resource that has been allocated for transmitting data through the direct communication. After receiving the control information, the controller receives high priority data having a higher priority than data scheduled to be transmitted using a predetermined radio resource that is notified by the control information before the data that is scheduled to be transmitted using the predetermined radio resource.

In the embodiment, the controller receives information indicating that the data received using the predetermined radio resource is not the data that is scheduled to be transmitted, but is the high priority data. In the embodiment, the controller receives the high priority data using identification information of a logical channel having a higher priority than identification information of a logical channel for the data that is scheduled to be transmitted. It is determined that the controller receives the high priority data on the basis of the identification information of the logical channel having a high priority.

In the embodiment, the control information comprises a reception identifier of a candidate terminal that could be a transmission target of the high priority data, in addition to a destination identifier of the data that is scheduled to be transmitted. When the destination identifier of the candidate terminal indicates the radio terminal, the data that is transmitted using the predetermined radio resource is received.

In the embodiment, the controller receives a resource pool used by the other radio terminal for transmitting the high priority data through the direct communication, and a destination identifier of a candidate terminal that could be a transmission target of the high priority data. The predetermined radio resource exists within the resource pool. Even when the destination identifier of the radio terminal is not included in the control information, the controller receives data that is transmitted from the other radio terminal using the predetermined radio resource.

In the embodiment, the controller receives the resource pool and the destination identifier of the candidate terminal either via a base station, or through a direct discovery procedure in the proximity service.

A radio terminal according to an embodiment comprises a controller configured to transmit different data to each of a plurality of destinations through direct communication in a proximity service. The controller restricts the transmission of data that is transmitted after the data transmitted first.

In the embodiment, when the priority of the data that is transmitted later is either the same or higher than the priority of the data transmitted first, the controller transmits the data transmitted later without any restriction.

In 3GPP (3rd Generation Partnership Project), which is a project aiming to standardize a mobile communication system, the formulation of specifications of a Device to Device Proximity Service (D2D ProSe) is being carried out. Direct Communication is stipulated as one of the D2D ProSe.

It is possible for a radio terminal to transmit data through direct communication by using a radio resource of a transmission resource pool.

The handling of data (packet) having a high priority in direct communication has not been stipulated in the current specification.

A radio terminal according to an embodiment performs direct communication in a proximity service. The radio terminal comprises a controller configured to transmit first data to another radio terminal through the direct communication by using a radio resource of a first resource pool that is arranged repeatedly at a predetermined period in a time direction. When second data having a higher priority than the first data is generated, the controller transmits the second data to the other radio terminal through the direct communication by using a radio resource of a second resource pool that is arranged repeatedly at a period shorter than the predetermined period.

In the embodiment, the controller receives, from a base station, priority information concerning the association between a resource pool used in the direct communication and a priority. On the basis of the priority information, the controller selects the second resource pool having a higher priority than the priority of the first resource pool as the resource pool for transmitting the second data.

In the embodiment, the controller receives, from a base station, information concerning a mandatory resource pool for which monitoring is mandatory, from among resource pools used in the direct communication. On the basis of the information concerning the mandatory resource pool, the controller selects the second resource pool, which is the mandatory resource pool, as the resource pool for transmitting the second data.

In the embodiment, when the re-transmission of a packet corresponding to the first data is not completed before the transmission of the second data, the controller gives priority to the transmission of the second data as compared to the re-transmission of the packet.

In the embodiment, when the re-transmission of a packet corresponding to the first data is not completed before the transmission of the second data, the controller starts the transmission of the second data after the re-transmission of the packet is completed.

In the embodiment, when the re-transmission of a packet corresponding to the first data is not completed before the transmission of the second data, the controller determines whether or not to complete the re-transmission of the packet before transmitting the second data, on the basis of an instruction from the base station.

In the embodiment, the controller receives, from the base station, monitor information concerning a resource pool that the other radio terminal monitors, from among the second resource pools. An interval in a time direction of the resource pool that the other radio terminal monitors is shorter than the predetermined period. The controller transmits the second data to the other radio terminal on the basis of the monitor information.

In the embodiment, the second resource pool is provided in a carrier that is different from a carrier in which the first resource pool is provided.

In the embodiment, the controller receives, from a base station, priority information concerning the association between a carrier and a priority. On the basis of the priority information, the controller selects the second resource pool provided in the carrier having a higher priority than the priority of the carrier in which the first resource pool is provided as the resource pool for transmitting the second data.

A radio terminal according to an embodiment performs direct communication in a proximity service. The radio terminal comprises a controller configured to receive first data from another radio terminal through the direct communication by using a radio resource of a first resource pool that is arranged repeatedly at a predetermined period in a time direction. The controller receives, from the other radio terminal, through the direct communication, second data having a higher priority than the first data by using a radio resource of a second resource pool that is arranged repeatedly at a period shorter than the predetermined period.

In the embodiment, when the second resource pool is provided in a carrier that is different from a carrier in which the first resource pool is provided, the controller receives the second data on the basis of the number of reception chains indicating the number of carriers that are simultaneously receivable by the radio terminal.

A base station according to an embodiment comprises a controller configured to be provided with a first resource pool that is arranged repeatedly at a predetermined period in a time direction, and a second resource pool that is arranged repeatedly at a period shorter than the predetermined period. The first resource pool is used by a first radio terminal that performs direct communication in the proximity service to transmit first data to a second radio terminal through the direct communication. When second data having a higher priority than the first data is generated, the second resource pool is used by the first radio terminal to transmit the second data to the second radio terminal through the direct communication.

In the embodiment, the controller transmits, to the first radio terminal, priority information concerning the association between a resource pool used in the direct communication and a priority.

In the embodiment, the controller transmits, to the first radio terminal and the second radio terminal, information concerning a mandatory resource pool for which monitoring is mandatory, from among resource pools used in the direct communication.

In the embodiment, when the re-transmission of a packet corresponding to the first data is not completed before the first radio terminal transmits the second data, the controller transmits an instruction to the first radio terminal for determining whether or not to complete the re-transmission of the packet before transmitting the second data.

In the embodiment, the controller transmits, to the first radio terminal, monitor information concerning a resource pool that the second radio terminal monitors, from among the second resource pools.

In the embodiment, the second resource pool is provided in a carrier that is different from a carrier in which the first resource pool is provided.

In the embodiment, the controller transmits, to the first radio terminal, priority information concerning the association between a carrier and a priority.

In the embodiment, the controller decides the association between the carrier and the priority on the basis of at least one of the number of transmission chains indicating the number of carriers that are simultaneously transmittable by the first radio terminal, and the number of reception chains indicating the number of carriers that are simultaneously receivable by the second radio terminal.

The handling of data (packet) having a high priority in direct communication has not been stipulated in the current specification.

A base station according to an embodiment is a base station configured to be capable of connecting to a radio terminal configured to transmit control information through direct communication in a proximity service, by using a control resource of a control resource pool that is arranged at an interval in a time direction. The base station comprises a controller configured to allocate, when second data having a higher priority than first data that is transmitted by using a data resource notified through the control information is generated, a predetermined radio resource that is located temporally before a control resource pool arranged after the second data is generated, as a radio resource for the second data that is transmitted through the direct communication, to the radio terminal.

In the embodiment, the controller allocates, to the radio terminal, the predetermined radio resource located outside a data resource pool in which the data resource is arranged.

In the embodiment, when information indicating the generation of the second data is received from the radio terminal, the controller allocates the predetermined radio resource to the radio terminal.

In the embodiment, the controller receives an SL buffer status report in the proximity service that includes a data amount of the second data as information indicating the generation of the second data.

In the embodiment, the controller notifies, to the radio terminal, information concerning a priority of identification information concerning a logical channel. The controller determines whether or not the SL buffer status report received from the radio terminal is information indicating the generation of the second data on the basis of the identification information concerning the logical channel included in the SL buffer status report.

A radio terminal according to an embodiment performs direct communication in a proximity service. The radio terminal comprises a controller configured to transmit control information through the direct communication by using a control resource of a control resource pool that is arranged at an interval in a time direction. When second data having a higher priority than first data that is transmitted by using a data resource notified through the control information is generated, the base station allocates, to the controller, a predetermined radio resource that is located temporally before a control resource pool arranged after the second data is generated, as a radio resource for the second data that is transmitted to another radio terminal through the direct communication.

In the embodiment, when the second data is generated, the controller transmits, to the base station, information indicating the generation of the second data.

In the embodiment, the controller includes a data amount of the second data in an SL buffer status report in the proximity service, and transmits the SL buffer status report to the base station as information indicating the generation of the second data.

In the embodiment, the controller transmits, to the base station, the SL buffer status report including the data amount of the second data preferentially as compared to a buffer status report for cellular communication, and an SL buffer status report including a data volume of the first data.

In the embodiment, the controller receives, from the base station, information concerning a priority of identification information concerning a logical channel. On the basis of the information concerning the priority, the controller includes, in the SL buffer status report, identification information concerning a logical channel having a priority corresponding to the priority of the second data.

In the embodiment, when the re-transmission of a packet corresponding to the first data is not completed before the second data is transmitted using the predetermined radio resource, the controller preferentially transmits the second data as compared to the re-transmission of the packet.

In the embodiment, when the re-transmission of a packet corresponding to the first data is not completed before the second data is transmitted using the predetermined radio resource, the controller starts the transmission of the second data after completing the re-transmission of the packet.

In the embodiment, when the re-transmission of a packet corresponding to the first data is not completed before the second data is transmitted using the predetermined radio resource, the controller determines whether or not to complete the re-transmission of the packet before transmitting the second data, on the basis of an instruction from the base station.

In the embodiment, the controller transmits, to the other radio terminal, reception request information that acts as a trigger of an operation for receiving the second data.

In the embodiment, the controller transmits, to the other radio terminal, the reception request information on the basis of at least any one of a physical sidelink broadcast channel that carries information concerning a system and synchronization, a synchronization signal in the proximity service, and a discovery signal in the proximity service.

In the embodiment, the second radio resource includes not only a predetermined radio resource for transmitting the second data, but also a radio resource for transmitting control information for notifying the predetermined radio resource.

A radio terminal according to an embodiment performs direct communication in a proximity service. The radio terminal comprises a controller configured to receive control information from another radio terminal through the direct communication by using a control resource of a control resource pool that is arranged at an interval in a time direction. When second data having a higher priority than first data that is transmitted by using a data resource notified through the control information is generated, the controller receives the second data by using a predetermined radio resource that is located temporally before a control resource pool arranged after the second data is generated.

In the embodiment, the controller receives, from the other radio terminal, reception request information that acts as a trigger of an operation for receiving the second data. The controller receives the second data on the basis of the reception request information.

In the embodiment, the controller receives, from the other radio terminal, control information for notifying the predetermined radio resource that is used in the transmission of the second data, on the basis of the reception request information.

In the embodiment, the controller receives the reception request information including the control information.

[General Overview]
(Mobile Communication System)

An LTE system, which is a mobile communication system according to an embodiment will be described below. FIG. 1 is a diagram showing a configuration of the LTE system.

As shown in FIG. 1, the LTE system includes a UE (User Equipment) 100, an E-UTRAN (Evolved Universal Terrestrial Radio Access Network) 10, and an EPC (Evolved Packet Core) 20. Moreover, a Server 400 is provided in an external network that is not managed by an operator of a cellular network.

The UE 100 corresponds to a radio terminal. The UE 100 is a mobile communication device. The UE 100 performs radio communication with a cell (serving cell). The configuration of the UE 100 will be described later.

The E-UTRAN 10 corresponds to a radio access network. The E-UTRAN 10 includes an eNB 200 (evolved Node-B). The eNB 200 corresponds to a base station. The eNB 200 is connected mutually via an X2 interface. The configuration of the eNB 200 will be described later.

The eNB 200 manages one cell or a plurality of cells. The eNB 200 performs radio communication with the UE 100 that has established a connection with a cell of the eNB 200. The eNB 200 has a radio resource management (RRM) function, a routing function of user data (hereinafter, simply called the "data"), a measurement control function for mobility control and scheduling, and the like. "Cell" is used as a term indicating the smallest unit of a radio communication area. "Cell" is also used as a term indicating a function of performing radio communication with the UE 100.

The EPC 20 corresponds to a core network. The EPC 20 includes an MME (Mobility Management Entity)/S-GW (Serving-Gateway) 300, and a P-GW (Packet Data Network Gateway) 350. The MME performs different types of mobility control and the like for the UE 100. The S-GW performs transfer control of the data. The MME/S-GW 300 is connected to the eNB 200 via an S1 interface. The E-UTRAN 10 and the EPC 20 constitute a network. The P-GW 350 performs control to relay user data from an external network (and to an external network).

The Server 400 is a ProSe Application Server. In such a case, the Server 400 manages an identifier used in the ProSe. For example, the Server 400 stores the "EPC ProSe user ID" and the "ProSe function ID". Moreover, the Server 400 maps the "Application layer user ID" and the "EPC ProSe user ID".

Figure 2:
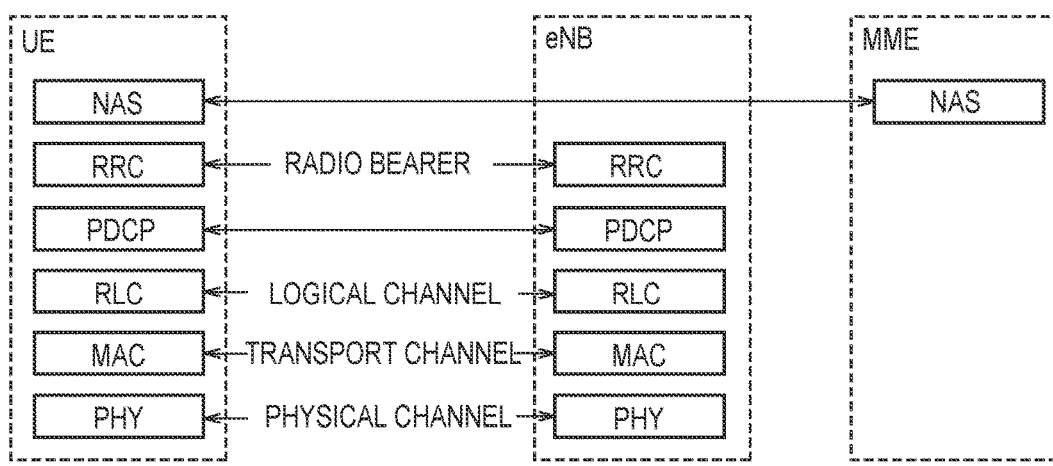
FIG. 2 is a protocol stack diagram of a radio interface in the LTE system.

FIG. 2 is a protocol stack diagram of a radio interface in the LTE system. As shown in FIG. 2, the radio interface protocol is classified into a first layer to a third layer of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, data and control signals are sent via a physical channel.

The MAC layer performs priority control of data, a retransmission process by a hybrid ARQ (HARQ: Hybrid Automatic Repeat Request), a random access procedure, and the like. Between the MAC layer of the UE 100 and the MAC layer of the eNB 200, data and control signals are sent via a transport channel. The MAC layer of the eNB 200 includes a scheduler. The scheduler decides a transport format (a transport block size and a modulation and coding scheme (MCS)) of an uplink and a downlink, and a resource block to be assigned to the UE 100.

The RLC layer sends data to an RLC layer of a reception side by using the functions of the MAC layer and the physical layer. Between the RLC layer of the UE 100 and the RLC layer of the eNB 200, data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a message (RRC message) for various types of settings is sent. The RRC layer controls a logical channel, a transport channel, and a physical channel depending on the establishment, re-establishment, and release of a radio bearer. When a connection (RRC connection) is established between the RRC of the UE 100 and the RRC of the eNB 200, the UE 100 is in an RRC connected state (connected state), and when the connection is not established, the UE 100 is in an RRC idle state (idle state).

An NAS (Non-Access Stratum) layer positioned above the RRC layer performs session management, mobility management and the like.

Figure 3:
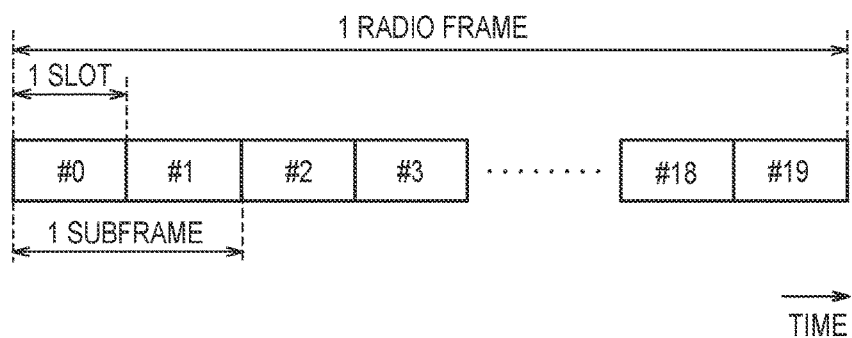
FIG. 3 is a configuration diagram of a radio frame used in the LTE system.

FIG. 3 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As shown in FIG. 3, a radio frame is configured by 10 subframes arranged in a time direction. Each subframe is configured by two slots arranged in the time direction. The length of each subframe is 1 ms. The length of each slot is 0.5 ms. Each subframe includes a plurality of resource blocks (RBs) in a frequency direction, and a plurality of symbols in the time direction. Each resource block includes a plurality of subcarriers in the frequency direction. One resource element (RE) is configured by one symbol and one subcarrier. Further, of the radio resources (time-frequency resources) allocated to the UE 100, it is possible to designate a frequency resource by a resource block, and designate a time resource by a subframe (or a slot).

In the downlink, an interval of several symbols at the head of each subframe is a region used as a physical downlink control channel (PDCCH) for mainly sending a downlink control signal. The details of the PDCCH will be described later. Furthermore, the remaining portion of each subframe is a region available as a physical downlink shared channel (PDSCH) for mainly sending downlink data.

In the uplink, both ends in the frequency direction of each subframe are regions used as a physical uplink control channel (PUCCH) for mainly sending an uplink control signal. The remaining portion of each subframe is a region available as a physical uplink shared channel (PUSCH) for mainly sending uplink data.

(Proximity Service)

A proximity service (ProSe: Proximity-based Service) will be described below. In the ProSe, a plurality of UEs 100 transmit and receive various types of signals via a direct radio link that does not pass through the eNB 200. The direct radio link in ProSe is called a "Sidelink".

A "Sidelink" is a UE-to-UE interface for direct discovery and direct communication. The "Sidelink" corresponds to a PC5 interface. The PC5 is a reference point between UEs capable of using the control for UE-to-Network relay based on direct discovery, direct communication, and proximity service, and also the proximity service used for a user plane. The PC5 interface is a UE-to-UE interface in the ProSe.

Two modes, namely "Direct Discovery" and "Direct Communication" have been defined as the modes of the ProSe.

The direct discovery is a mode of searching a partner destination by directly sending, between UEs, a discovery signal that does not specify a specific destination. Further, the direct discovery is a procedure for discovering another UE in the proximity of a UE by using a direct radio signal in E-UTRA (Evolved Universal Terrestrial Radio Access) via the PC5. Alternatively, the direct discovery is a procedure employed by the UE 100 capable of executing the proximity service for discovering another UE 100 capable of executing the proximity service by using only the capability of the two UEs 100 with the help of the E-UTRA technology. The direct discovery is supported only when a service is provided to the UE 100 by the E-UTRAN (eNB 200 (cell)). The service can be provided by the E-UTRAN 10 when the UE 100 is either connected to the cell (eNB 200), or is existing in the cell.

The resource allocation types for the transmission (announcement) of a discovery signal (discovery message) include "Type 1" in which the UE 100 selects a radio resource, and "Type 2(Type2B)" in which the eNB 200 selects a radio resource.

A "Sidelink Direct Discovery" protocol stack includes a physical (PHY) layer, a MAC layer, and a ProSe protocol. Between the physical layer of a UE (A) and the physical layer of a UE (B), a discovery signal is sent via a physical channel called a physical sidelink discovery channel (PSDCH). Between the MAC layer of a UE (A) and the MAC layer of a UE (B), a discovery signal is sent via a transport channel called a sidelink discovery channel (SL-DCH).

The direct communication is a mode in which data is directly sent between UEs by specifying a specific destination (destination group). Further, the direct communication is communication performed between two or more UEs capable of executing the proximity service through user plane transmission using the E-UTRA technology via a path that does not pass through any network node.

The resource allocation types of direct communication include "Mode 1" in which the eNB 200 specifies a radio resource of direct communication, and "Mode 2" in which the UE 100 selects a radio resource of direct communication.

A direct communication protocol stack includes a physical (PHY) layer, a MAC layer, an RLC layer, and a PDCP layer. Between the physical layer of a UE (A) and the physical layer of a UE (B), a control signal is sent via a physical sidelink control channel (PSCCH), and data is sent via a physical sidelink shared channel (PSSCH). Further, a synchronization signal and the like may be sent via a physical sidelink broadcast channel (PSBCH). Between the MAC layer of a UE (A) and the MAC layer of a UE (B), data is sent via a transport channel called a sidelink shared channel (SL-SCH). Between the RLC layer of a UE (A) and the RLC layer of a UE (B), data is sent via a logical channel called a sidelink traffic channel (STCH).

(UE-to-Network Relay)

Figure 4:
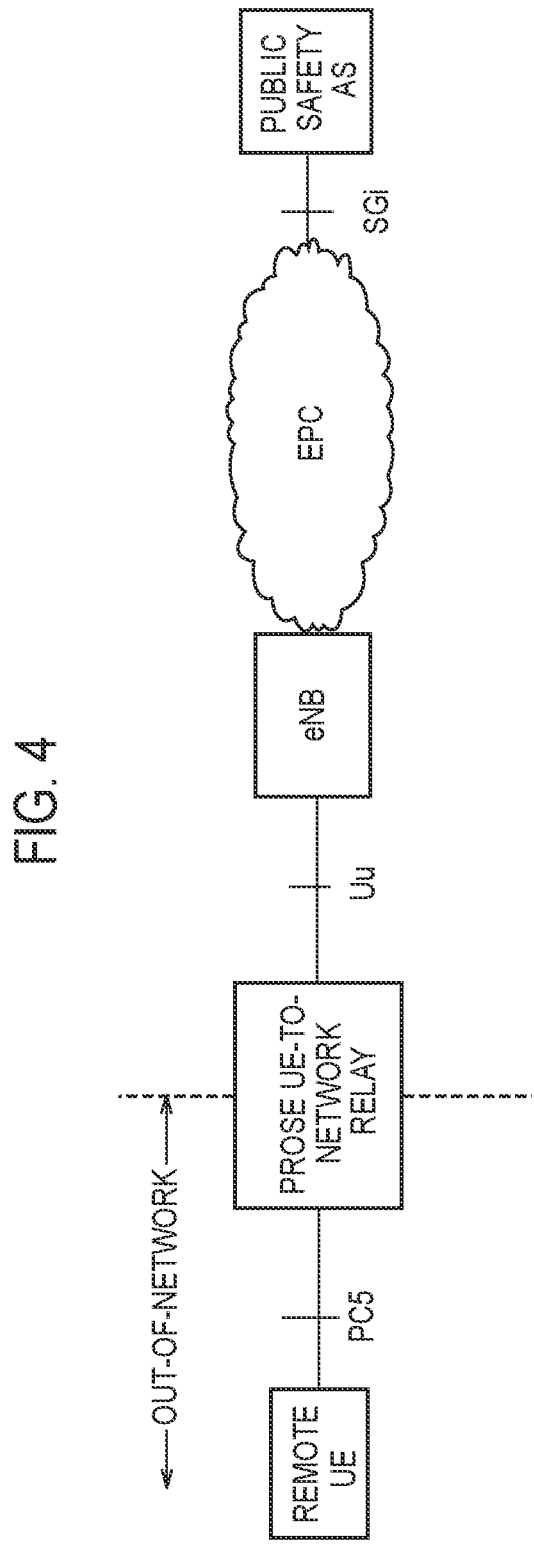
FIG. 4 is a diagram for describing a UE-to-Network relay according to an embodiment.

The UE-to-Network relay will be described below by using FIG. 4. FIG. 4 is a diagram for describing the UE-to-Network relay according to the embodiment.

In FIG. 4, a remote UE is a UE 100 to which a direct service is not provided by the E-UTRAN 10 (a UE 100 that is not served by the E-UTRAN 10). The remote UE may be located outside a network area (Out-of-Network) (outside the coverage of a cell). The remote UE may be located within the coverage of a cell. Further, it is possible for the remote UE 100 to perform communication with a packet data network (PDN) via a relay UE that is described later. The remote UE may be a UE for public safety (ProSe-enabled Public Safety UE).

It is noted that the "ProSe-enabled Public Safety UE" is configured to be allowed use for public safety by an HPLMN (Home Public Land Mobile Network). The "ProSe-enabled Public Safety UE" is capable of using the proximity service, and supports the procedures as well as specific capability for public safety in the proximity service. For example, the "ProSe-enabled Public Safety UE" transmits information for public safety through the proximity service. The information for public safety includes, for example, information concerning disasters (such as earthquakes and fires), and information used by disaster relief teams or law enforcement agents.

A remote UE is provided with the ProSe relay service from a relay UE, as described later. The UE-to-Network relay is executed between the remote UR that is provided with the ProSe relay service and the relay UE that provides the ProSe relay service.

The relay UE (ProSe UE-to-Network Relay) provides the ProSe relay service for the remote UE. Specifically, the relay UE provides service continuity of the communication with a packet data network for the remote UE. Therefore, the relay UE relays data (unicast traffic) between the remote UE and the network. The relay UE relays data (traffic) of the remote UE through the proximity service (direct communication). Specifically, the relay UE relays data (uplink traffic) received from the remote UE via the PC5 interface to the eNB 200 via a Uu interface (LTE-Uu) or a Un interface (LTE-Un). Further, the relay UE relays data (downlink traffic) received from the eNB 200 via the Uu interface or the Un interface to the remote UE via the PC5 interface. The relay UE is located only in the network (within the coverage of the cell).

Further, it is possible for the relay UE to provide a comprehensive function that enables the relay of any type of traffic related to the communication for public safety.

It is possible for the relay UE and the remote UE to send data and control signals between the physical layers. Similarly, it is possible for the relay UE and the remote UE to send data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. It is possible for the relay UE and the remote UE to send data and control signals between the IP-Relay layer and the IP layer. Further, it is possible for the relay UE to send data between the IP-Relay layer and the IP layer of the PGW350.

It is noted that in an AS layer (Access Stratum), the relay UE is capable of transmitting data (traffic) to the remote UE by using broadcast. In the AS layer, the relay UE may also transmit data to the remote UE by using unicast. It is noted that when the UE-to-Network relay is executed by using broadcast, the feedback in the AS layer is not performed, but the feedback in the NAS layer (Non Access Stratum) may be performed, between the relay UE and the remote UE. Further, when the UE-to-Network relay is performed by using unicast, the feedback in the AS layer may be performed.

(Radio Terminal)

Figure 5:
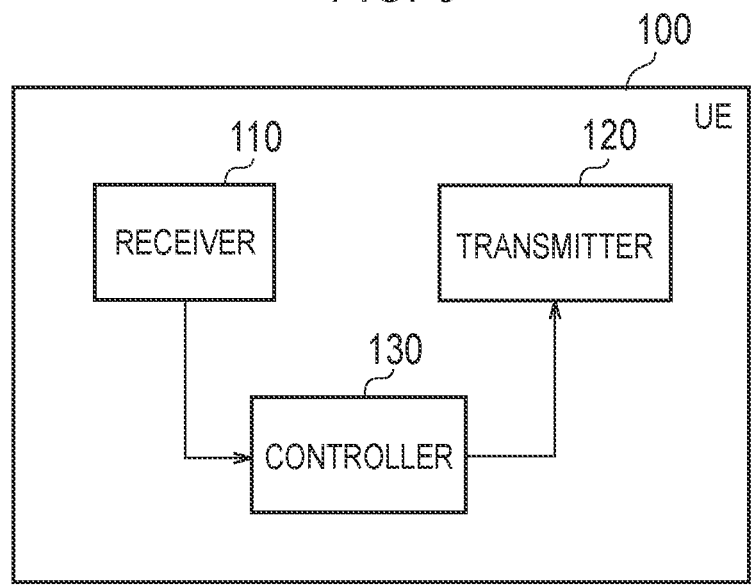
FIG. 5 is a block diagram of a UE 100.

A UE 100 (radio terminal) according to the embodiment will be described below. FIG. 5 is a block diagram of the UE 100. As shown in FIG. 5, the UE 100 includes a receiver (reception unit) 110, a transmitter (transmission unit) 120, and a controller (control unit) 130. The receiver 110 and the transmitter 120 may be unified as one in the form of a transceiver (transmission and reception unit).

The receiver 110 performs various types of receptions under the control of the controller 130. The receiver 110 includes an antenna. The receiver 110 converts a radio signal received by the antenna into a baseband signal (reception signal), and outputs the baseband signal to the controller 130.

It is noted that when the UE 100 is a "ProSe-enabled Public Safety UE", the receiver 110 is capable of simultaneously receiving radio signals in two different frequencies. For example, the UE 100 has two receivers 110 (2 RX Chain). It is possible for the UE 100 to receive a cellular radio signal with one receiver 110, and receive a ProSe radio signal with the other receiver 110.

The transmitter 120 performs various types of transmissions under the control of the controller 130. The transmitter 120 includes an antenna. The transmitter 120 converts a baseband signal (transmission signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor that performs modulation and demodulation, encoding and decoding and the like of a baseband signal, and a CPU (Central Processing Unit) that performs various processes by executing the program stored in the memory. The processor may include a codec that performs encoding and decoding on sound and video signals. The processor executes various types of processes described later, and various types of communication protocols described above.

The UE 100 may include a GNSS receiving equipment. The GNSS receiving equipment receives a GNSS signal in order to obtain location information indicating a geographical location of the UE 100, and outputs the received signal to the controller 130. Alternatively, the UE 100 may have a GPS function for acquiring the location information of the UE 100.

(Base Station)

Figure 6:
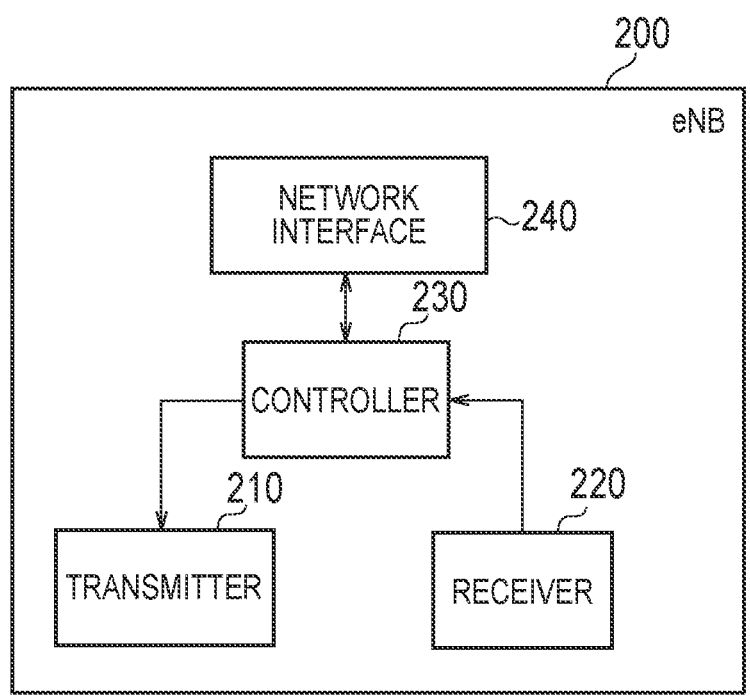
FIG. 6 is a block diagram of an eNB 200.

An eNB 200 (base station) according to the embodiment will be described below. FIG. 6 is a block diagram of the eNB 200. As shown in FIG. 6, the eNB 200 includes a receiver (reception unit) 210, a transmitter (transmission unit) 220, a controller (control unit) 230, and a network interface (backhaul communication unit) 240. The receiver 210 and the transmitter 220 may be unified as one in the form of a transceiver (transmission and reception unit).

The receiver 210 performs various types of receptions under the control of the controller 230. The receiver 210 includes an antenna. The receiver 210 converts a radio signal received by the antenna into a baseband signal (reception signal), and outputs the baseband signal to the controller 230.

The transmitter 220 performs various types of transmissions under the control of the controller 230. The transmitter 220 includes an antenna. The transmitter 220 converts a baseband signal (transmission signal) output from the controller 230 into a radio signal, and transmits the radio signal from the antenna.

The controller 230 performs various types of controls in the eNB 200. The controller 230 includes a processor and a memory. The memory stores a program to be executed by the processor, and information to be used for a process by the processor. The processor includes a baseband processor that performs modulation and demodulation, encoding and decoding and the like of a baseband signal, and a CPU (Central Processing Unit) that performs various processes by executing the program stored in the memory. The processor executes various types of processes described later, and various types of communication protocols described above.

The network interface (backhaul communication unit) 240 is connected to a neighboring eNB 200 via the X2 interface and is connected to the MME/S-GW 300 via the S1 interface. The network interface 240 is used in communication performed on the X2 interface, communication performed on the S1 interface, and the like.

(Overview of Existing Technology)

Figure 7:
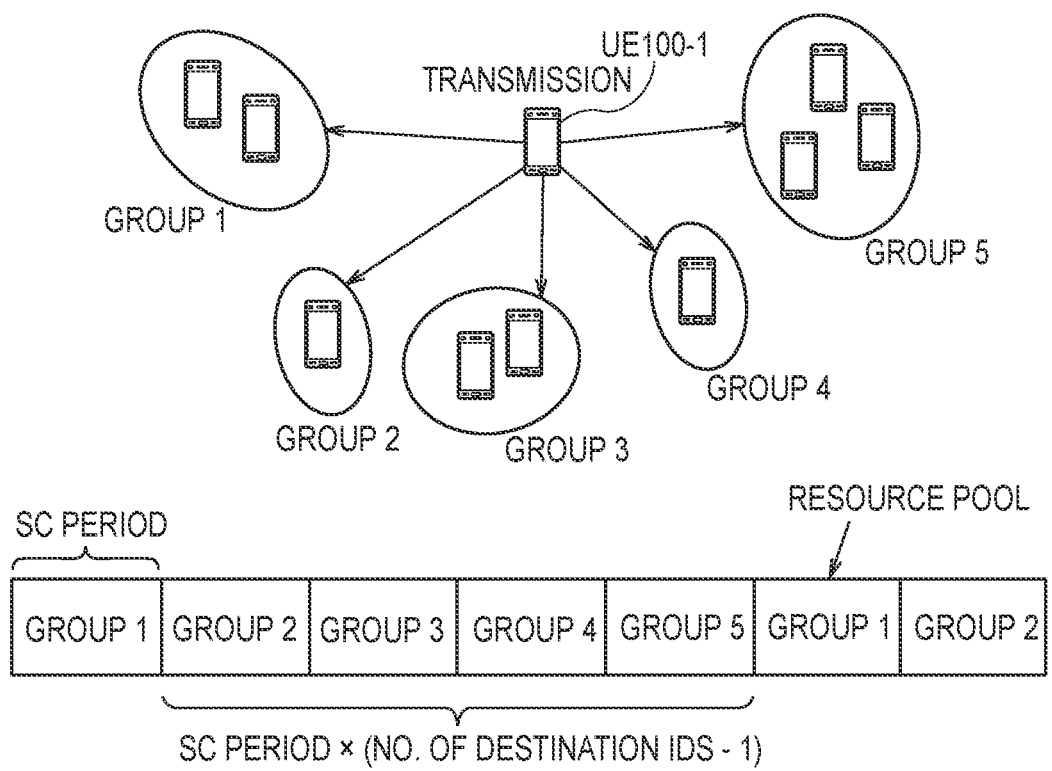
FIG. 7 is a diagram for describing an overview of an existing technology.

Next, an overview of the existing technology will be described by using FIG. 7. FIG. 7 is a diagram for describing an overview of the existing technology.

The description is provided based on an example of a case in which a UE 100-1 transmits data to each of a plurality of UEs 100 through direct communication.

A radio resource pool used in direct communication is configured by a control region (SC pool) in which control information for the sidelink (SCI: Sidelink Control Information) is arranged, and a data region (Data pool) in which data is arranged. It is noted that in Mode 1, the data region is a region that follows the control region in a time direction. In Mode 2, the data region may overlap the control region in the time direction.

As shown in FIG. 7, a plurality of radio resource pools are arranged in the time direction. The length of one radio resource pool in the time direction matches an SC period, which is a period of the radio resource pool.

Here, a case in which the UE 100-1 transmits data to each of a plurality of groups (groups 1 to 5) having respectively different destinations is assumed. In Release 12, only one SCI is possible to be transmitted in one SC period. Therefore, the description is provided by assuming that the UE 100-1 sequentially transmits data to the plurality of groups. In this case, the UE 100-1 transmits SCI to group 1 in a first SC period, and then transmits data to group 1 through a radio resource indicated by the SCI. The UE 100-1 transmits SCI to group 2 in a period following the first SC period (that is, a second SC period), and then transmits data to group 1 through a radio resource indicated by the SCI. Similarly, the UE 100-1 transmits SCI to the other groups. After the UE 100-1 has transmitted SCI to all of the plurality of groups, the UE 100-1 transmits the next SCI (in the sixth SC period) for transmitting the next data to group 1. Thus, there is a problem that when the UE 100-1 transmits data to each of the plurality of groups, a delay occurs by a time period of "(SC period length)×(No. of destinations−1)".

Particularly, even in a case in which the UE 100-1 is a relay UE, and a plurality of remote UEs are accommodated (served), the occurrence of the same problem is assumed. Thus, one of the purposes of the present application is to resolve the above-described problem through the technology described below.

It is noted that the below-described process (operation) executed by the UE 100 is executed by at least any one of the receiver 110, transmitter 120, and controller 130 included in the UE 100, but is described as a process executed by the UE 100 for the purpose of convenience. Similarly, the below-described process (operation) executed by the eNB 200 is executed by at least any one of the receiver 210, transmitter 220, controller 230, and network interface (backhaul communication unit) 240 included in the eNB 200, but is described as a process executed by the eNB 200 for the purpose of convenience.

Further, hereinafter, the description of an operation that is same as the above-described operation will be omitted where appropriate.

First Embodiment

A first embodiment will be described. In the first embodiment, a case in which a plurality of SCIs are transmitted within one SC pool will be described.

(Operation Environment According to First Embodiment)

Figure 8:
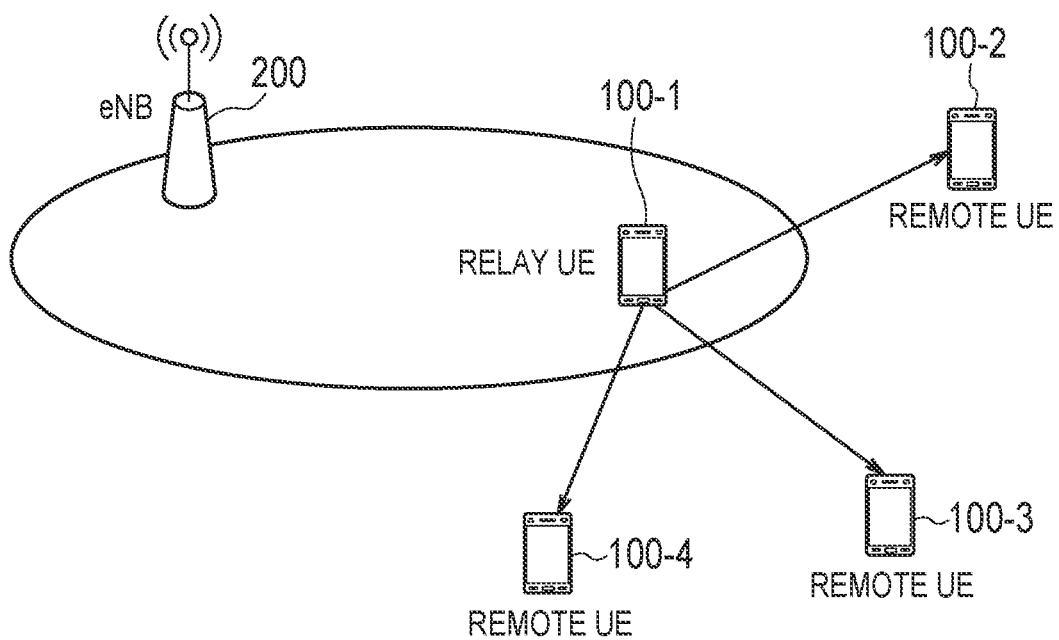
FIG. 8 is a diagram for describing an operation environment according to a first embodiment.

Next, an operation environment according to the first embodiment will be described by using FIG. 8. FIG. 8 is a diagram for describing an operation environment according to the first embodiment.

As shown in FIG. 8, the UE 100-1 is located in a cell managed by the eNB 200. The UE 100-1 is capable of performing cellular communication (LTE-Uu) with the eNB 200. The UE 100-1 is in the RRC connected state. Alternatively, the UE 100-1 may be in the RRC idle state. When performing communication with the eNB 200, the UE 100-1 may shift to the RRC connected state from the RRC idle state.

The UE 100-1 is a relay UE that serves a plurality of UEs 100 (UE 100-2 to 100-4), which are the remote UEs. The destinations, that is, the destination identifiers (Destination IDs) of the plurality of UEs 100 are respectively different.

It is noted that hereinafter, if the operations of the UE 100-3 and the UE 100-4 are same as that of another UE, the description will be omitted where appropriate.

(A) Mode 1

A case in which the UE 100-1 performs direct communication in Mode 1, where the eNB 200 specifies a radio resource of direct communication, will be described. A first to third method that is applicable in Mode 1 will be described.

(A1) First Method

Figure 9:
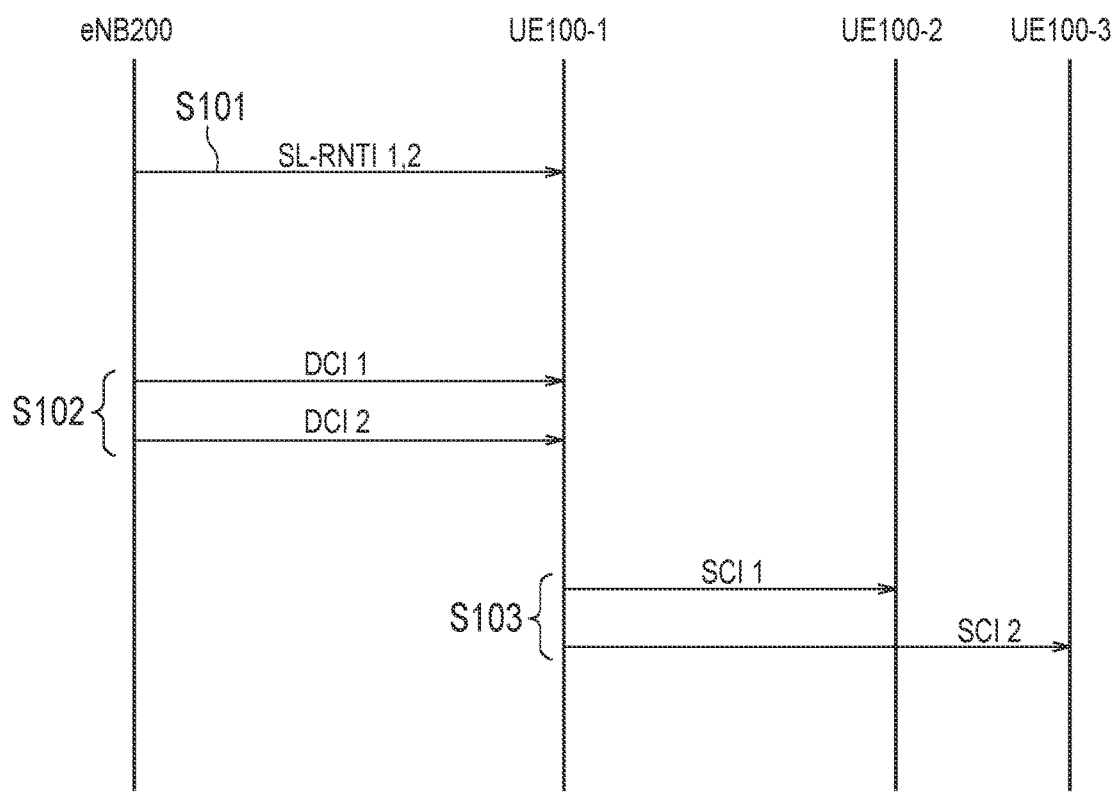
FIG. 9 is a sequence diagram for describing an operation (part 1) according to the first embodiment.

The first method will be described by using FIG. 9. FIG. 9 is a sequence diagram for describing an operation (part 1) according to the first embodiment.

As shown in FIG. 9, in step S101, the eNB 200 assigns (sets) a plurality of SL-RNTIs (SL-RNTI 1, 2) to the UE 100-1. An SL-RNTI (Sidelink Radio Network Temporary Identifier) is an identifier (corresponding to an SL identifier) associated with control information (DCI: Downlink Control Information) that includes allocation information of a radio resource used in direct communication. It is noted that the SL-RNTI is an identifier used exclusively for sidelink transmission. The DCI (DCI format 5) is control information used for sidelink transmission. Further, the DCI includes SL grant that includes the allocation information of a radio resource. It is noted that the DCI format 5 includes the information that is entered as is in SCI format 0, and resource information for transmitting the SCI format 0.

When performing RRC connection reconfiguration, the eNB 200 may assign a plurality of SL-RNTIs to the UE 100-1.

When the UE 100-1 is a relay UE, the eNB 200 may assign a plurality of SL-RNTIs to the UE 100-1. The eNB 200 may determine whether or not the UE 100-1 is a relay UE on the basis of a notification from the UE 100-1. Alternatively, when the number of destinations that the UE 100-1 has exceeds a predetermined value, the eNB 200 may assign a plurality of SL-RNTIs to the UE 100-1. For example, when the number of remote UEs that the UE 100-1 serves exceeds a predetermined value, the eNB 200 may assign a plurality of SL-RNTIs to the UE 100-1.

The eNB 200 may assign a plurality of SL-RNTIs to the UE 100-1 so that a search space of the plurality of SL-RNTIs is associated with a specific SL-RNTI. For example, the eNB 200 is capable of assigning a plurality of sequential SL-RNTIs to the UE 100-1.

Thereafter, the eNB 200 reserves a radio resource for each one of the plurality of SL-RNTIs. As a result, the eNB 200 reserves a plurality of radio resources for the UE 100-1. The eNB 200 includes each of the allocation information of the respective reserved radio resources in each DCI. Thus, the eNB 200 generates a plurality of DCIs including one allocation information.

In step S102, the eNB 200 transmits a plurality of DCIs (DCI 1, DCI 2) corresponding to the plurality of SL-RNTIs to the UE 100-1. The eNB 200 transmits the plurality of DCIs until the start of a predetermined SC period (specifically, before four subframes). The eNB 200 may arrange the plurality of DCIs in a search space associated with a specific SL-RNTI.

The UE 100-1 receives the plurality of DCIs on the basis of the plurality of SL-RNTIs. Here, the UE 100-1 may receive the plurality of DCIs by searching only the search space associated with a specific SL-RNTI. Thus, the UE 100-1 need not search a plurality of search spaces, and thus it is possible to reduce the process load of the UE 100-1.

Since the UE 100-1 receives the plurality of DCIs before the start of a predetermined SC period, the UE 100-1 decides a radio resource to be used in the transmission of each data on the basis of the allocation information included in each of the plurality of DCIs. The UE 100-1 generates SCI including allocation information of the decided radio resource. Specifically, the UE 100-1 generates SCI 1 including allocation information of a radio resource for the transmission of the data of the UE 100-2, and generates SCI 2 including allocation information of a radio resource for the transmission of the data of the UE 100-3. The SCI 1 includes a destination identifier addressed to the UE 100-2, and the SCI 2 includes a destination identifier addressed to the UE 100-3.

In step S103, the UE 100-1 transmits a plurality of SCIs to the UE 100-2 and the UE 100-3. Thereafter, the UE 100-1 transmits the data of the UE 100-2 and the data of the UE 100-3 on the basis of the allocation information of each radio resource. The UE 100-2 receives the data of the UE 100-2 on the basis of the allocation information of the radio resource included in the SCI 1 addressed to the UE 100-2. On the other hand, the UE 100-3 receives the data of the UE 100-3 on the basis of the allocation information of the radio resource included in the SCI 2 addressed to the UE 100-3.

As described above, since the UE 100-1 is capable of transmitting a plurality of SCIs in one SC period, it is possible to suppress the occurrence of a delay in data transmission. Further, since the eNB 200 allocates radio resources, it is possible to reduce the occurrence of interference.

(A2) Second Method

Figure 10:
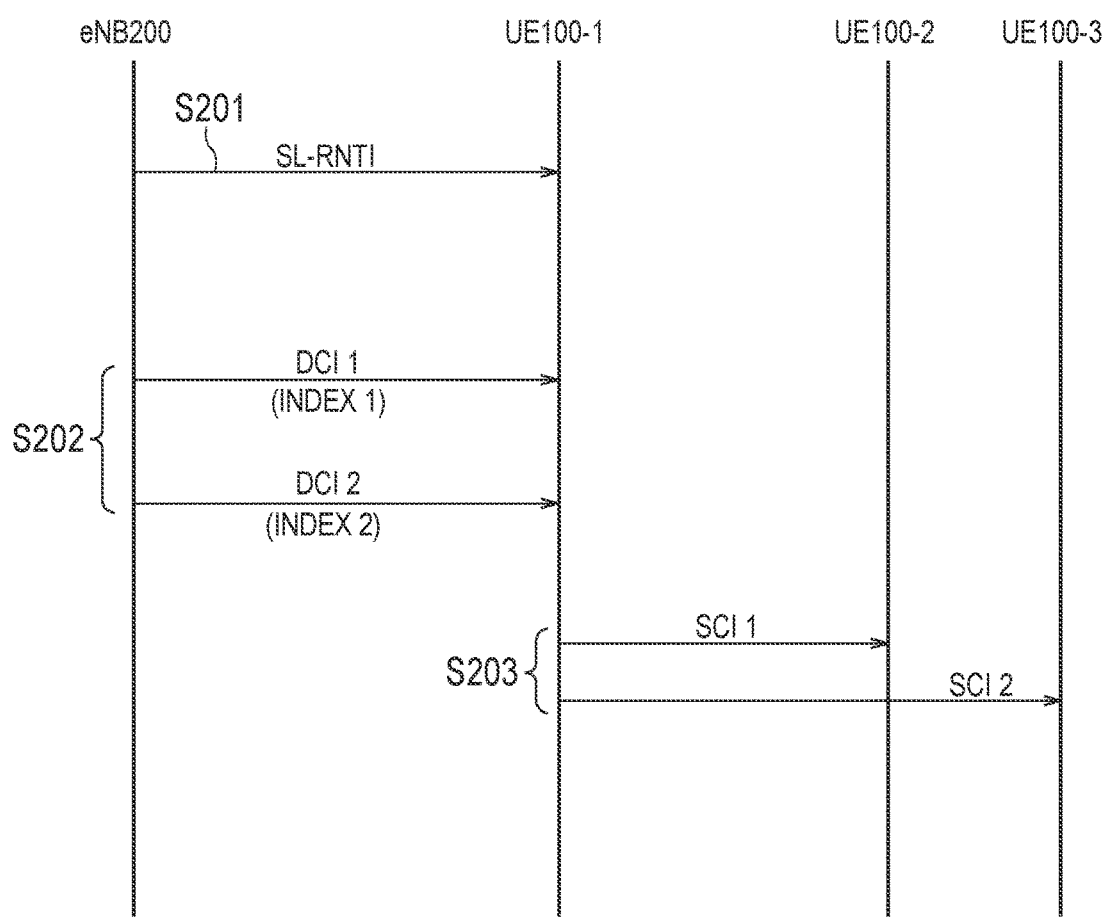
FIG. 10 is a sequence diagram for describing an operation (part 2) according to the first embodiment.

The second method will be described by using FIG. 10 and FIG. 11. FIG. 10 is a sequence diagram for describing an operation (part 2) according to the first embodiment. FIG. 11 is a diagram of an example of an extended DCI format for describing the operation (part 2) according to the first embodiment.

As shown in FIG. 10, in step S201, the eNB 200 assigns a single SN-RNTI to the UE 100-1.

The eNB 200 reserves a plurality of radio resources in one radio resource pool. It is noted that in the present SPECIFICATION, as a principle, "a plurality of radio resources" implies a plurality of radio resources in the SC pool, and a plurality of radio resources in the data pool. "A plurality of radio resources" does not imply a plurality of radio resources configured by a single radio resource in the SC pool and a single radio resource in the data pool.

The eNB 200 generates a DCI 1 that includes the allocation information of the reserved first radio resource, and an index 1. Further, the eNB 200 generates DCI 2 that includes the allocation information of the reserved second radio resource, and an index 2. In the present embodiment, the value of these indexes is different.

As shown in FIG. 11, the (extended) DCI format includes a "Resource pool index" corresponding to the index. The index indicates whether or not a plurality of radio resources are available in one SC period. That is, the index indicates whether or not a plurality of SCIs are simultaneously transmittable. The index, for example, is an integer number, and can take a value of 1 to the maximum number of SCI that are transmitted simultaneously.

It is noted that in FIG. 11, "Resource for PSCCH" is a PSCCH resource allocation identifier. "TPC command for PSCCH & PSSCH" is transmission power information. "Frequency hopping flag" is frequency hopping information. "Resource block assignment & hopping resource allocation" is frequency direction resource allocation information. "Time resource pattern" is time direction subframe assignment pattern information. It is noted that "Resource for PSCCH", "Frequency hopping flag", "Resource block assignment & hopping resource allocation", and "Time resource pattern" configure the SL grant.

In step S202, the eNB 200 transmits a plurality of DCIs. The UE 100-1 receives the plurality of DCIs. Thus, the UE 100-1 acquires allocation information 1 of the radio resource included in DCI 1, and allocation information 2 of the radio resource included in DCI 2.

The UE 100-1 determines, on the basis of the index, whether not only the first radio resource based on allocation information 1 that is acquired first, but also the second radio resource based on allocation information 2 that is acquired next are available. Specifically, the UE 100-1 determines whether or not the index 1 included in DCI 1 and the index 2 included in DCI 2 have different values. If these indexes have different values, then the UE 100-1 determines that not only the first radio resource, but the second radio resource are available. On the other hand, if these indexes have the same value, the UE 100-1 overwrites the information of DCI 1 with the information of DCI 2.

It is noted that in the existing technology, the index is not included in the DCI. Upon receiving new DCI, the UE overwrites the information of the retained DCI with the information of the new DCI.

Step S203 corresponds to step S103.

As described above, since the UE 100-1 is capable of being allocated with a plurality of radio resources, it is possible to suppress the occurrence of a delay in data transmission. Further, since the eNB 200 allocates radio resources, it is possible to reduce the occurrence of interference.

(A3) Third Method

Figure 12:
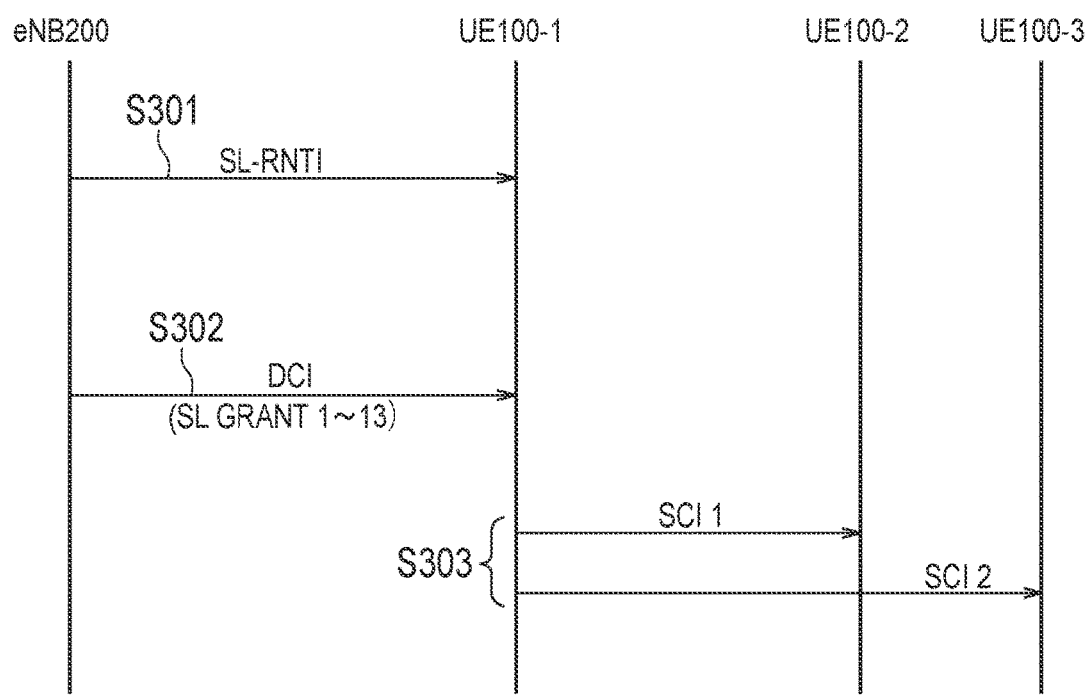
FIG. 12 is a sequence diagram for describing an operation (part 3) according to the first embodiment.

The third method will be described by using FIG. 12 and FIG. 13. FIG. 12 is a sequence diagram for describing an operation (part 3) according to the first embodiment. FIG. 13 is a diagram of an example of an extended DCI format for describing the operation (part 3) according to the first embodiment.

In step S301 of FIG. 12, the eNB 200 assigns a single SN-RNTI to the UE 100-1.

The eNB 200 reserves a plurality of radio resource pools in one radio resource pool. The eNB 200 generates DCI that includes a plurality of allocation information consisting of the allocation information of each of the plurality of radio resource pools. Specifically, the eNB 200 generates DCI that includes a plurality of SL grants (see the bold frame) corresponding to the plurality of allocation information.

As shown in FIG. 13, the (extended) DCI format includes a plurality of SL grants. Here, one SL grant is configured by "Resource for PSCCH", "Frequency hopping flag", "Resource block assignment & hopping resource allocation", "Time resource pattern", and "Resource pool index". The SL grant may not necessarily include "Resource pool index" (index).

When the SL grant includes "Resource pool index", the eNB 200 sets the index corresponding to the allocation information of each of the plurality of radio resource pools to a respectively different value. Thus, it is possible to prevent the UE 100 from overwriting the information of the DCI (SL grant) retained on the basis of any of the plurality of SL grants.

In step S302, the eNB 200 transmits one DCI, and the UE 100-1 receives one DCI. Thus, the UE 100-1 acquires the allocation information of the plurality of radio resources included in the DCI.

Step S303 corresponds to step S103.

As described above, since the UE 100-1 is capable of being allocated with a plurality of radio resources, it is possible to suppress the occurrence of a delay in data transmission. Further, since the eNB 200 allocates radio resources, it is possible to reduce the occurrence of interference.

(B) Mode 2

Figure 14:
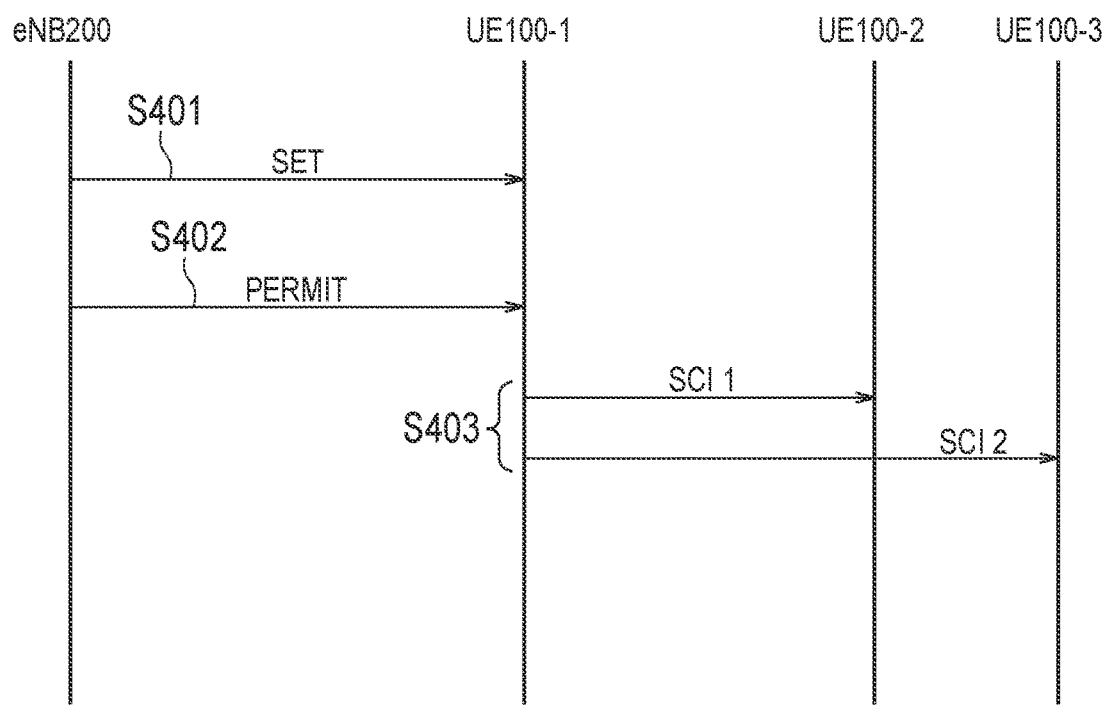
FIG. 14 is a sequence diagram for describing an operation (part 4) according to the first embodiment.
Figure 15:
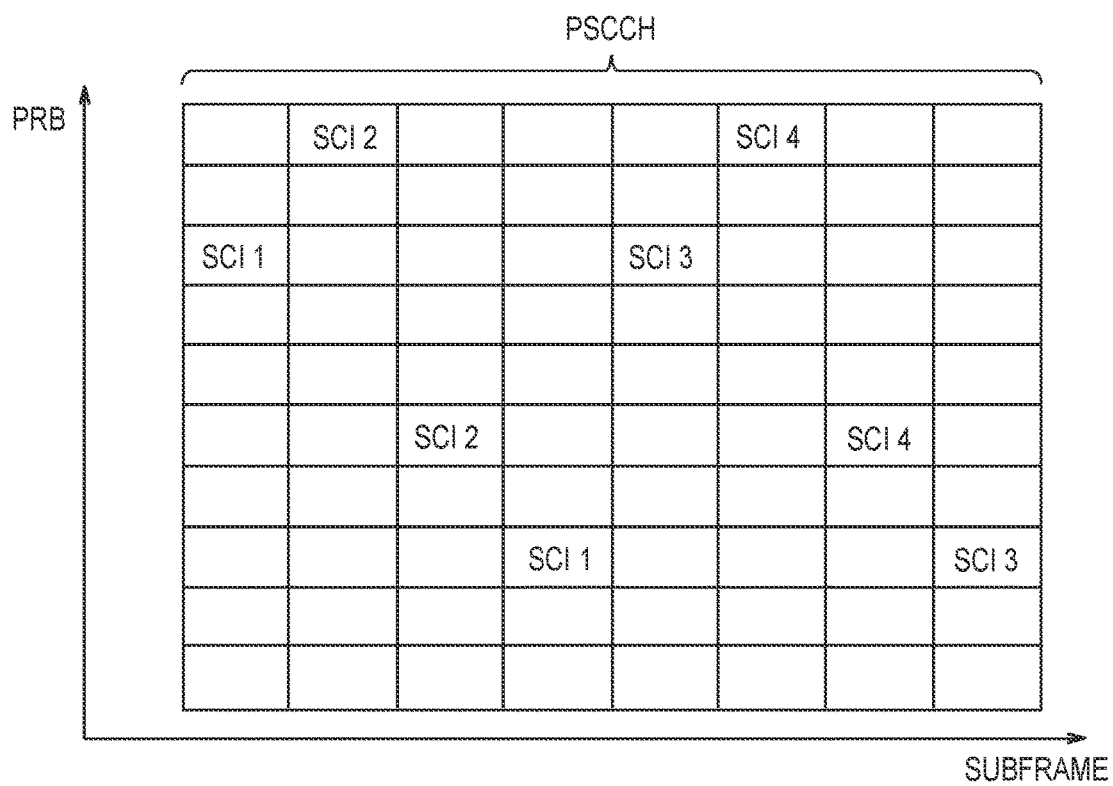
FIG. 15 is a diagram of an example of SCI assignment for describing the operation (part 4) according to the first embodiment.

Next, a case in which the UE 100-1 performs direct communication in Mode 2, where the UE 100 selects a radio resource of direct communication, will be described by using FIG. 14 and FIG. 15. FIG. 14 is a sequence diagram for describing an operation (part 4) according to the first embodiment. FIG. 15 is a diagram of an example of SCI assignment for describing the operation (part 4) according to the first embodiment.

As shown in FIG. 14, in step S401, the eNB 200 transmits, to the UE 100-1, setting information for setting a radio resource pool used in Mode 2 in the UE 100-1. The UE 100-1 sets a radio resource pool on the basis of the setting information. It is noted that the UE 100-1 may set a radio resource pool that has been set beforehand. Further, the radio resource pool set here may be a radio resource pool capable of simultaneously transmitting a plurality of control information.

In step S402, the eNB 200 transmits, to the UE 100-2, permission information for permitting the use of a radio resource pool capable of transmitting a plurality of control information in one SC period (or simultaneously). Alternatively, the eNB 200 transmits, to the UE 100-2, permission information for permitting the transmission of a plurality of control information in one SC period (or simultaneously) in the preset radio resource pool. The eNB 200 may transmit the permission information together with the setting information.

When the UE 100-1 is a relay UE, the eNB 200 may transmit the permission information to the UE 100-2. The eNB 200 may determine whether or not the UE 100-1 is a relay UE on the basis of a notification from the UE 100-1. Alternatively, when the number of destinations that the UE 100-1 has exceeds a predetermined value, the eNB 200 may transmit the permission information to the UE 100-2. For example, when the number of remote UEs that the UE 100-1 serves exceeds a predetermined value, the eNB 200 may transmit the permission information to the UE 100-2.

When the UE 100-1 does not receive the permission information from the eNB 200, the UE 100-1 selects a radio resource for transmitting one control information from the plurality of preset radio resource pools.

On the other hand, the UE 100-1 that receives the permission information from the eNB 200 is capable of selecting a plurality of radio resources from the preset radio resource pool, in response to the permission from the eNB 200.

Here, an example of selection of a radio resource used in the transmission of the SCI, by the UE 100-1, will be described.

As shown in FIG. 15, it is preferred that the UE 100-1 selects a radio resource such that a plurality of SCIs do not collide in a time direction. Thus, a Release 12 terminal also becomes capable of performing reception, and backward compatibility is secured.

Step S403 corresponds to step S103.

As described above, since the UE 100-1 is capable of selecting a plurality of radio resources, it is possible for the UE 100-1 to transmit a plurality of SCIs in one SC period (or simultaneously). Thus, it is possible to suppress the occurrence of a delay in data transmission. Further, since the UE 100-1 selects a radio resource upon getting the permission of the eNB 200, it is possible to reduce the occurrence of interference.

(C) Selection of Radio Resource for Data Transmission

Figure 16:
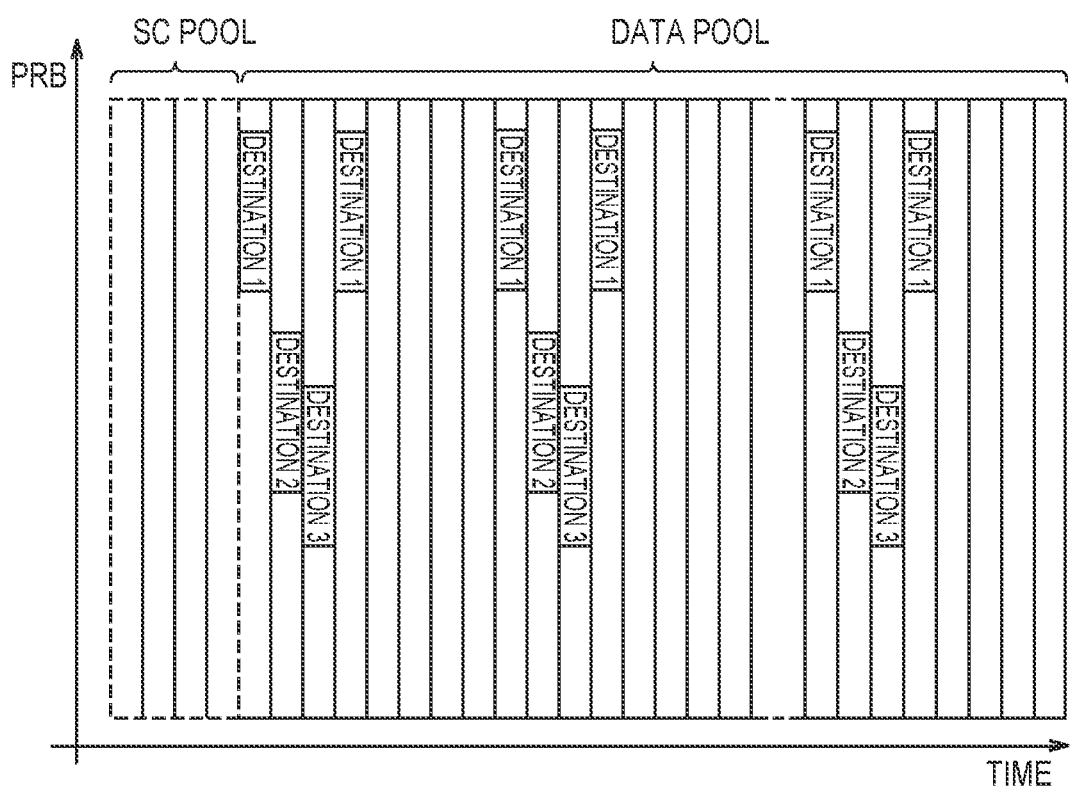
FIG. 16 is a diagram for describing an operation (part 5) according to the first embodiment.

Next, the selection of a radio resource for data transmission will be described by using FIG. 16. FIG. 16 is a diagram for describing an operation (part 5) according to the first embodiment.

It is possible to apply the selection method of a radio resource for data transmission in both Mode 1 and Mode 2.

As shown in FIG. 16, when selecting a plurality of radio resources for transmitting data to each of a plurality of destinations (Destinations 1 through 3), the UE 100-1 selects the radio resources such that each of the plurality of radio resources does not overlap each other in a time direction. Thus, it is possible to resolve the problem of PAPR (Peak to Average Power Ratio).

Second Embodiment

Next, a second embodiment will be described. In the second embodiment, the description is mainly focused on a case in which a plurality of destination identifiers (Destination IDs) are notified by one SCI. It is noted that the description of parts similar to the first embodiment will be omitted.

(D) First Method

A first method will be described by using FIG. 17 and FIG. 18. FIG. 17 is a diagram of an example of an extended SCI format for describing an operation (part 1) according to the second embodiment. FIG. 18 is a diagram of an example of an extended DCI format for describing the operation (part 1) according to the second embodiment.

In the first method, an extended SCI that changes an SCI storage field, and includes allocation information for a plurality of destinations (Destination IDs), is used.

As shown in FIG. 17, the extended SCI includes the allocation information of a plurality of radio resources (see the bold frame). The allocation information, for example, is configured by "Frequency hopping flag", "Resource block assignment & hopping resource allocation", "Time resource pattern", and "Modulation & coding scheme (MCS)". The extended SCI includes a plurality of sets consisting of a set of the allocation information and the destination identifier (group destination ID) corresponding to the allocation information.

It is noted that "Time advance indication" is a correction value concerning the transmission timing. Further, "Number of destinations" indicates the upper limit of data resources that is simultaneously specifiable by one extended SCI. That is, "Number of destinations" indicates the maximum count of allocation information that the extended SCI includes. In the example shown in FIG. 17, the extended SCI can include 16 instances of the allocation information.

The UE 100-1 selects a plurality of radio resources, and generates an extended SCI. The UE 100-1 is capable of executing the method described below for generating the extended SCI.

For example, it is possible for the UE 100-1 to apply, to the extended SCI, an MCS having a higher transmission rate than the MCS applied to the SCI that is applied to an existing SCI including one allocation information.

Further, the UE 100-1 may allocate a radio resource amount that is more than the existing SCI for the transmission of the extended SCI. It is possible for the UE 100-1 to transmit the extended SCI by using the allocated radio resource.

The UE 100-1 transmits the generated extended SCI that includes the allocation information of each of the plurality of radio resources, to the plurality of destinations. The UE 100-1 may select a radio resource for transmitting the extended SCI from a radio resource pool that has been set beforehand. Since the UE 100-1 selects the radio resource from the radio resource pool that has been set beforehand in a UE outside a network area that is located outside the coverage of a cell, a UE outside the network area is also capable of acquiring the extended SCI. Alternatively, the UE 100-1 may select the radio resource from a radio resource pool that is notified by a relay UE. For example, if the UE 100-1 is a relay UE, the UE 100-1 notifies the radio resource pool to the remote UE. The UE 100-1 is capable of selecting a radio resource for transmitting the extended SCI from the notified radio resource pool. Thus, it is possible for the remote UE to acquire the extended SCI.

It is noted that in Mode 1, when the first method is applied, the eNB 200 must transmit, to the UE 100, the allocation information addressed to the plurality of destinations. Therefore, the allocation information is included in the DCI in the same way as the above-described first embodiment. Specifically, as shown in FIG. 18, the DCI includes the allocation information for transmitting one SCI (parameters: "Resource for PSCCH", "TPC command for PSCCH & PSSCH", and "Frequency hopping flag"), and the allocation information for a plurality of data (parameters: "Resource block assignment & hopping resource allocation", "Time resource pattern", and "Resource pool index").

Further, in Mode 2, in order to resolve the PAPR problem, it is preferred that the UE 100-1 selects a radio resource for data transmission, as described above in the first embodiment.

(E) Second Method

Figure 19:
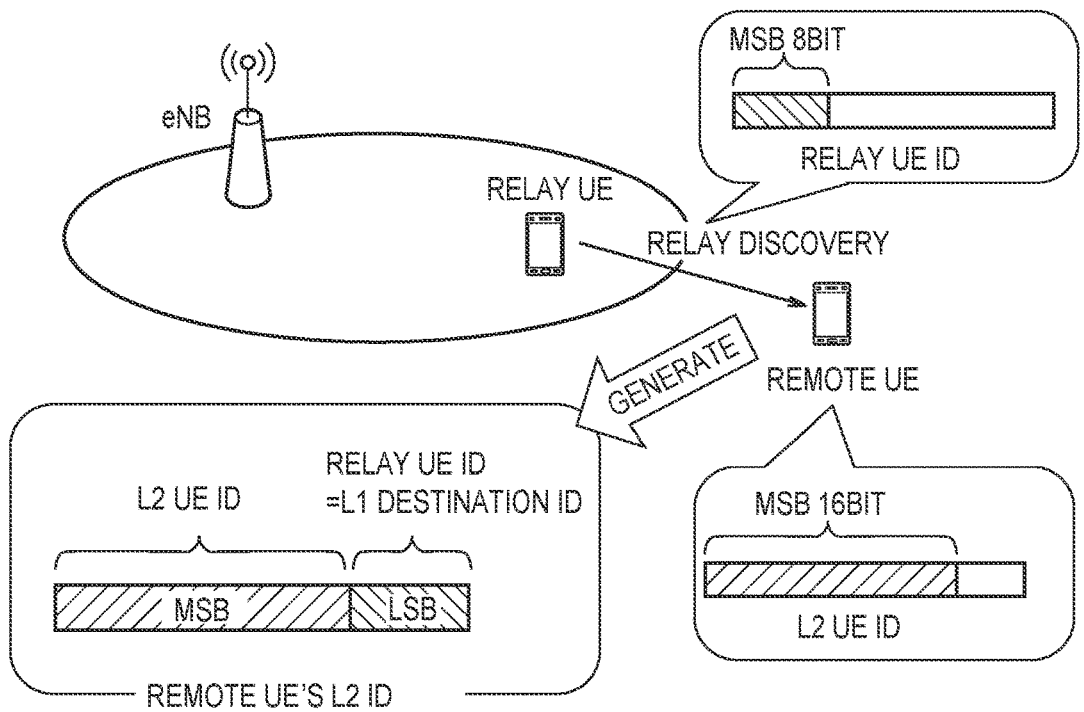
FIG. 19 is a diagram for describing an operation (part 2) according to the second embodiment.

Next, a second method will be described by using FIG. 19. FIG. 19 is a diagram for describing an operation (part 2) according to the second embodiment.

In the second method, the UE 100-1 extends a packet (MAC PDU (MAC Protocol Data Unit), and includes the data of each of the plurality of destinations in the packet (that is, multiplexes a plurality of data in a MAC PDU). Therefore, the UE 100-1 generates a packet including a plurality of data consisting of the data of each of the plurality of destinations. Further, by using a special destination identifier, the UE 100 notifies a plurality of reception UEs (UE 100-2 to 100-4) that the packet includes the data of the plurality of destinations.

The UE 100-1 transmits SCI that includes a special destination identifier (for example, a special L1 destination ID) indicating that a plurality of data of a plurality of destinations are included in a packet, and allocation information of a radio resource for receiving the packet by a plurality of reception UEs corresponding to the plurality of destinations.

The special destination identifier, for example, is an identifier for broadcast. Alternatively, the special destination identifier may be one consisting of at least a part of an identifier used when the UE 100-1 is a relay terminal. Therefore, the special destination identifier may be one that enables the remote UE connected to the same UE 100 (the same relay UE) to recognize that the special destination identifier is the same. For example, the special destination identifier may be an L2 Relay UE ID, which is an identifier of the relay UE. Alternatively, the special destination identifier may be a part of an identifier of the relay UE (Relay UE ID). For example, the special destination identifier may be an MSB (Most Significant Bit) of the identifier of the relay UE (Relay UE ID).

As shown in FIG. 19, the remote UE stores the MSB (for example, the first 8 bits) of the identifier of the relay UE (Relay UE ID) notified from the relay UE by a discovery signal (Relay Discovery) as a special destination identifier.

It is noted that as shown in FIG. 19, the relay UE may generate a new identifier (Remote UE's L2 ID) by joining the MSB of the identifier of the relay UE (Relay UE ID) and the MSB (for example, the first 16 bits) or LSB (Last Significant Bit) of the L2 UE ID of the relay UE as the destination identifier of the relay UE. The new identifier may also be used.

As described above, even when the UE 100-1 does not notify the special destination identifier to another UE (for example, the remote UE), the other UE is capable of recognizing the special destination identifier. Therefore, when the other UE receives SCI including the special destination identifier from the UE 100-1, the other UE understands that the SCI includes the allocation information of the data of the plurality of destinations. Therefore, even when the allocation information is not addressed to the other UE, the other UE need not discard the allocation information.

(F) Third Method

A third method will be described. In the third method, same as the second method, the UE 100-1 generates a packet including a plurality of data consisting of the data of each of a plurality of destinations.

In the third method, before transmitting the SCI, the UE 100-1 notifies the destination identifier (L1 destination ID) for receiving data addressed to a plurality of destinations, to the other UE. The UE 100-1 may use a discovery signal (discovery message) for notifying the destination identifier.

Thus, when the other UE receives SCI including the destination identifier, the other UE understands that the SCI includes the allocation information of the data of the plurality of destinations. Therefore, even when the allocation information is not addressed to the other UE, the other UE need not discard the allocation information.

(G) Fourth Method

A fourth method will be described by using FIG. 20. FIG. 20 is a diagram of an example of an extended SCI format for describing an operation (part 4) according to the second embodiment.

As shown in FIG. 20, the UE 100-1 transmits an (extended) SCI including a plurality of destination identifiers and allocation information for receiving a packet. The extended SCI, for example, includes "Number of destinations" indicating the number of destinations, and "Group destination ID", which is a plurality of destination identifiers. It is noted that in the example shown in FIG. 20, the extended SCI format is capable of storing a maximum of 16 (4 bits) destination identifiers (destination IDs).

If the destination identifier of the other UE is present in the plurality of destination identifiers in the extended SCI, the other UE that receives the extended SCI receives the data on the basis of the allocation information. On the other hand, if the destination identifier of the other UE is not present in the plurality of destination identifiers in the extended SCI, the other UE is capable of discarding the allocation information.

It is noted that when the above-described second method to the fourth method according to the second embodiment are applied in Mode 1, the eNB 200 must transmit, to the UE 100, the allocation information addressed to the plurality of destinations. Therefore, a similar operation as the above-described methods is executed.

(H) Reception of Data

Figure 21:
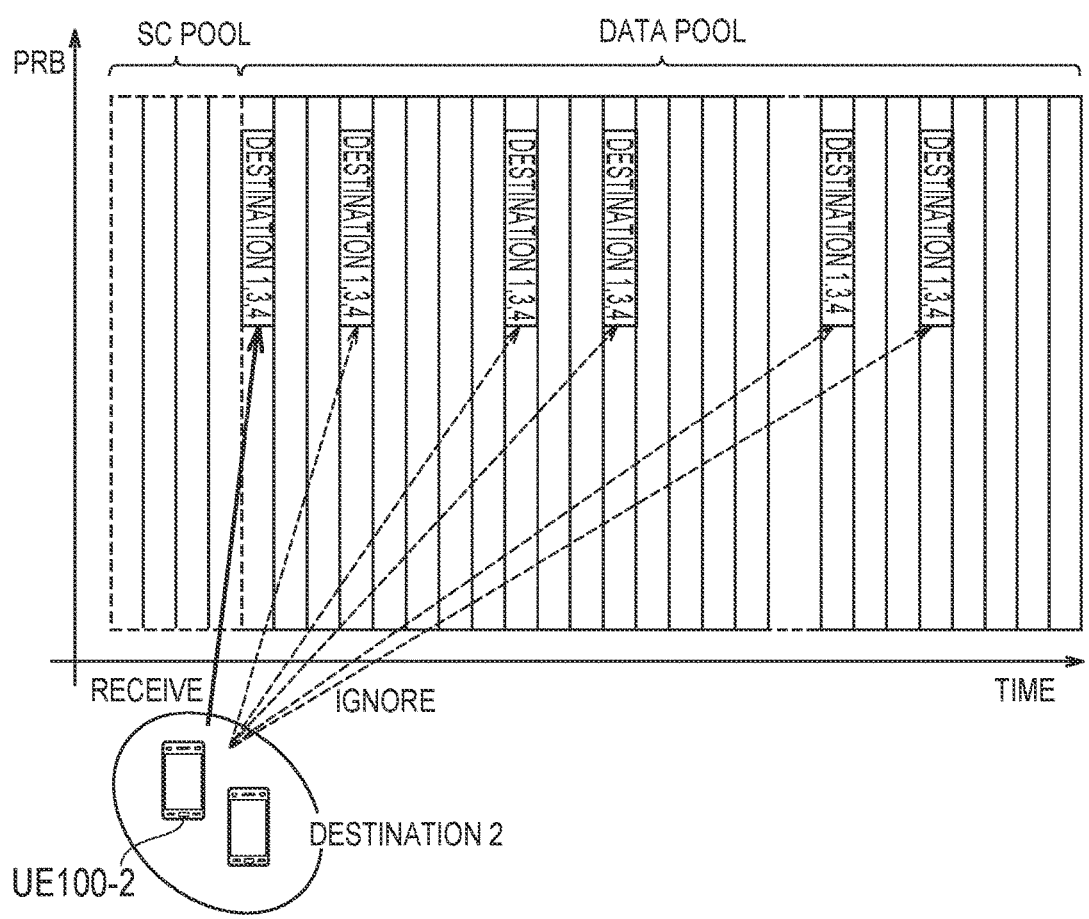
FIG. 21 is a diagram for describing an operation (part 5) according to the second embodiment.
Figure 22:
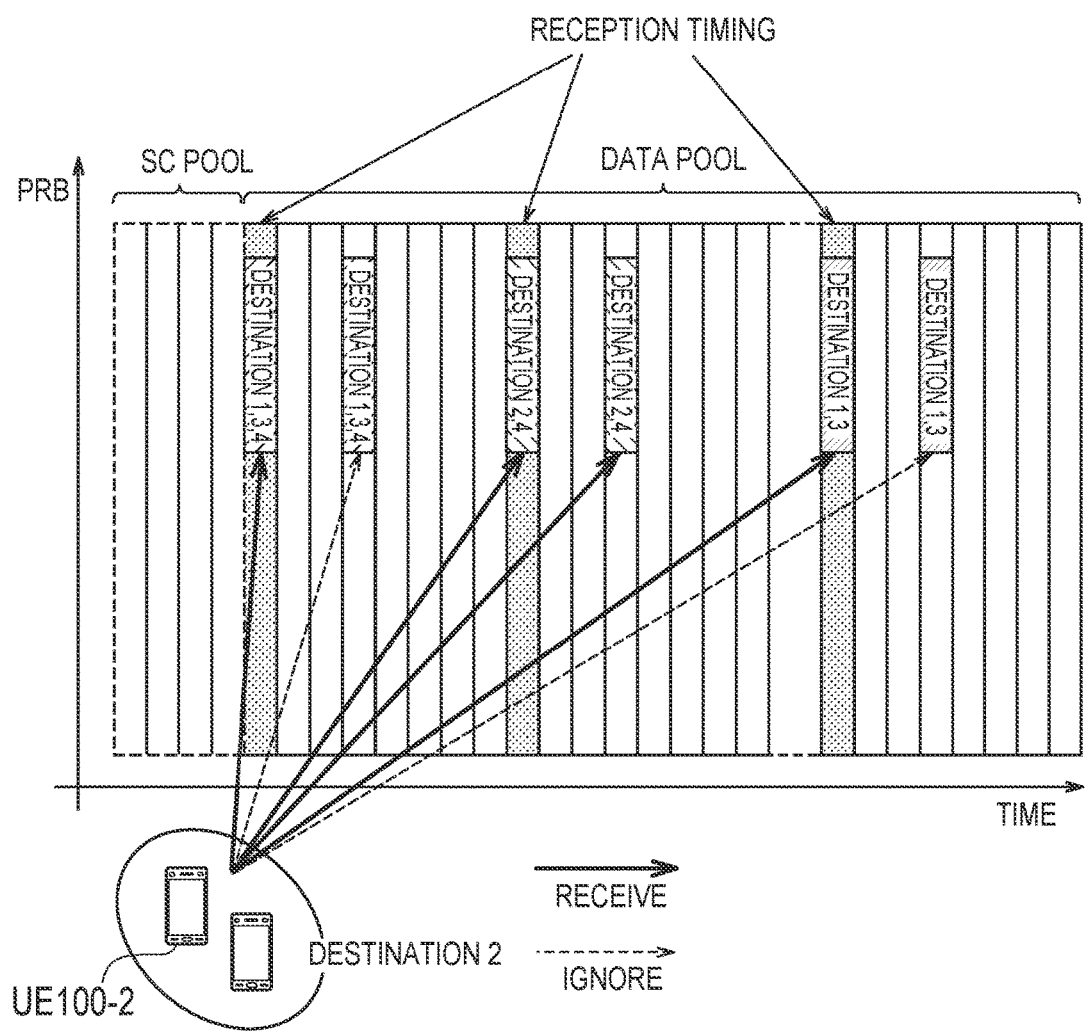
FIG. 22 is a diagram for describing an operation (part 6) according to the second embodiment.

The reception of data will be described by using FIG. 21 and FIG. 22. FIG. 21 is a diagram for describing an operation (part 5) according to the second embodiment. FIG. 22 is a diagram for describing an operation (part 6) according to the second embodiment.

As described above, the other UE (hereinafter, the UE 100-2) that receives CSI that includes a destination identifier (a special destination identifier) indicating that the data of a plurality of destinations is included in a packet, or a plurality of destination identifiers, receives a packet on the basis of the allocation information included in the SCI. Here, there is a possibility that the UE 100-2 continues to receive the packet even when the data of the UE 100-2 is not included in the packet. Therefore, it is possible to mitigate the reception of unnecessary packets with the help of the method described below.

Firstly, when the data of the UE 100-2 is not included in the packet, the UE 100-2 omits the reception of packets that are re-transmitted from the UE 100-1. Specifically, when a MAC SDU (Service Data Unit) addressed to the UE 100-2 is not included in a received MAC PDU, the UE 100-2 omits (that is, does not receive) the reception of the re-transmitted MAC PDU.

Secondly, in one radio resource pool, when the data of the UE 100-2 is not included in the first packet, the UE 100-2 omits the reception of the packets that are transmitted thereafter. Further, the UE 100-2 discards the allocation information. By discarding the allocation information, it is possible for the UE 100-1 to terminate the HARQ process much faster.

Specifically, the UE 100-2 receives the first MAC PDU (the packet in the subframe after the SC pool in FIG. 21) on the basis of the allocation information indicating the arrangement of a plurality of packets that are arranged differently in a time direction. If the destination of the UE 100-2 is not stored in the received first MAC PDU, the UE 100-2 omits (ignores) the reception of the packets transmitted thereafter. Further, the UE 100-2 discards the corresponding allocation information.

It is noted that in one radio resource pool, the UE 100-1 transmits only the data corresponding to a plurality of destination identifiers (Destination IDs 1, 3, 4) included in the first packet. As shown below, the UE 100-1 does not change the destination in one radio resource pool.

Thirdly, the UE 100-2 receives the packet (MAC PDU) that is transmitted at a timing when the destination of a plurality of data can be changed, and determines whether or not to omit the reception of the packets transmitted thereafter.

Specifically, first of all, the UE 100-1 transmits timing information indicating the timing when a plurality of destinations included in the MAC PDU can be changed within a predetermined period (within the period of one radio resource pool). The UE 100-2 receives the timing information. The UE 100-1 may store the timing information as a MAC CE (Control Element) stored in the first MAC PDU.

The UE 100-2 receives the first MAC PDU. When the destination (identifier) of the UE 100-2 is stored in the first MAC PDU, the UE 100-2 continues to receive the MAC PDU until the next timing (Reception timing) when a plurality of destinations can be changed. On the other hand, when the destination of the UE 100-2 is not stored in the first MAC PDU, the UE 100-2 omits (ignores) the reception of the MAC PDU until the next timing on the basis of the timing information. It is noted that the UE 100-2 continuously retains the allocation information until the last timing, which is described later.

The UE 100-2 receives the MAC PDU at the next timing based on the timing information, and determines whether the destination (identifier) of the UE 100-2 is stored in the received MAC PDU. In FIG. 22, since the destination of the UE 100-2 is stored in the received MAC PDU, the UE 100-2 receives the MAC PDU on the basis of the allocation information.

The UE 100-2 receives the MAC PDU at the timing when a plurality of destinations can be changed, on the basis of the timing information. The timing specified here is the last timing indicated by the timing information. Since the destination of the UE 100-2 is not stored in the MAC PDU, the UE 100-2 omits the reception of the MAC PDU transmitted thereafter. Further, the UE 100-2 discards the allocation information before the predetermined period (one radio resource pool) ends. By discarding the assignment information before one radio resource pool is terminated, it is possible for the UE 100-1 to end the HARQ process much faster.

(1) Use of LCID

Figure 23:
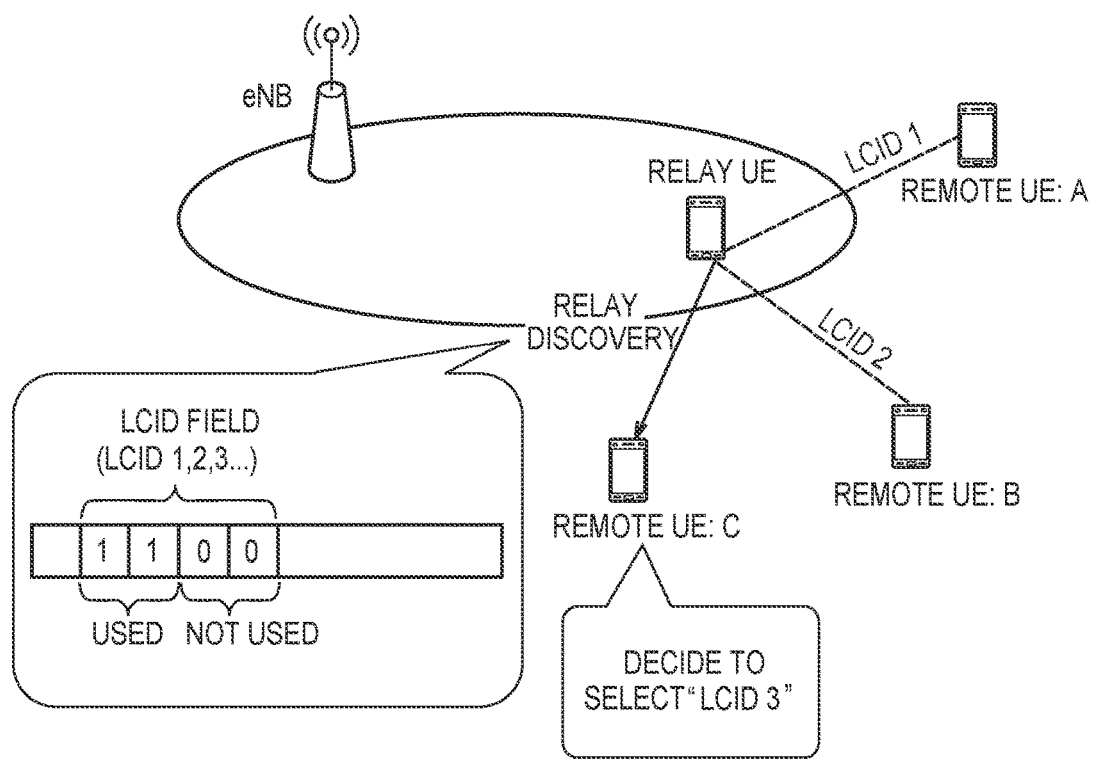
FIG. 23 is a diagram for describing an operation (part 7) according to the second embodiment.

Next, a method of using an LCID (Logical Channel ID) will be described by using FIG. 23. FIG. 23 is a diagram for describing an operation (part 7) according to the second embodiment.

As shown in FIG. 23, the relay UE sets different logical channel identification information (LCID) in each of the plurality of destinations. Specifically, the relay UE sets LCID 1 in the remote UE (A) and LCID 2 in the remote UE (B). LCID 3 and 4 are not used. In this way, the relay UE stores the LCID and the destination (destination ID) in association with each other.

The relay UE transports the data (MAC SDU) of each of the plurality of destinations through a logical channel corresponding to the LCID. Thus, the relay UE transports the data of the remote UE (A) through the logical channel corresponding to the LCID 1. Since the LCID 1 is set in the remote UE (A), the remote UE (A) recognizes the data transported through the logical channel corresponding to the LCID 1 as the data of the remote UE (A), and acquires the data.

The relay UE notifies the usage status of the LCID to a remote UE (C). For example, the relay UE transmits, to the remote UE (C), a bitmap (see FIG. 23) indicating the usage status of the LCID. The relay UE may transmit the bitmap through a discovery message having an LCID field indicating the usage status of the LCID. The bitmap indicating the usage status of the LCID can be stored in the LCID field.

The remote UE (C) selects an LCID that is not used on the basis of the bitmap indicating the usage status of the LCID. For example, the remote UE (C) determines that LCID 3 is to be selected.

The remote UE (C) notifies the selected LCID 3 to the relay UE. The relay UE starts the transport of the data of the remote UE (C) through the logical channel corresponding to the LCID 3.

As described above, since the relay UE transports the data (MAC SDU) of each of the plurality of destinations through the logical channel corresponding to the LCID, it is possible for the relay UE to transmit a plurality of data simultaneously.

Third Embodiment

Next, a third embodiment will be described. In the third embodiment, the description is mainly focused on a case in which simultaneous transmission in a plurality of radio resource pools is permitted. It is noted that description of parts similar to the first and second embodiments will be omitted where appropriate.

(J) Mode 1

A case in which the UE 100-1 performs direct communication in Mode 1, where the eNB 200 specifies a radio resource of direct communication, will be described. A first and a second method that are applicable in Mode 1 will be described. Since the first method is similar to the "(A1) First method" according to the first embodiment, the description is mainly focused on parts that are different. Further, since the second method is similar to the "(A2) Second method" according to the first embodiment, the description is mainly focused on parts that are different.

(J1) First Method

Figure 24:
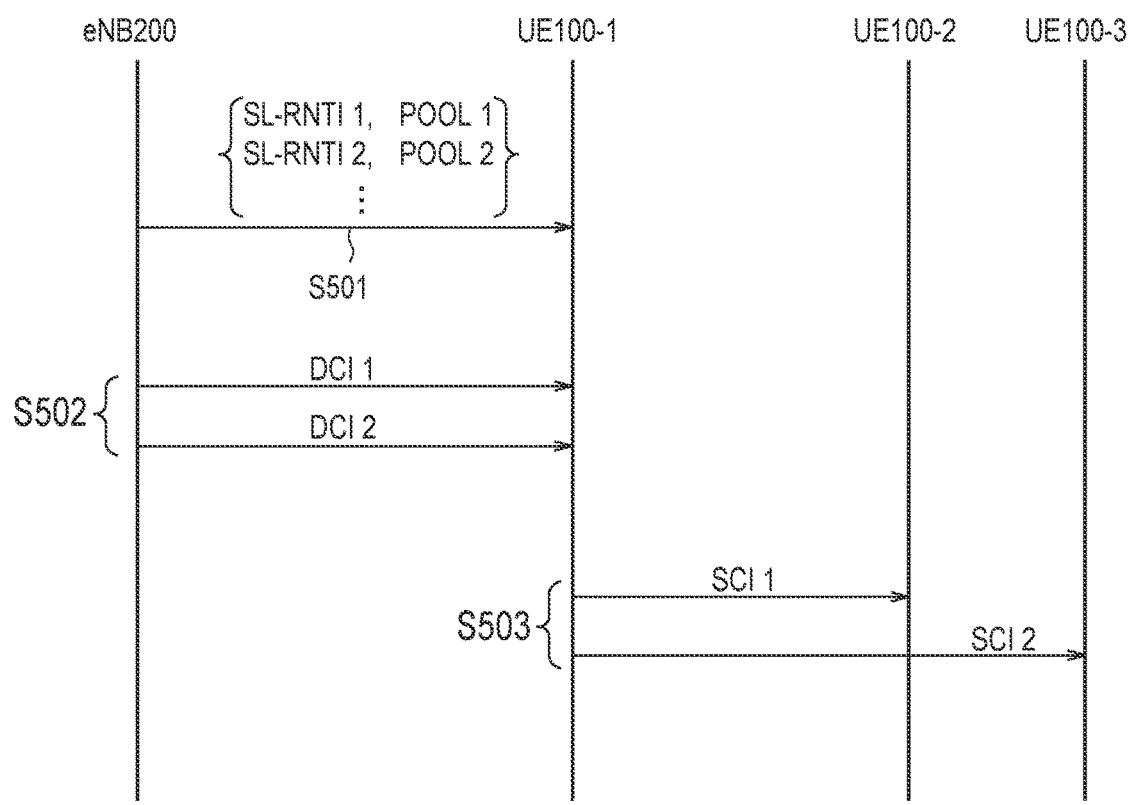
FIG. 24 is a sequence diagram for describing an operation (part 1) according to a third embodiment.

The first method will be described by using FIG. 24. FIG. 24 is a sequence diagram for describing an operation (part 1) according to the third embodiment.

In step S501, the eNB 200 sets (assigns), in the UE 100-1, a plurality of respectively different sets (Mode 1 transmission setting) consisting of a set (combination) of an SL-RNTI and a transmission resource pool. The UE 100-1 sets a plurality of Mode 1 transmission settings. Thus, a plurality of SL-RNTIs are assigned to the UE 100-1.

The eNB 200 reserves a radio resource for each one of the plurality of SL-RNTIs. Here, the eNB 200 reserves a radio resource of a radio resource pool corresponding to the SL-RNTI.

It is noted that same as the "(A1) First method" described above, the eNB 200 may assign a plurality of SL-RNTIs to the UE 100-1 so that the search space of the plurality of SL-RNTIs is associated with a specific SL-RNTI. Further, the eNB 200 may arrange a plurality of DCIs in the search space associated with the specific SL-RNTI.

Step S502 corresponds to step S102. The eNB 200 transmits, to the UE 100-1, a plurality of DCIs consisting of DCI corresponding to each of the plurality of Mode 1 transmission settings. The UE 100-1 receives the plurality of DCIs on the basis of the plurality of SL-RNTIs. The UE 100-1 is allocated with a plurality of radio resources consisting of a radio resource of a transmission resource pool corresponding to each of the plurality of SL-RNTIs.

Step S503 corresponds to step S103.

As described above, since the UE 100-1 is capable of being allocated with a plurality of radio resources, it is possible to suppress the occurrence of a delay in data transmission. Further, since the eNB 200 allocates radio resources, it is possible to reduce the occurrence of interference.

(J2) Second Method

Figure 25:
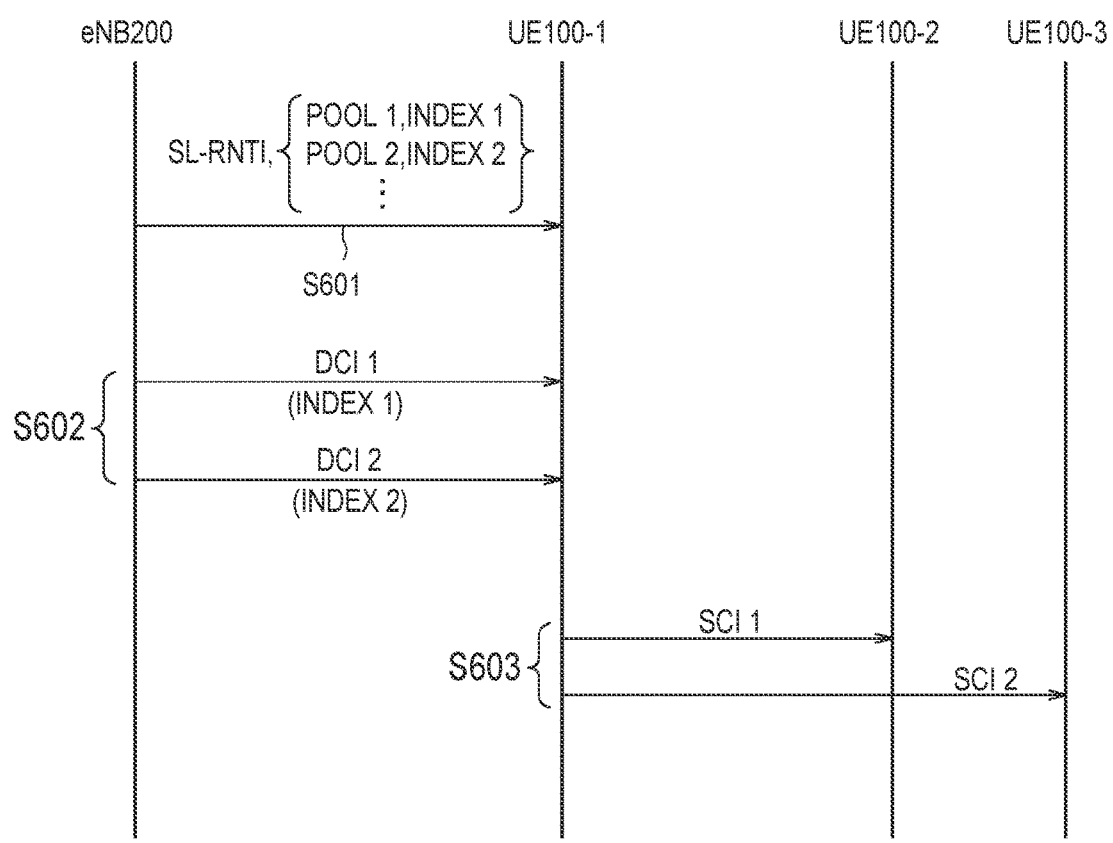
FIG. 25 is a sequence diagram for describing an operation (part 2) according to the third embodiment.
Figure 26:
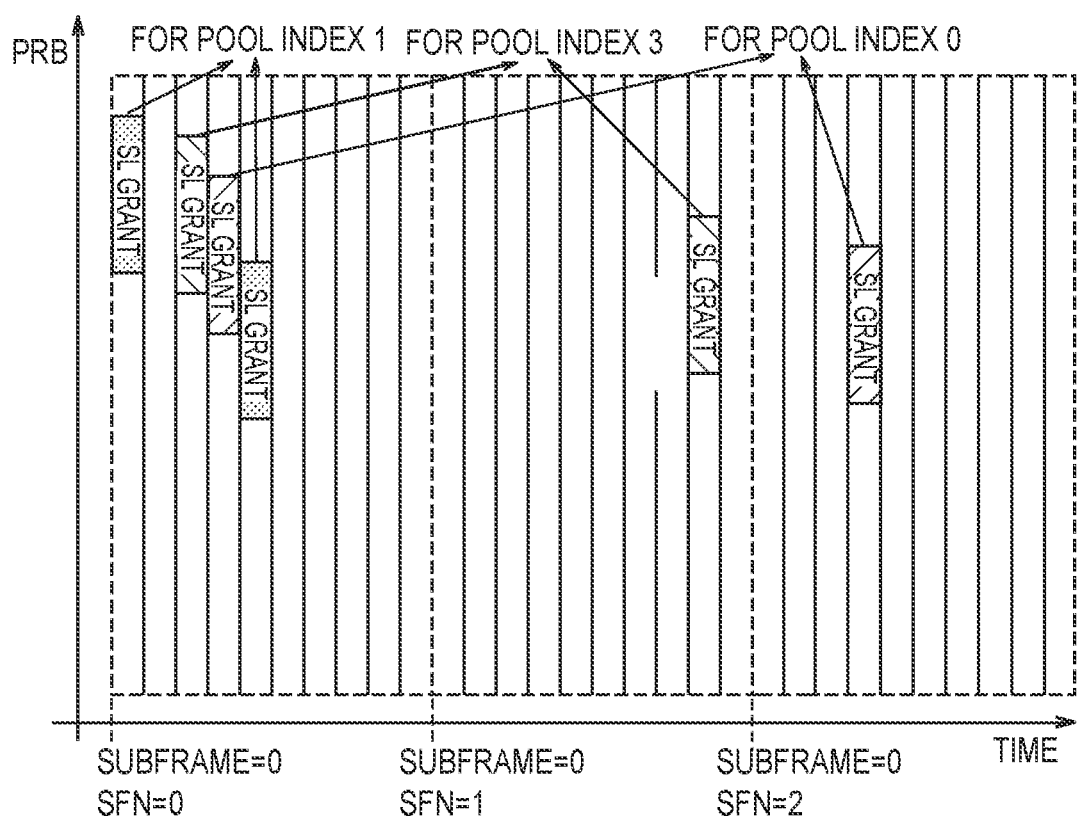
FIG. 26 is a diagram for describing an operation (part 2) according to the third embodiment.

The second method will be described by using FIG. 25 and FIG. 26. FIG. 25 is a sequence diagram for describing an operation (part 2) according to the third embodiment. FIG. 26 is a diagram for describing the operation (part 2) according to the third embodiment.

In step S601, the eNB 200 sets (assigns), in the UE 100-1, a single SL-RNTI, a plurality of radio resource pools associated with the SN-RNTI, and an index of each of the plurality of radio resource pools. The eNB 200 may notify, to the UE 100-1, a correspondence relationship between the plurality of radio resource pools and the index through broadcast. The UE 100-1 sets the SL-RNTI and the plurality of radio resource pools in association with each other.

In step S602, the eNB 200 transmits a plurality of DCIs, and the UE 100-1 receives the plurality of DCIs. Thus, the UE 100-1 acquires allocation information 1 of the radio resource included in DCI 1, and allocation information 2 of the radio resource included in DCI 2.

The UE 100-1 is allocated with a radio resource of the radio resource pool (Pool 1) that is indicated by an index 1 included in the DCI 1, on the basis of the allocation information 1. The UE 100-2 is allocated with a radio resource of the radio resource pool (Pool 2) that is indicated by an index 2 included in the DCI 2, on the basis of allocation information 2.

Step S603 corresponds to step S103.

As described above, since the UE 100-1 is capable of being allocated with a plurality of radio resources, it is possible to suppress the occurrence of a delay in data transmission. Further, since the eNB 200 allocates radio resources, it is possible to reduce the occurrence of interference.

It is noted that as shown in FIG. 26, the information indicating the index may be a time location where the allocation information of a radio resource is arranged. That is, a radio resource pool may be specified by the notification timing of an SL grant (DCI).

For example, the UE 100-1 may determine that the SL grant notified at a predetermined timing by the equation shown below is an SL grant corresponding to which radio resource pool.

(SFN (System Frame Number)×10+subframe)mod
the number of available pools=Index

Thus, the DCI need not necessarily include an index, because of which it is possible to reduce a radio resource amount necessary for transmitting the DCI.

(K) Mode 2

Next, a case in which the UE 100-1 performs direct communication in Mode 2, where the UE 100 selects a radio resource of direct communication, will be described. Since the operation is similar to "(B) Mode 2" according to the first embodiment, the description is mainly focused on parts that are different.

In step S402 of FIG. 14, the eNB 200 transmits, to the UE 100-1, information about whether or not a plurality of radio resource pools are simultaneously available, rather than the permission information. For example, the information is a list indicating a combination of radio resource pools that are simultaneously available, from among a plurality of radio resource pools. Alternatively, the information is a list indicating only the radio resource pools that are simultaneously available, from among the plurality of radio resource pools. The radio resource pools specified in the list are radio resource pools that are permitted to be available simultaneously. An index associated with the radio resource pool may also be specified in the list.

As described above, it is possible for the UE 100-1 to transmit a plurality of SCIs by using a radio resource selected from each of the plurality of radio resource pools. Thus, it is possible to suppress the occurrence of a delay in data transmission. Further, since the UE 100-1 selects a radio resource upon getting the permission of the eNB 200, it is possible to reduce the occurrence of interference.

Fourth Embodiment

Next, a fourth embodiment will be described. The description of contents that are similar to at least any one of the above-described each embodiments will be omitted.

The fourth embodiment relates to a notification, from the eNB 200 (or a cell managed by the eNB 200, same hereinafter) to the UE 100-1, of information about a radio resource that the eNB 200 uses for direct communication with the UE 100-2 when the UE 100-1 relays the transmission and reception of data between the eNB 200 and the UE 100-2 (in other words, when the UE 100-1 operates as a relay UE).

An example of an environment according to the fourth embodiment will be described by using FIGS. 27A and 27B.

Figure 27A:
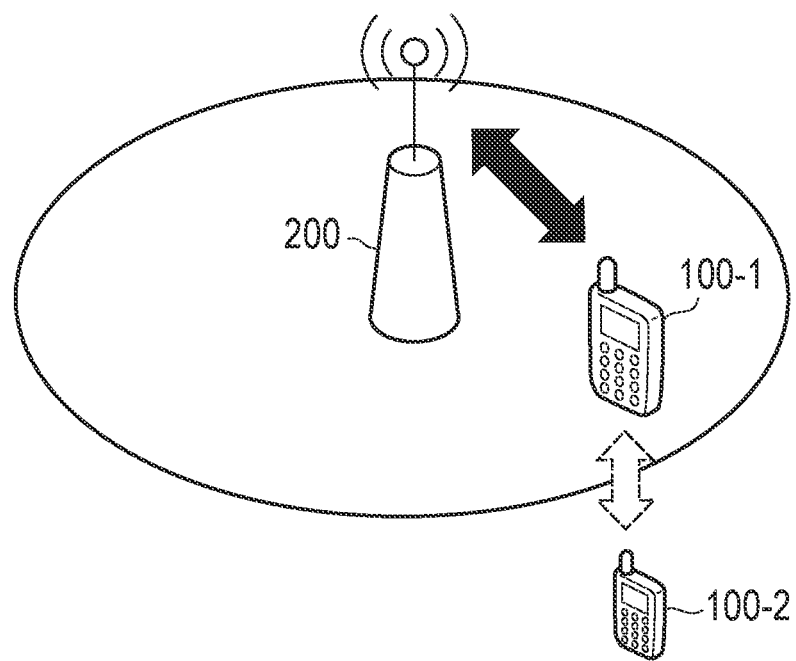
FIGS. 27A and 27B are diagrams for describing an example of an environment according to a fourth embodiment.
Figure 27B:
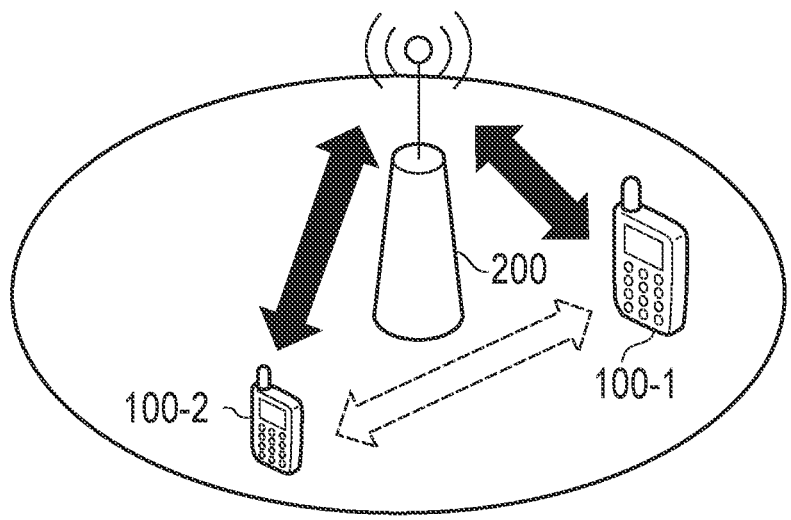

In the fourth embodiment, for example, the eNB 200, the UE 100-1, and the UE 100-2 are in a first environment indicated in FIG. 27A, or a second environment indicated in FIG. 27B.

Firstly, the UE 100-1 and the UE 100-2 of the first environment will be described below.

The UE 100-1 exists in a cell (serving cell) managed by the eNB 200. The UE 100-1 is in a state in which a connection (RRC connection) has been established with the eNB 200 (RRC connection state). Further, the UE 100-1 has a capability of relaying the transmission and reception of data between the eNB 200 and the UE 100-2 through direct communication (D2D communication) with the UE 100-2. That is, the UE 100-1 has a capability of functioning as a relay UE.

The UE 100-2 does not exist in the cell managed by the eNB 200. The UE 100-2 is in a state in which a connection (RRC connection) is not established with the eNB 200. Further, as described earlier, the UE 100-2 has a function of performing indirect transmission and reception of data with the eNB 200 via the UE 100-1. That is, the UE 100-2 has a capability of functioning as a remote UE.

Next, the UE 100-1 and the UE 100-2 of the second environment will be described below.

Same as the first environment, the UE 100-1 exists in the cell managed by the eNB 200. The UE 100-1 is in a state in which a connection is established with the eNB 200.

Unlike the first environment, the UE 100-2 exists in a cell (serving cell) managed by the eNB 200. The UE 100-2 is in a state in which a connection (or RRC connection) has been established with the eNB 200 (RRC connection state).

Operations of the eNB 200, the UE 100-1, and the UE 100-2, when the eNB 200 decides a relay UE and performs relay control in the first embodiment, will be described below by using FIG. 28.

(Selection of Mode)

In step S701, the eNB 200 decides the UE 100-1 as a UE (relay UE) for relaying the transmission and reception of data with the UE 100-2. A sixth embodiment described later, for example, may be used as a method of deciding a relay UE by the eNB 200.

In step S702, the eNB 200 selects either Mode 1 or Mode 2 as the type of resource allocation of direct communication for the UE 100-1.

The eNB 200 may select Mode 2 if at least any one of the below-mentioned conditions is satisfied. The eNB 200 may select Mode 1 if all of the below-mentioned conditions are not satisfied.

The process load of the eNB 200 is equal to or above a predetermined value.

The capacity of radio resources (the amount of available radio resources) of the physical downlink control channel (PDCCH) is equal to or below a predetermined value.

A delay (that is equal to or more than four subframes) caused due to the transmission of the PDCCH is not acceptable.

A reduction in the power consumption of the UE 100-1 is necessary.

The monitoring of the PDCCH by the UE 100-1 is desired to be stopped.

In step S703, the eNB 200 transmits, to the UE 100-1, an RRC Connection Reconfiguration message that includes setting information concerning the mode (Mode 1 or Mode 2) selected in step S702. Specifically, for example, if the eNB 200 selects Mode 1 in step S702, the eNB 200 includes bit in "scheduled" of SL-CommConfig in the RRC Connection Reconfiguration message, and then transmits the message. On the other hand, for example, if the eNB 200 selects Mode 2 in step S702, the eNB 200 includes bit in "ue-Selected" of SL-CommConfig in the RRC Connection Reconfiguration message, and then transmits the message.

The UE 100-1 applies the setting information included in the RRC Connection Reconfiguration message transmitted from the eNB 200 in step S703. Thus, the UE 100-1 understands a type of a radio resource of direct communication allocated to the UE 100-1 is either Mode 1 or Mode 2.

It is noted that if the eNB 200 selects Mode 1 in step S702, the eNB 200 transmits information for designating a radio resource (such as DCI format 5) via the PDCCH, after transmitting the RRC Connection Reconfiguration message in step S703. On the other hand, if the eNB 200 selects Mode 2 in step S702, the eNB 200 includes the information for designating a radio resource allocated in the RRC Connection Reconfiguration message. Therefore, the eNB 200 need not transmit the information for designating the radio resource via the PDCCH, at a later stage.

In step S704, the UE 100-1 performs relay control for relaying data between the UE 100-2, which is a remote UE, and the eNB 200 by using a radio resource of direct communication that has been allocated by the eNB 200.

Therefore, it is possible for the eNB 200 to select an optimum mode in accordance with whether or not it is preferable to separately transmit the information for designating the radio resource for the UE 100-1, and thus implement relay control via the UE 100-1.

(Allocation of Resources)

Next, an example of allocation of a radio resource of direct communication, by the eNB 200 to the UE 100-1, in accordance with the mode selected by the eNB 200 in step S702 and the environment of the UE 100-2 (that is, whether or not the UE 100-2 exists in a cell managed by the eNB 200) will be described by using FIG. 29 to FIG. 32.

(Preconditions)

When the UE 100-2 performs direct communication with the UE 100-1 through relay control in the first environment (when the UE 100-2 does not exist in a cell managed by the eNB 200), the UE 100-2 uses some or all of the radio resources from among radio resources (resource pools) of direct communication that are available for the UE 100-2. The UE 100-2 designates the radio resources of direct communication that are available for the UE 100-2 on the basis of information (such as mode2DataOffsetIndicator and mode2DataSubframeBitmap in Preconfigured parameters, etc.) concerning the radio resources of direct communication that is previously stored in the UE 100-2 (for example, an SIM (Subscriber Identify Module Card, etc.) of the UE 100-2). It is noted that mode2DataOffsetIndicator is an offset value in the time direction, and indicates the start position of the data that is transmitted using a radio resource of Mode 2 from the start position of saPeriod (the period when a radio resource is allocated through sidelink). The mode2DataSubframeBitmap indicates the subframe of a radio resource that is available for the UE 100-2.

The eNB 200 understands the radio resources of direct communication that are available for the UE 100-2 by previously storing, by receiving in the past from the UE 100-2 upon authentication of the UE 100-2, or by acquiring through a request to a server managing the UE 100-2, information that is same as the information concerning the radio resources previously stored in the UE 100-2.

(When Mode 1 is Selected in First Environment)

To ensure that the temporal position (subframe) of the radio resource of direct communication that is allocated to the UE 100-1 does not overlap the temporal position (subframe) of the radio resource of direct communication that is available for the UE 100-2 (in other words, the radio resource used in direct communication that is allocated to the UE 100-1 and the radio resource of direct communication that is available for the UE 100-2 are temporally perpendicular to each other), the eNB 200 selects a pattern (time resource pattern) of the subframe of the radio resource of direct communication that is allocated to the UE 100-1. Specifically, for example, if the subframe of the radio resource of direct communication that is available for the UE 100-2 is expressed by "mode2DataOffsetIndicator=0" and "mode2DataSubframeBitmap={1, 0, 1, 0, 1, 0 . . . }", the eNB 200 selects a pattern in which the bits of the same subframe do not overlap (for example, {0, 1, 0, 1, 0, 1 . . . }, {0, 1, 0, 1, 0, 0 . . . }, or {0, 0, 0, 1, 0, 1 . . . }, etc.) as the time resource pattern of the UE 100-1.

Further, the eNB 200, when the mode2DataOffsetIndicator of the UE 100-2 is equal to 1, the start position of the data that is exchanged by using the radio resource of Mode 2 is different from the start position of the data that is exchanged by using the radio resource of Mode 1. Therefore, the eNB 200 selects a time resource pattern that does not overlap the pattern obtained by moving the last one bit (0) of "mode2DataSubframeBitmap={1, 0, 1, 0, 1, 0 . . . 0}" to the first position {0, 1, 0, 1, 0, 1, 0 . . . }. For example, the eNB 200 selects the time resource pattern as {1, 0, 1, 0, 1, 0 . . . }.

FIG. 29 shows an example of a radio resource of direct communication that is allocated by the eNB 200 to the UE 100-1 so as not to overlap the radio resource of direct communication that is available for the UE 100-2.

In FIG. 29, the horizontal axis is the time axis, and the radio resources in the respective PSSCH of the UE 100-1 and the UE 100-2 do not overlap in the time direction.

After step S703, the eNB 200 transmits through the PDCCH, to the UE 100-1, information (DCI format 5) including the pattern (time resource pattern) of the subframe of the radio resource of direct communication that is allocated to the UE 100-1 that is selected earlier.

Upon receiving the DCI format 5, the UE 100-1 performs relay control in step S704 by using the radio resource corresponding to the pattern of the subframe of the radio resource of direct communication that is allocated to the UE 100-1.

(When Mode 1 is Selected in Second Environment)
(First Operation Example)

To ensure that the temporal positions (subframes) of the radio resources used in direct communication that are allocated to the UE 100-1 and the UE 100-2 do not overlap each other (in other words, the radio resource that is allocated to the UE 100-1 and the radio resource that is allocated to the UE 100-2 are temporally perpendicular to each other), the eNB 200 selects a pattern (time resource pattern) of the subframes of radio resources allocated to the UE 100-1 and the UE 100-2. Specifically, for example, if the eNB 200 selects {0, 1, 0, 1, 0, 1} as the time resource pattern of the UE 100-1, the eNB 200 selects {1, 0, 1, 0, 1, 0} as the time resource pattern of the UE 100-2. That is, the eNB 200 selects the time resource pattern of the UE 100-1 and the time resource pattern of the UE 100-2 so that the bits of the respective same subframes do not overlap each other.

Figure 30:
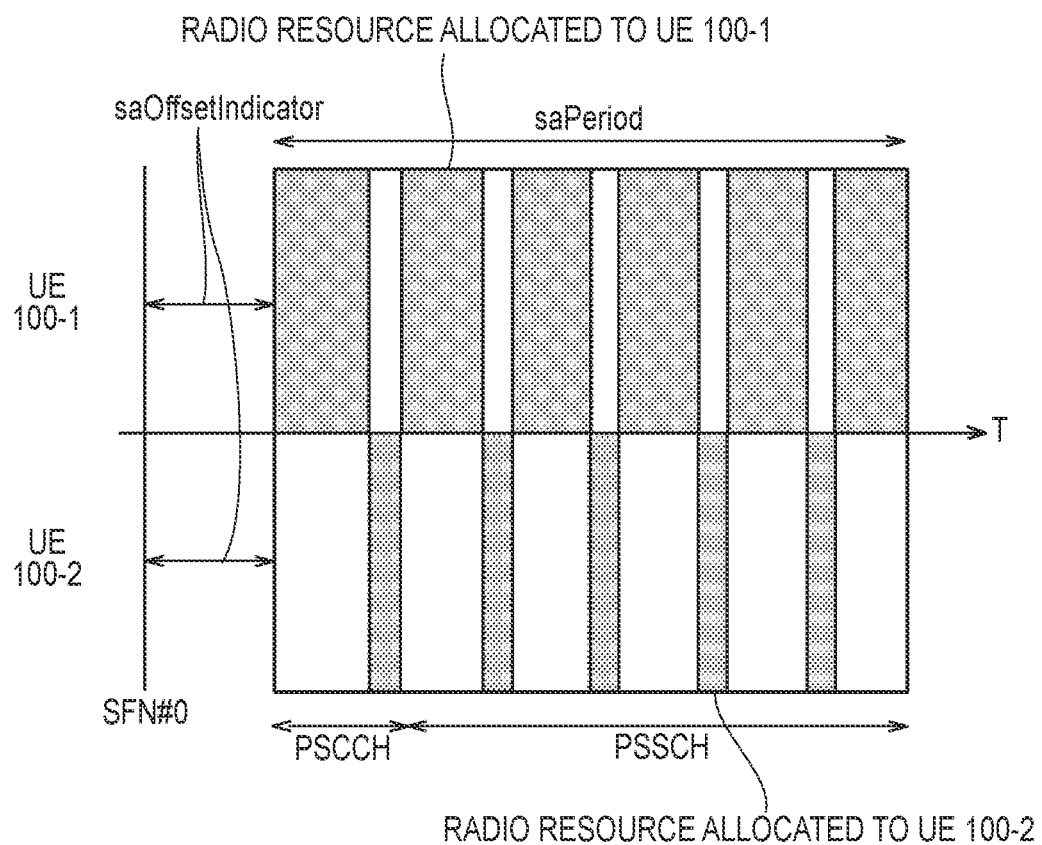
FIG. 30 is a diagram showing an example of allocation of a resource according to the fourth embodiment.

FIG. 30 shows an example of radio resources of direct communication that are allocated by the eNB 200 to the UE 100-1 and the UE 100-2.

In FIG. 30, the horizontal axis is the time axis.

The radio resources in the respective PSSCH of the UE 100-1 and the UE 100-2 do not overlap in the time direction.

After step S703, the eNB 200 transmits respectively through the PDCCH, to the UE 100-1 and the UE 100-2, information (DCI format 5) including the pattern (time resource pattern) of the subframes of radio resources of direct communication allocated to the UE 100-1 and the UE 100-2 that are selected earlier.

(Second Operation Example)

Figure 31:
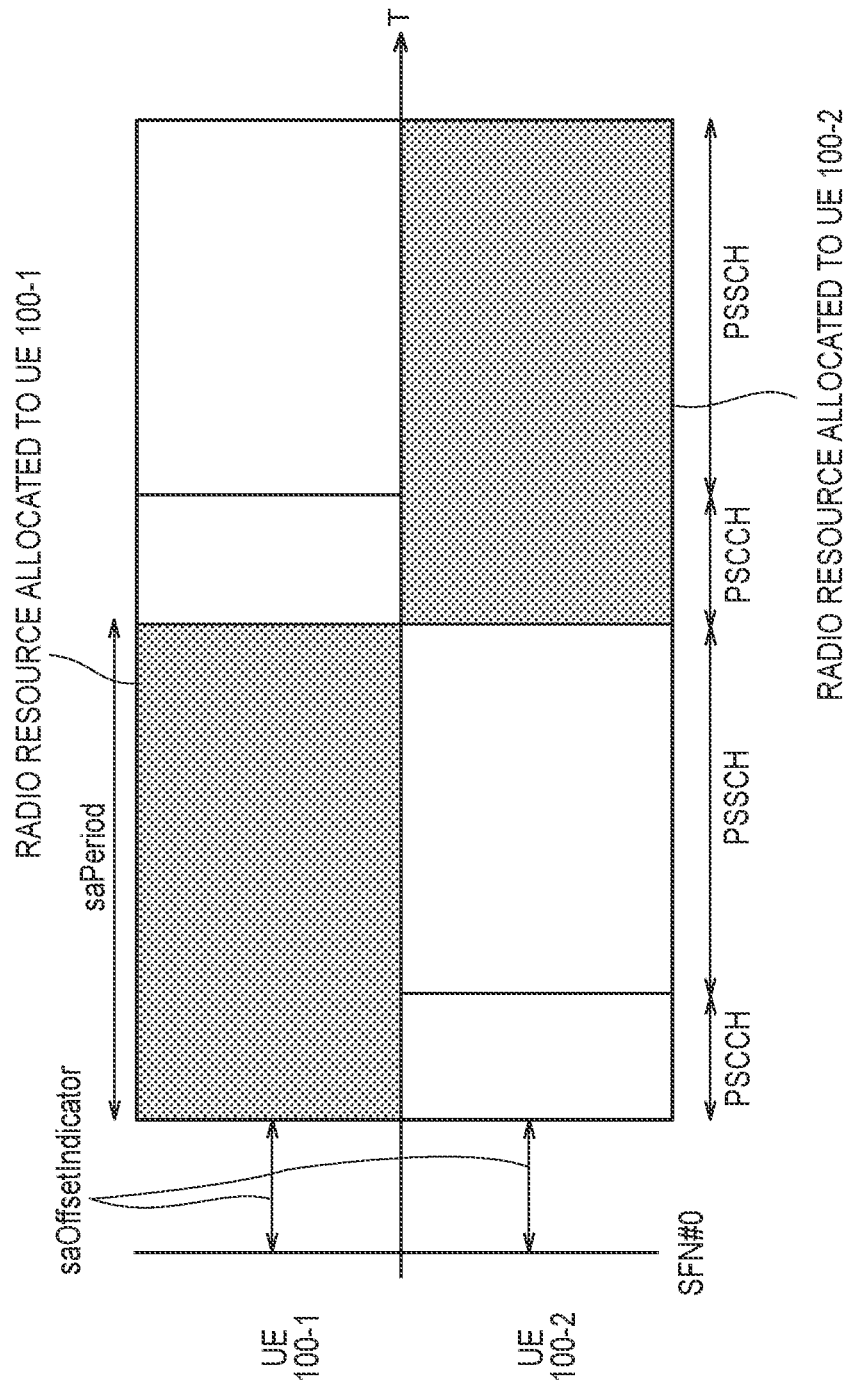
FIG. 31 is a diagram showing an example of allocation of a resource according to the fourth embodiment.

The eNB 200 transmits the DCI format 5 to the UE 100-1 and the UE 100-2 at the respective predetermined timing. Specifically, after step S703 shown in FIG. 28, the eNB 200 transmits, to the UE 100-1, the DCI format 5 in a subframe (for example, the subframe that is five subframes ahead) that is before the subframe before the predetermined subframes (for example, four subframes) from the start position of the saPeriod. On the other hand, the eNB 200 transmits, to the UE 100-2, the DCI format 5 in a subframe (for example, the subframe that is three subframes ahead) that is after the subframe before the predetermined subframes (for example, four subframes) from the start position of the saPeriod. Thus, as shown in FIG. 31, the radio resource allocated to the UE 100-1 is included in the saPeriod. On the other hand, the radio resource allocated to the UE 100-2 is contained in the next saPeriod after the saPeriod in which the radio resource assigned to the UE 100-1 is contained.

Therefore, it is possible to set the temporal position (subframe) of the radio resource allocated to the UE 100-1 and the temporal position (subframe) of the radio resource allocated to the UE 100-2 so as not to overlap each other. Thus, it is possible for the UE 100-1 and the UE 100-2 to avoid overlapping of the respective transmission and reception timing during relay control.

(When Mode 2 is Selected in First Environment)

To ensure that the temporal position (subframe) of the radio resource that is selectable by the UE 100-1 to be used by the UE 100-1 in direct communication does not overlap the temporal position (subframe) of the radio resource used in direct communication that is set beforehand in the UE 100-2 (in other words, the radio resource that is selectable by the UE 100-1 to be used by the UE 100-1 in direct communication and the radio resource used in direct communication that is set beforehand in the UE 100-2 are temporally perpendicular to each other), the eNB 200 sets the subframe of the radio resource that is selectable by the UE 100-1. Specifically, for example, if the subframe of the radio resource used in direct communication that is set beforehand in the UE 100-2 is expressed by "mode2DataOffsetIndicator=0" and "mode2DataSubframeBitmap={1, 0, 1, 0, 1, 0}", the eNB 200 sets the subframe of the radio resource that is selectable by the UE 100-1 so that the bits of the subframes do not overlap each other. For example, the eNB 200 sets "mode2DataOffsetIndicator=0" and "mode2DataSubframeBitmap={0, 1, 0, 1, 0, 1} or {0, 0, 0, 1, 0, 1}". Thus, the respective temporal positions (subframes) of the radio resources is set so as not to overlap each other.

Figure 32:
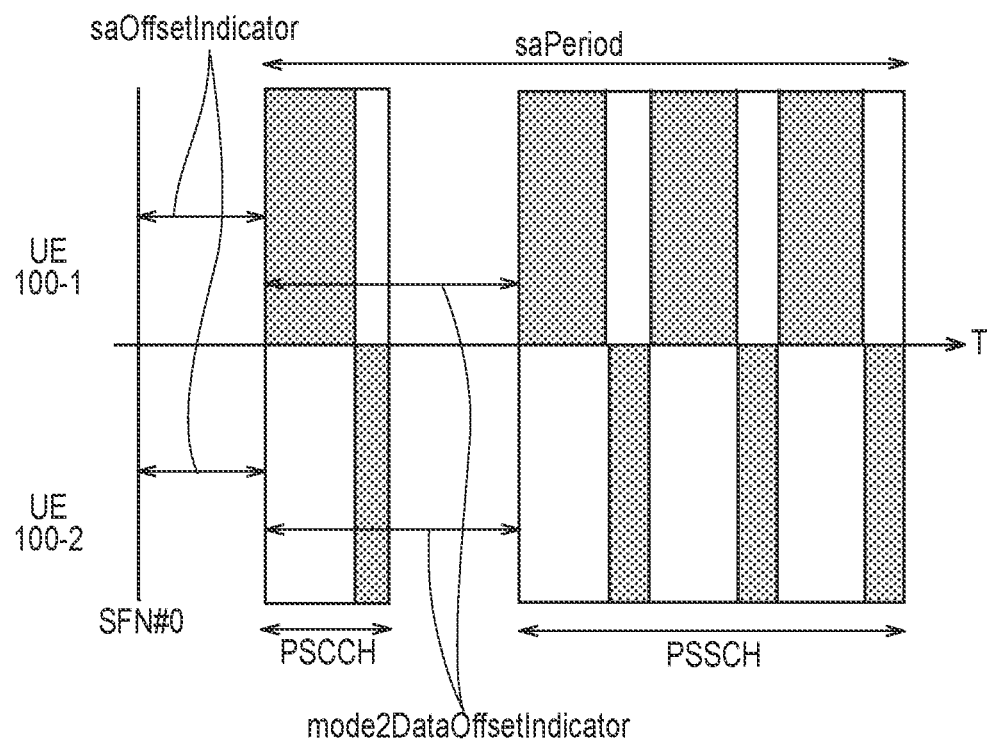
FIG. 32 is a diagram showing an example of allocation of a resource according to the fourth embodiment.

The eNB 200 includes the subframe (mode2DataOffsetIndicator and mode2DataSubframeBitmap) of the radio resource that is selectable by the UE 100-1 that is set as described above in the RRC Connection Reconfiguration message of step S703, and then transmits the message. Thus, as shown in FIG. 32, the position of the resource that is available for direct communication of the UE 100-1 and the position of the resource that is available for direct communication of the UE 100-2 do not overlap each other. Therefore, during the relay control, it is possible to prevent conflict in the direct communication performed by the UE 100-1 and the UE 100-2.

In addition, if the eNB 200 has already set another relay UE, the eNB 200 is capable of setting the subframe of the radio resource that is selectable by the UE 100-1 so as not to overlap (so as to be temporally perpendicular to) the radio resource (resource pool) of the other relay UE.

Specifically, for example, if the subframe of the radio resource used in direct communication that is set beforehand in the subframe 100-1 of the radio resource of another relay UE is expressed by "mode2DataOffsetIndicator=0" and "mode2DataSubframeBitmap={0, 1, 0, 0, 0, 0}", the eNB 200 sets the subframe of the radio resource that is selectable by the UE 100-1 so that the bits of the subframes do not overlap each other. For example, the eNB 200 sets "mode2DataOffsetIndicator=0" and "mode2DataSubframeBitmap={0, 0, 0, 1, 0, 1}".

Thus, it is possible for the UE 100-1 to avoid overlapping of the timing of direct communication with another relay UE in addition to the UE 100-2. It is noted that the above-described fourth embodiment is possible to be similarly applied to the allocation of a radio resource in Sidelink Control (PDSCH) as well.

Fifth Embodiment

Next, a fifth embodiment will be described. The description of contents that are similar to at least any one of the above-described each embodiments will be omitted.

The fifth embodiment relates to a setting of a priority of a radio resource (resource pool) that is allocated by the eNB 200, to the UE 100-1, for direct communication between the UE 100-1 and the UE 100-2, or for the transmission of a discovery signal, and that is capable of selecting a radio resource to be used by the UE 100-1.

An example of an environment according to the fifth embodiment is similar to the example of the environment (the example of the environment shown in FIGS. 27A and 27B) according to the fourth embodiment. Further, the fifth embodiment may be an embodiment where some operations have been added to the fourth embodiment, or may be an embodiment that is independent of the fourth embodiment.

(Setting of Priority of Resource Pool)

In the fifth embodiment, the eNB 200 sets a priority for each resource pool in the plurality of resource pools that are assigned to the UE 100-1. The priority is used for designating which resource pool should be prioritized to be used by the UE to which each resource pool has been assigned, when the subframes of each resource pool overlap each other. The plurality of resource pools include resource pools for the transmission of a discovery signal, and resource pools for direct communication with the UE 100-2.

It is noted that the eNB 200 may decide the priority of the radio resource (resource pool) at the same time as step S702 (selection of the type of the resource to be allocated to the UE 100-1) of the sequence according to the fourth embodiment.

If the eNB 200 sets the priority of each resource pool, then the eNB 200 may include information concerning the priority of the resource pool to be assigned in the RRC Connection Reconfiguration message to be transmitted to the UE 100-1 in step S703 of the fourth embodiment. It is noted that the setting information of a plurality of resource pools (for example, resource pool for the transmission of a discovery signal and resource pools for direct communication) may be included in one RRC Connection Reconfiguration message. In such a case, the information concerning the priority of each resource pool may be included in the setting information of the plurality of resource pools.

Upon receiving the RRC Connection Reconfiguration message that is transmitted from the eNB 200 in step S703 of the sequence according to the fourth embodiment, the UE 100-1 performs transmission of the discovery signal or direct communication by using each resource pool on the basis of the priority of each resource pool included in the message.

Specifically, for example, if the priority of the resource pool for the transmission of the discovery signal is set to 1, and the priority of the resource pool for direct communication is set to 2 in the received RRC Connection Reconfiguration message, the UE 100-1 uses a resource pool with higher priority with regard to the location (subframe) where the resource pools overlap each other in the time direction. That is, at the location where the resource pools overlap each other in the time direction, the UE 100-1 performs transmission of a discovery signal by using the resource pool for the transmission of the discovery signal.

The eNB 200 may decide the priority of each resource pool on the basis of predetermined information.

The predetermined information, for example, may be at least any one of a type (such as a notification service) and reception success rate of a service that is implemented by using each resource pool, groups and users that use the resource pool, as well as a data amount that is transmitted by using the resource pool.

It is noted that the eNB 200 may understand the predetermined information through SidelinkUEInformation that is transmitted from the UE 100-1.

By setting a priority for each radio resource, the eNB 200 is capable of indirectly specifying, to the UE 100-1, a resource pool to be used at the location where the respective resource pools temporally overlap each other, and thus is capable of controlling the use of flexible resource pools.

(Setting of Repetition Frequency)

When the eNB 200 selects Mode 1 in step S702 according to the sequence of the fourth embodiment, the eNB 200 may set the repetition frequency (numRepetition) in the time direction of the pattern (time resource pattern) of the subframe of the radio resource allocated to the UE 100-1.

Specifically, the eNB 200 may include the repetition frequency (numRepetition) of the pattern (time resource pattern) of the subframe of the radio resource in the RRC Connection Reconfiguration message that is transmitted to the UE 100-1 in step S703 according to the sequence of the fourth embodiment. For example, if the numRepetition included in the RRC Connection Reconfiguration message is 3, the UE 100-1 recognizes that the frequency of repetition of the pattern (time resource pattern) of the subframe of the radio resource that has been allocated is 3. That is, the UE 100-1 does not perform direct communication (or restricts the direct communication) by using the subframe that is three repetitions after the subframe of the radio resource from the start of the saPeriod, in accordance with the time resource pattern.

Further, instead of including the repetition frequency (numRepetition) in the RRC Connection Reconfiguration message, the eNB 200 may include the repetition frequency in SCI format 0 that is transmitted by specifying the transmission timing by the DCI Format 5 transmitted via the PDCCH after the RRC Connection Reconfiguration message.

It is noted that the above-described case is applicable even when the eNB 200 selects Mode 2 as the type of the allocation resource for the UE 100-1 in step S702 of the sequence according to the fourth embodiment.

Specifically, the UE 100-1 recognizes that the radio resource allocated in accordance with mode2DataSubframeBitmap starts from the point of addition of mode2DataOffsetIndicator to the point of start of the saPeriod included in the RRC Connection Reconfiguration message received from the eNB 200, and the allocated resource is terminated at the point where the repetition frequency expires. That is, the UE 100-1 does not recognize the radio resources after the point of expiry of the repetition frequency as radio resources allocated to the UE 100-1, and does not perform direct communication (prohibits direct communication) by using the radio resources.

Therefore, by setting the repetition frequency for the radio resources allocated to the UE 100-1, the eNB 200 is capable of implementing a flexible allocation of radio resources to the UE 100-1.

(Setting of Repetition Pattern)

When the eNB 200 selects Mode 1 in step S702 according to the sequence of the fourth embodiment, the eNB 200 may set a pattern (time repetition pattern) in which the pattern (time resource pattern) of the subframe of the radio resource allocated to the UE 100-1 is repeated in the time direction.

Specifically, the eNB 200 may include information (time repetition pattern) about the pattern in which the pattern of the subframe of the radio resource is repeated in the time direction, in the DCI format 5 that is transmitted via the PDCCH after the RRC Connection Reconfiguration message transmitted in step S703 in the fourth embodiment, or in the SCI format 0 that is transmitted by specifying the transmission timing by the DCI format 5. For example, upon receiving "time repetition pattern={0, 1, 1, 0}" from the eNB 200, the UE 100-1 does not recognize the radio resources corresponding to the pattern of the subframe of the first and the fourth radio resources from the point of start of the saPeriod as radio resources allocated to the UE 100-1. On the other hand, the UE 100-1 recognizes the radio resources corresponding to the pattern of the subframe of the second and the third radio resources as radio resources allocated to the UE 100-1. That is, the UE 100-1 recognizes the repetition locations having the bits of the time repetition pattern from the pattern (time resource pattern) of the subframe of the radio resources is a radio resource allocated to the UE 100-1. On the other hand, the UE 100-1 that recognizes the repetition locations not having the bits of the time repetition pattern from the pattern (time resource pattern) of the subframe of the radio resources is not a radio resource allocated to the UE 100-1, does not perform direct communication (prohibits direct communication).

Therefore, by setting the repetition pattern for the radio resources allocated to the UE 100-1, the eNB 200 is capable of implementing a flexible allocation of radio resources to the UE 100-1.

Sixth Embodiment

The sixth embodiment relates to an operation by which the eNB 200 decides the UE to be operated as the relay UE.

An example of an environment according to the sixth embodiment will be described by using FIGS. 33A and 33B.

Figure 33A:
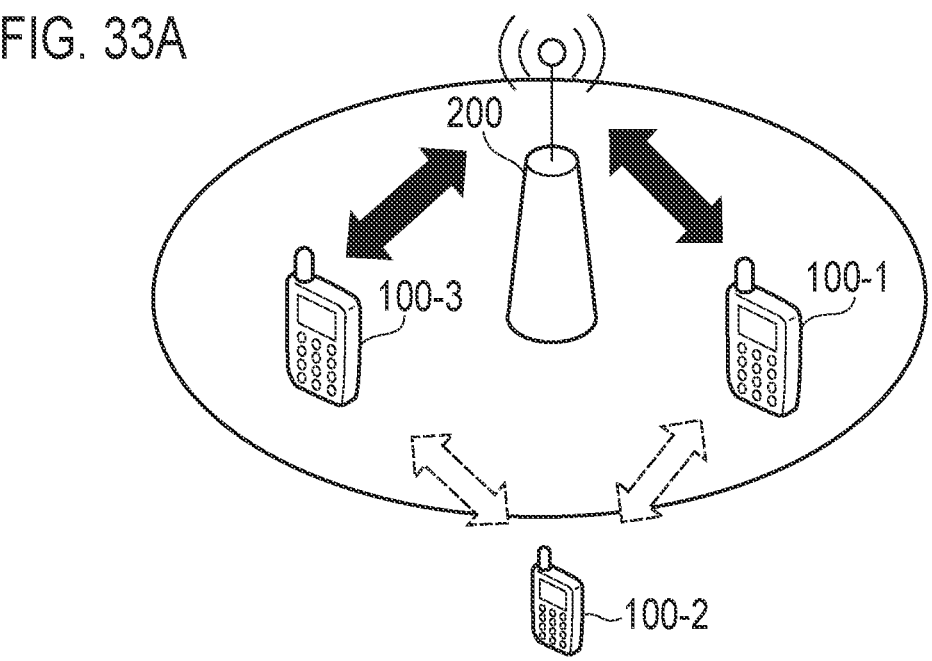
FIGS. 33A and 33B are diagrams for describing an example of an environment according to a sixth embodiment.
Figure 33B:
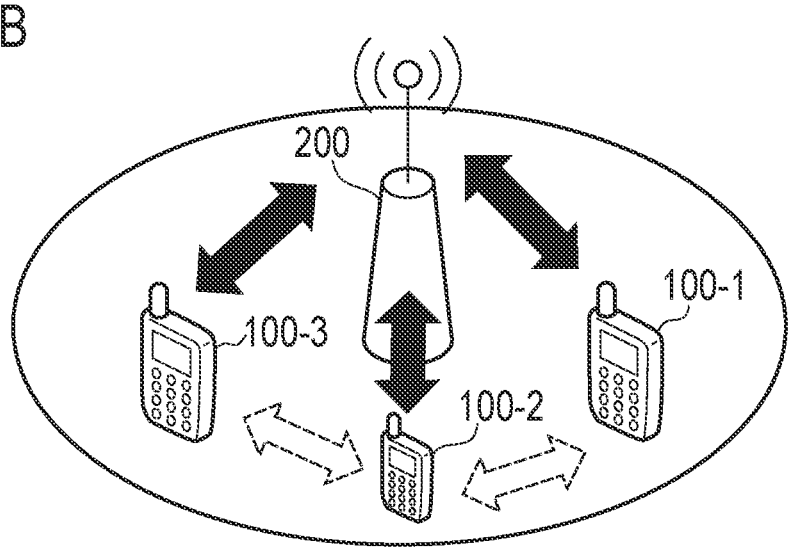

In the sixth embodiment, for example, the UE 100-1, the UE 100-2, and the UE 100-3 are in a first environment indicated in FIG. 33A, or a second environment indicated in FIG. 33B.

The UE 100-1 to the UE 100-3 of the first environment will be described below.

The UE 100-1 and the UE 100-2 are in an environment similar to the first environment in the first embodiment. That is, the UE 100-1 exists in the cell managed by the eNB 200. The UE 100-2 does not exist in the cell managed by the eNB 200.

Same as the UE 100-1, the UE 100-3 exists in the cell managed by the eNB 200. The UE 100-3 has a capability of functioning as a relay UE.

Next, the UE 100-1 to the UE 100-3 of the second environment will be described below.

The UE 100-1 and the UE 100-3 are in the same environment as the first environment.

Unlike the first environment, the UE 100-2 exists in the cell (serving cell) managed by the eNB 200. The UE 100-2 is in a state in which a connection (or RRC connection) has been established with the eNB 200 (RRC connection state).

A plurality of examples of the operation of the eNB 200 and the UE 100-1 to the UE 100-3 when the eNB 200 decides the UE to be operated as the relay UE in the sixth embodiment will be described below by using FIG. 34 to FIG. 39.

In the example of the operation shown in FIG. 34 from among the plurality of examples of the operation, the UE 100-1 to the UE 100-3 are in the second environment (the UE 100-2 exists in the cell managed by the eNB 200).

In step S711, the eNB 200 notifies, to the UE 100-2, a threshold value (Threshold) for comparing with a measured value of a signal from the eNB 200. As an example, the threshold value may be a threshold value of the reception level (RSRP: Reference Signal Received Power and/or RSRQ: Reference Signal Received Quality), for example. The UE 100-2 may be a UE that the eNB 200 selects as a UE that must be a candidate of the remote UE.

In step S712, the UE 100-2 compares the measured value of a signal from the eNB 200 and the threshold value received from the eNB 200 in step S711. The UE 100-2 determines whether or not the measured value falls below the threshold value.

If the measured value falls below the threshold value (S712 YES), then in step S713, the UE 100-2 requests a relay control to the eNB 200.

On the other hand, if the measured value does not fall below the threshold value (S712 NO), then the UE 100-2 again continues with the measurement of the signal from the eNB 200.

In step S714, the eNB 200 requests the transmission of a sidelink synchronization signal (SLSS) and/or a discovery signal to the UE 100-1 and the UE 100-3 in response to the request for relay control from the UE 100-2.

In step S715, the UE 100-1 and the UE 100-3 broadcast a sidelink synchronization signal and/or a discovery signal in response to the request from the eNB 200.

In step S716, the UE 100-2 performs measurement of the sidelink synchronization signal and/or the discovery signal that are/is broadcast from the UE 100-1 and the UE 100-3. Measurement, for example, refers to the measurement of the reception level (RSRP and/or RSRQ).

In step S717, the UE 100-2 reports, to the eNB 200, measurement results (a measurement report) of the measurement performed in step S16.

In step S718, the eNB 200 decides the UE 100-1 as the relay UE on the basis of the measurement report received from the UE 100-2. The eNB 200, for example, compares the measured value of the signal from the UE 100-1 with the measured value of the signal from the UE 100-3, which are included in the measurement report received from the UE 100-2. Since the measured value of the signal from the UE 100-1 is larger, the eNB 200 may decide the UE 100-1 as the relay UE. Further, the eNB 200 may decide the UE that would be the relay UE on the basis of the measurement results of the UE 100-1 and the UE 100-3 of the signal transmitted from the eNB 200. Further, the eNB 200 may decide the UE that would be the relay UE from among the UEs selected as candidates for the remote UE on the basis of the number of UEs that are in the proximity of the UE 100-1 and the UE 100-3, respectively. Further, the eNB 200 may decide the UE that would be the relay UE on the basis of the transmissible range (Range) of the UE 100-1 and the UE 100-3 that is designated on the basis of the reception result of the discovery signal transmitted by the UE 100-1 and the UE 100-3. Moreover, the eNB 200 may decide the UE that would be the relay UE depending on the traffic amount of the remote UE.

In step S719, the eNB 200 transmits an RRC Connection Reconfiguration message to the UE 100-1 that is decided to be the relay UE. The RRC Connection Reconfiguration message includes setting information for operation as the relay UE. The contents of the RRC Connection Reconfiguration message may be the same as the fourth embodiment.

Figure 35:
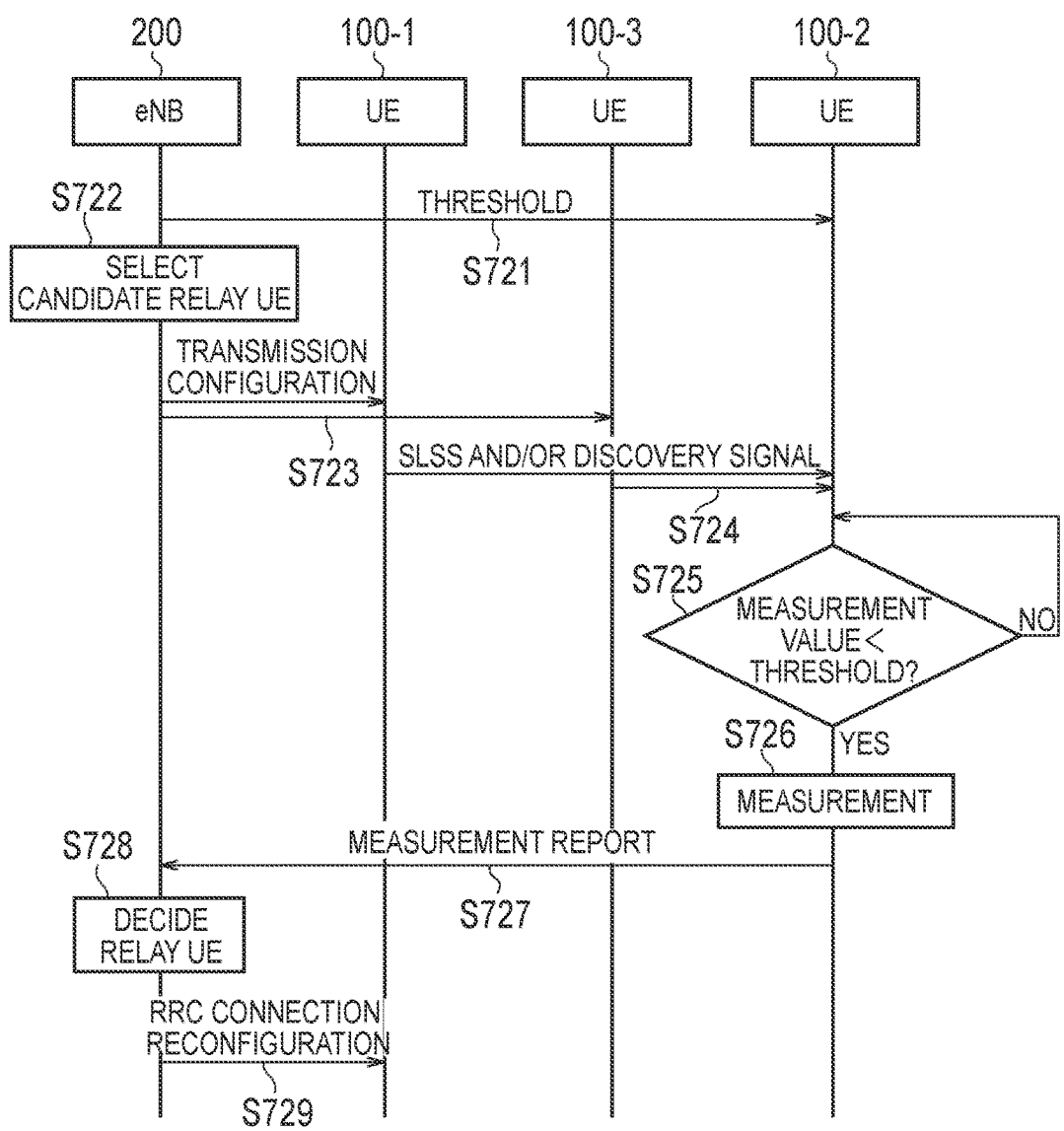
FIG. 35 is a diagram showing an example of a sequence according to the sixth embodiment.

In the example of the operation shown in FIG. 35 from among the plurality of examples of the operation, the UE 100-1 to the UE 100-3 are in the second environment (the UE 100-2 exists in the cell managed by the eNB 200).

Step S721 is similar to step S711 in FIG. 34.

In step S722, the eNB 200 selects the UE 100-1 and the UE 100-3 as candidates of the relay UE.

In step S723, the eNB 200 transmits, to the UE 100-1 and the UE 100-3 that have been selected in step S722, settings for transmitting a sidelink synchronization signal and/or a discovery signal.

In step S724, the UE 100-1 and the UE 100-3 start the broadcast of the sidelink synchronization signal and/or the discovery signal on the basis of the settings transmitted from the eNB 200.

In step S725, the UE 100-2 compares the measured value of the signal transmitted from the eNB 200 and the threshold value received from the eNB 200 in step S721. The UE 100-2 determines whether or not the measured value falls below the threshold value.

If the UE 100-2 determines that the measured value falls below the threshold value (S725 YES), then in step S726, the UE 100-2 performs measurement of the sidelink synchronization signal and/or the discovery signal that are/is broadcast from the UE 100-1 and the UE 100-3.

On the other hand, if the UE 100-2 determines that the measured value does not fall below the threshold value (S725 NO), then the UE 100-2 continues with the measurement of the signal from the eNB 200.

In step S727, the UE 100-2 reports, to the eNB 200, the measurement results (measurement report) of the measurement performed in step S726.

Steps S728 and S729 are similar to steps S718 and S719 shown in FIG. 34.

Figure 36:
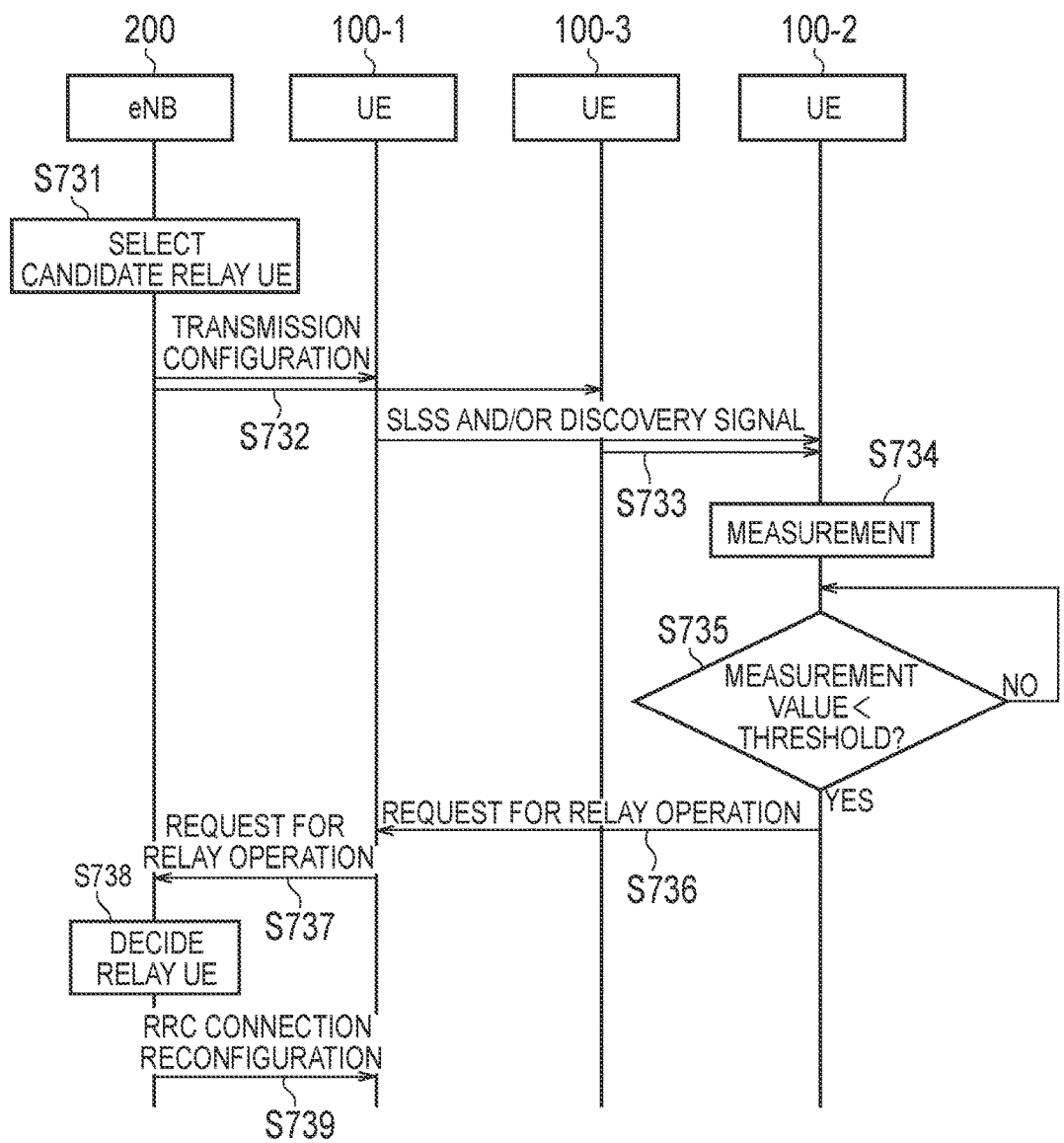
FIG. 36 is a diagram showing an example of a sequence according to the sixth embodiment.

In the example of the operation shown in FIG. 36 from among the plurality of examples of the operation, the UE 100-1 to the UE 100-3 may be the UEs of either the first environment or the second environment.

Steps S731 to S733 are similar to steps S722 to S724 shown in FIG. 35.

In step S734, the UE 100-2 measures the sidelink synchronization signal and/or the discovery signal that are/is broadcast from the UE 100-1 and the UE 100-3. Measurement, for example, refers to the measurement of the reception level (RSRP and/or RSRQ).

In step S735, the UE 100-2 determines whether or not the measured value in step S734 exceeds the threshold value. The threshold value is set on the basis of the information that is stored beforehand in a SIM of the UE 100-2 (U-SIM: Universal-Subscriber Identity Module Card).

In step S735, if the UE 100-2 determines that the measured value of the sidelink synchronization signal and/or the discovery signal received from the UE 100-1 exceeds the threshold value (step S735 YES), then in step S736, the UE 100-2 requests the UE 100-1 to perform relay control.

On the other hand, if the UE 100-2 determines that the measured value of the sidelink synchronization signal and/or the discovery signal received from the UE 100-1 and the UE 100-3 does not exceed the threshold value (step S735 NO), the UE 100-2 continues with the measurement of the sidelink synchronization signal and/or the discovery signal received from the UE 100-1 and the UE 100-3.

In step S737, upon receiving the request for relay control from the UE 100-2, the UE 100-1 transfers the request to the eNB 200.

In step S738, upon receiving the request for relay control from the UE 100-2, which is transferred from the UE 100-1, the eNB 200 decides the UE 100-1 as the relay UE.

Step S739 is similar to step S719.

Figure 37:
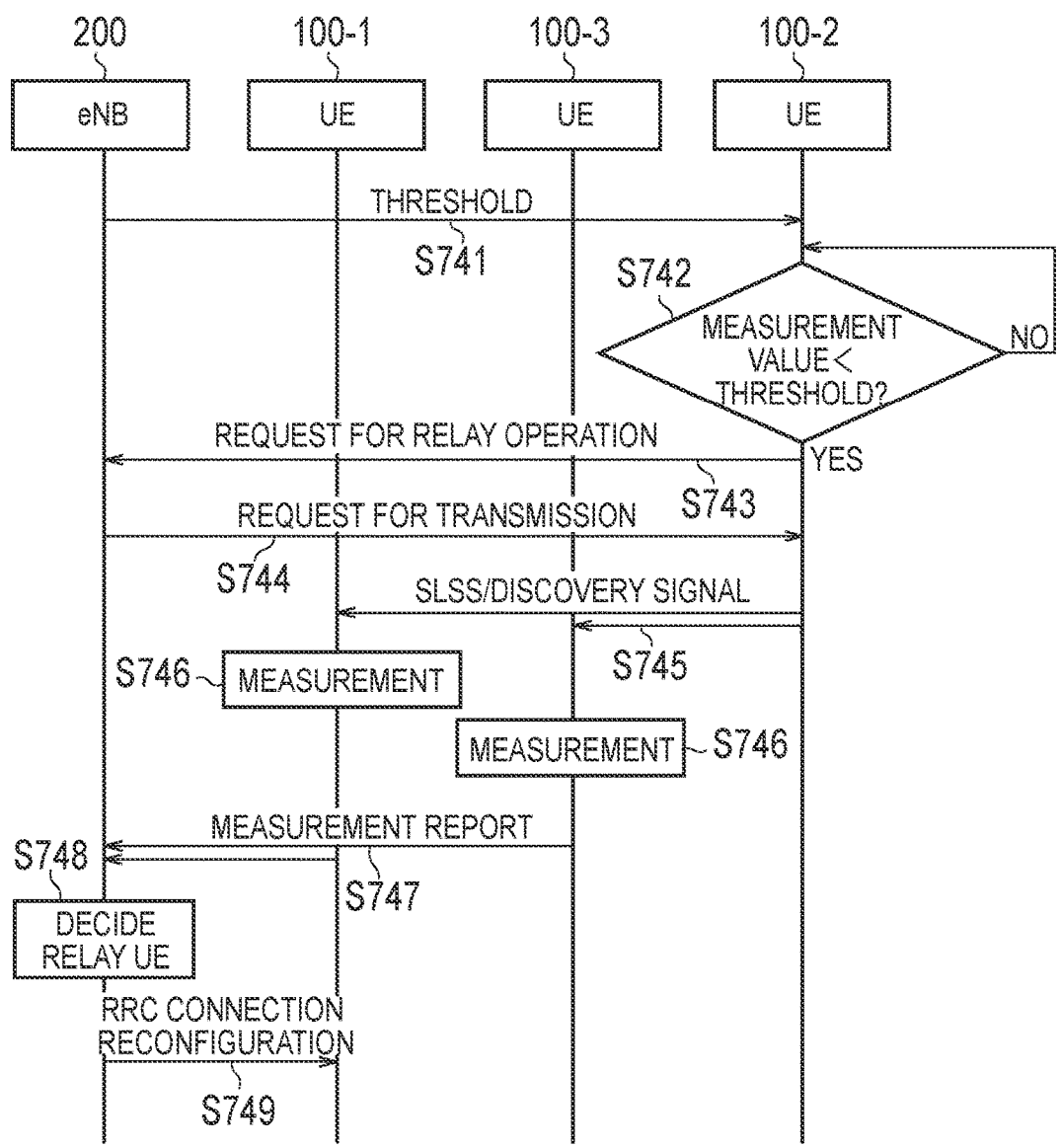
FIG. 37 is a diagram showing an example of a sequence according to the sixth embodiment.

In the example of the operation shown in FIG. 37 from among the plurality of examples of the operation, the UE 100-1 to the UE 100-3 are in the second environment (the UE 100-2 exists in the cell managed by the eNB 200).

Steps S741 to S743 are similar to steps S711 to S713 shown in FIG. 34.

In step S744, the eNB 200 requests the transmission of a sidelink synchronization signal (SLSS) and/or a discovery signal to the UE 100-2 in response to the request for relay control from the UE 100-2.

In step S745, the UE 100-2 broadcasts the sidelink synchronization signal and/or the discovery signal in response to the request from the eNB 200.

In step S746, the UE 100-1 and the UE 100-3 perform measurement of the sidelink synchronization signal and/or the discovery signal broadcast from the UE 100-2. Measurement, for example, refers to the measurement of the reception level (RSRP and/or RSRQ).

In step S747, the UE 100-1 and the UE 100-3 report, to the eNB 200, the measurement results (measurement report) of the measurement performed in step S746.

In step S748, the eNB 200 decides the UE 100-1 as the relay UE on the basis of the measurement report received from the UE 100-1 and the UE 100-3. The eNB 200, for example, compares the measured value of the signal from the UE 100-2 that is included in the measurement report received from the UE 100-1, and the measured value of the signal from the UE 100-2 that is included in the measurement report received from the UE 100-3, and since the measured value of the signal from the UE 100-2 that is included in the measurement report received from the UE 100-1 is higher, the eNB 200 may decide the UE 100-1 as the relay UE.

Step S749 is similar to step S719 shown in FIG. 34.

Figure 38:
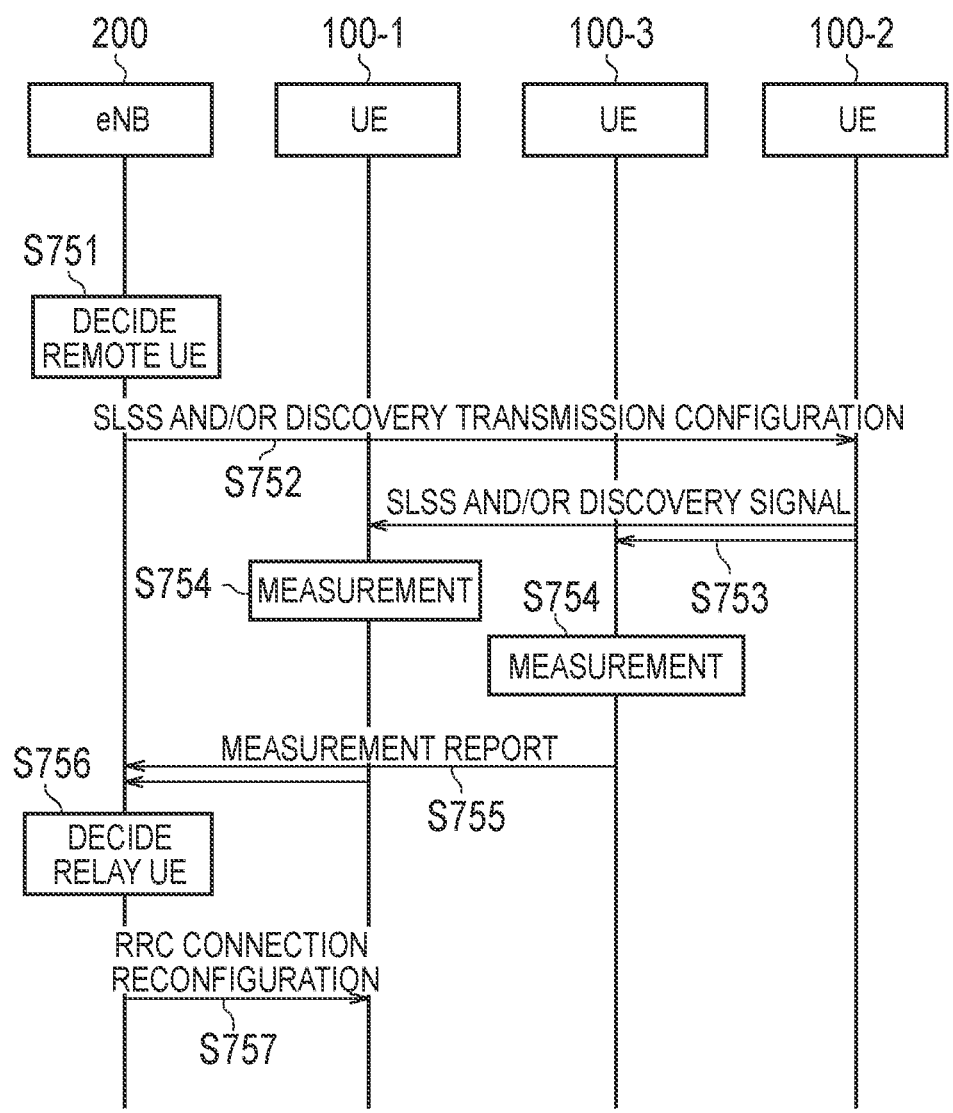
FIG. 38 is a diagram showing an example of a sequence according to the sixth embodiment.

In the example of the operation shown in FIG. 38 from among the plurality of examples of the operation, the UE 100-1 to the UE 100-3 are in the second environment (the UE 100-2 exists in a cell managed by the eNB 200).

In step S751, the eNB 200 decides the UE 100-2 as the remote UE. The eNB 200, for example, receives, from the UE 100-2, the measurement report including the measurement result of the signal from the eNB 200. If the measurement result is lower (worse) than a predetermined value, the eNB 200 may decide the UE 100-2 as the remote UE.

In step S752, the eNB 200 transmits, to the UE 100-2, setting information concerning a sidelink synchronization signal and/or a discovery signal.

In step S753, the UE 100-2 applies the setting information received from the eNB 200, and broadcasts the sidelink synchronization signal and/or the discovery signal.

Steps S754 to S757 are similar to steps S746 to S749.

Figure 39:
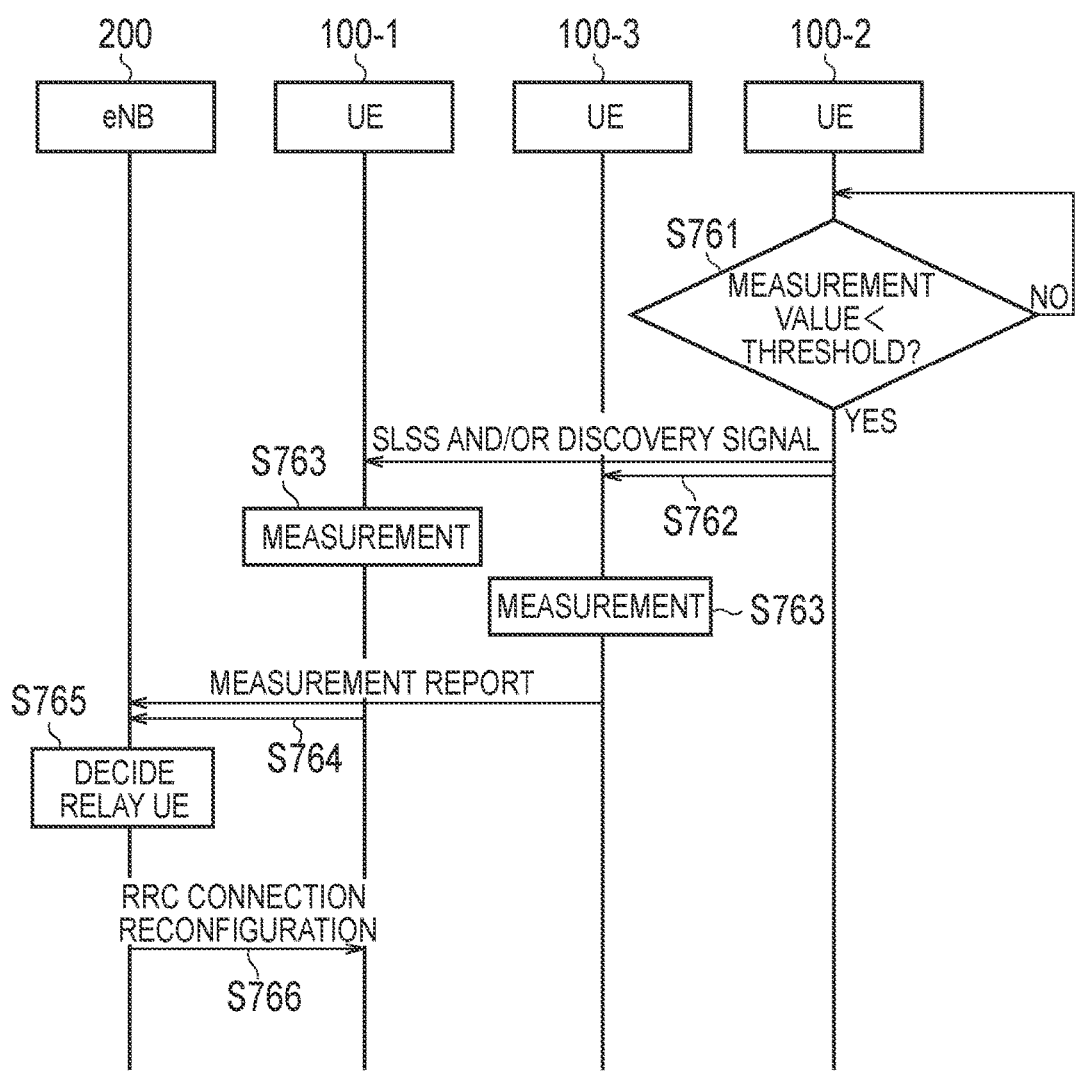
FIG. 39 is a diagram showing an example of a sequence according to the sixth embodiment.

In the example of the operation shown in FIG. 39 from among the plurality of examples of the operation, the UE 100-1 to the UE 100-3 may be the UEs of either the first environment or the second environment.

In step S761, the UE 100-2 compares the measured value of the signal from the eNB 200 and the threshold value received beforehand from the eNB 200. The UE 100-2 determines whether or not the measured value falls below the threshold value.

If the UE 100-2 determines that the measured value falls below the threshold value (S761 YES), then in step S713, the UE 100-2 broadcasts the sidelink synchronization signal and/or the discovery signal.

On the other hand, if the UE 100-2 determines that the measured value does not fall below the threshold value (S761 NO), then the UE 100-2 again continues with the measurement of the signal from the eNB 200.

Steps S762 to S766 are similar to steps S745 to S749.

As a result of the sixth embodiment, it is possible for the eNB 200 to select a UE that would be appropriate to be the remote UE as the remote UE from the plurality of UEs, and thus implement the relay control.

(Additional Example of Sixth Embodiment)

An additional example of the sixth embodiment relates to an operation in which upon deciding the UE 100-1 as the remote UE in the sixth embodiment, the eNB 200 further determines whether or not the UE 100-1 becomes the remote UE.

Figure 40:
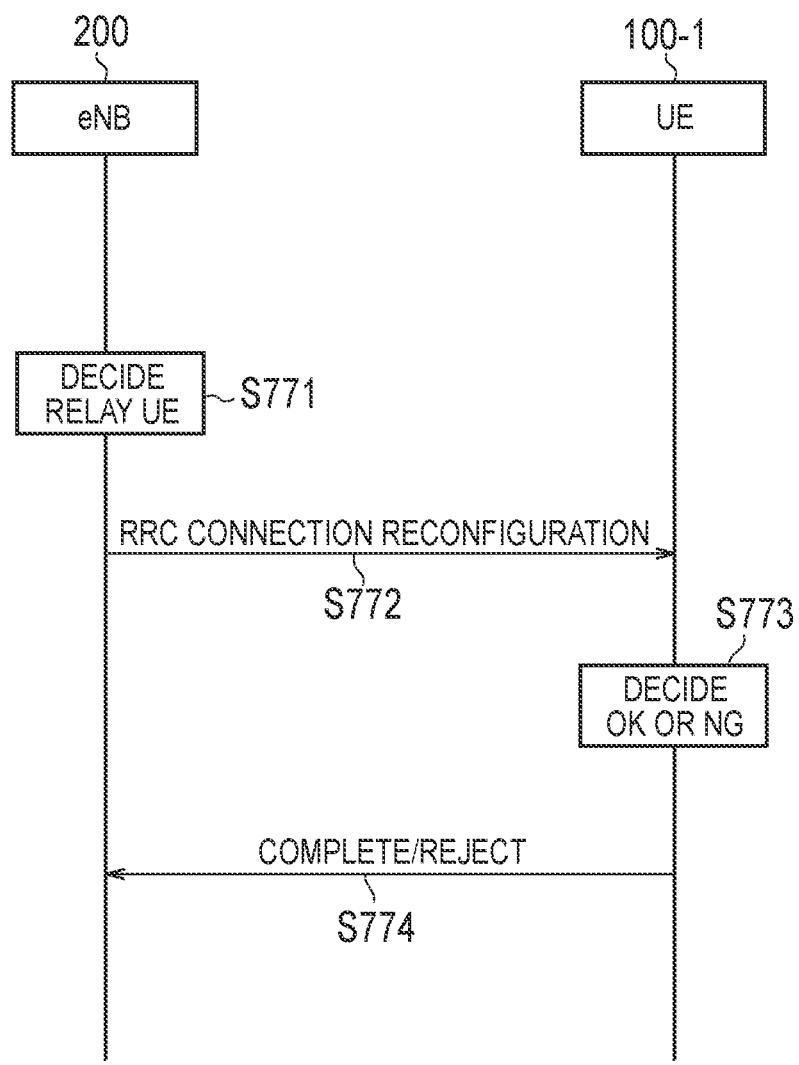
FIG. 40 is a diagram showing an example of a sequence according to an additional example of the sixth embodiment.

An example of operations of the eNB 200 and the UE 100-1 will be described below by using FIG. 40.

Steps S771 and S772 correspond to steps S718 and S719 of FIG. 34, steps S728 and S729 of FIG. 35, steps S738 and S739 of FIG. 36, steps S748 and S749 of FIG. 37, steps S756 and S757 of FIG. 38, and steps S765 and S766 of FIG. 39.

In step S773, the UE 100-1 determines whether or not to operate as the relay UE (in other words, whether or not to apply a settings included in the RRC Connection Reconfiguration message received in step S772).

In step S774, the UE 100-1 transmits, to the eNB 200, the result determined in step S773 (or whether or not the setting based on the RRC Connection Reconfiguration message is completed in view of the determined result).

Figure 41:
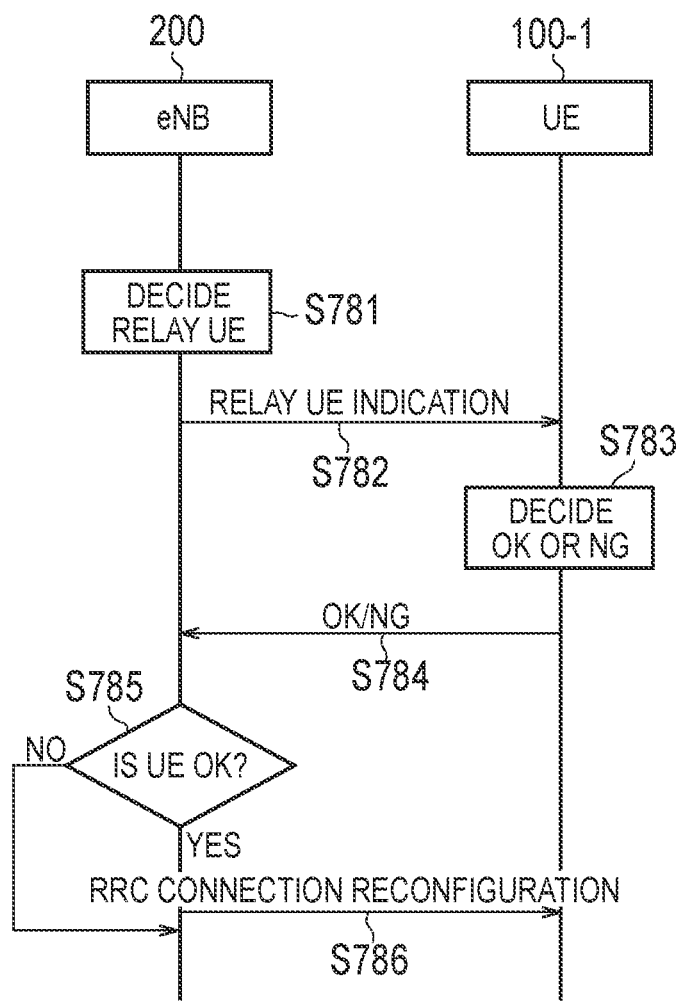
FIG. 41 is a diagram showing an example of a sequence according to the additional example of the sixth embodiment.

An example of operations of the eNB 200 and the UE 100-1 will be described below by using FIG. 41.

Step S781 is similar to step S471.

In step S782, the eNB 200 transmits information (Relay UE indication) indicating that the UE 100-1 is a relay UE.

In step S783, when the UE 100-1 receives the Relay UE indication, similar to step S773, the UE 100-1 determines whether or not to operate as the relay UE.

In step S784, the UE 100-1 transmits, to the eNB 200, the result determined in step S783.

In step S785, the eNB 200 determines whether or not the determination result of the UE 100-1 that is received in step S784 indicates that the UE 100-1 operates as a relay UE (OK).

If the determination result of the UE 100-1 indicates that the UE 100-1 operates as a relay UE (OK) (step S785 YES), then in step S786, similar to step S772, the eNB 200 transmits, to the UE 100-1, an RRC Connection Reconfiguration message.

If the determination result of the UE 100-1 indicates that the UE 100-1 disapproves to operate as a relay UE (NG) (step S785 NO), then the eNB 200 does not transmit the RRC Connection Reconfiguration message (restricts the transmission) to the UE 100-1.

Seventh Embodiment

Figure 42:
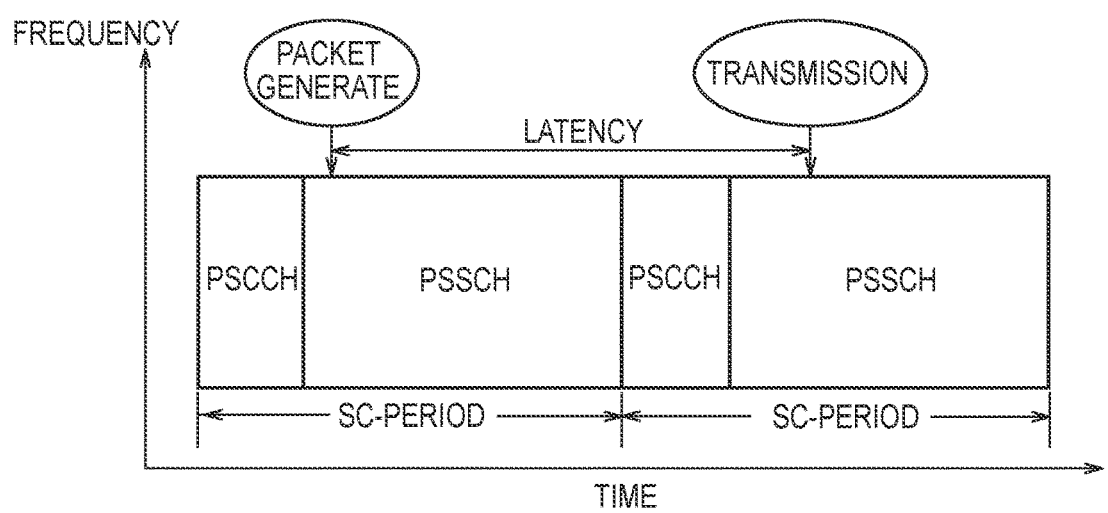
FIG. 42 is a diagram for describing a delay from the time data is generated until the data is transmitted.
Figure 43:
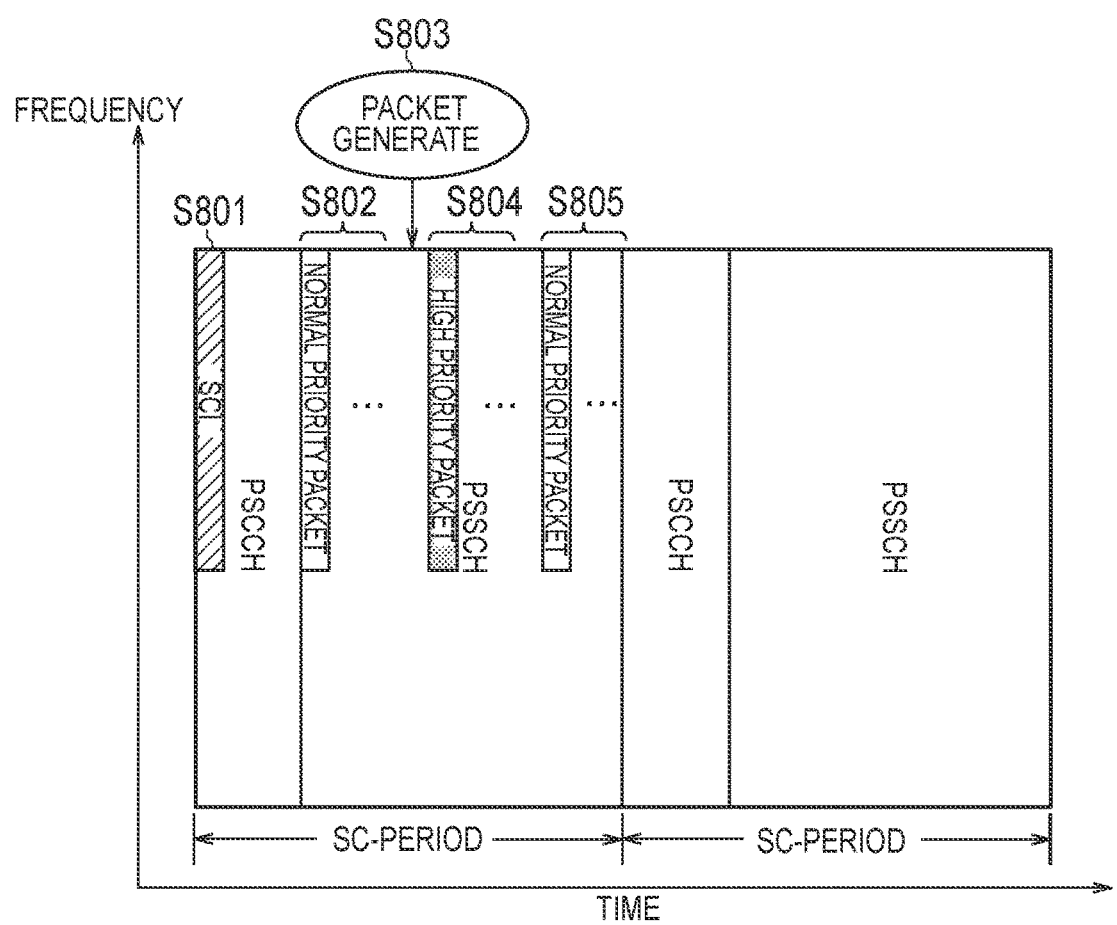
FIG. 43 is a sequence diagram for describing an operation according to a seventh embodiment.

Next, a seventh embodiment will be described by using FIG. 42 and FIG. 43. FIG. 42 is a diagram for describing a delay from the time data is generated until the data is transmitted. FIG. 43 is a sequence diagram for describing an operation according to the seventh embodiment.

In the seventh embodiment, a case in which high priority data is generated will be described. It is noted that the description of parts that are similar to at least any one of the above-described embodiments will be omitted.

As shown in FIG. 42, a case where a radio resource pool in which a control region (PSCCH) and a data region (PSSCH) are arranged alternately in a time direction is used for direct communication, is assumed. The radio resource pool used in direct communication is arranged repeatedly in a time direction at a predetermined cycle (SC period). Further, the radio resource pool used in direct communication is configured by a control region (physical sidelink control channel (PSCCH)), and a data region (physical sidelink shared channel (PSSCH)). A plurality of radio resource pools consisting of a control region and a data region are arranged in the time direction. The length of one radio resource pool in the time direction matches an SC period, which is a cycle of the radio resource pool. The control region and the data region are arranged alternately in the time direction. Therefore, the control region is arranged at an interval in the time direction. The data region follows the control region in the time direction.

The control region is the region in which the PSCCH for transmitting control information for sidelink (SCI: Sidelink Control Information) through direct communication is arranged. Therefore, the control region corresponds to a control resource pool in which a radio resource (hereinafter, a control resource) for transmitting SCI through direct communication is arranged. It is noted that the SCI is information for notifying a radio resource (hereinafter, a data resource) that is allocated for transmitting data through direct communication. Specifically, the SCI includes allocation information of a data resource. The data region is the region in which the PSSCH for transmitting data is arranged. Therefore, the data region corresponds to a data resource pool in which a radio resource for transmitting data through direct communication is arranged. It is noted that the control region corresponds to the above-described SC pool. The data region corresponds to the above-described data pool.

As shown in FIG. 42, when data (packet) that is to be transmitted to another UE is generated after elapsing the control region, the UE 100 waits until the next control region, which follows the data region, is reached. The UE 100 transmits, to the other UE, the SCI for notifying the radio resource of the data region that follows the next control region, by using the radio resource of the next control region. Thereafter, the UE 100 transmits the data to be transmitted to the other UE, by using the radio resource notified by the SCI. Therefore, it is not possible for the UE 100 to transmit the generated data until the SC period in which the data was generated has elapsed, and until after the time period corresponding to the following control region has elapsed, because of which a predetermined delay occurs.

Here, if data having a higher priority (high priority packet) than normal data (normal packet) is generated, the above-described predetermined delay may exceed the permissible delay that is required of a high priority packet. As a result, it may not be possible for the UE 100 to transmit a high priority packet within the range of the permissible delay. Therefore, a technology that enables the appropriate transmission of data through direct communication when data having a high priority is generated will be described.

A case in which the UE 100-1 transmits data (packet) to the UE 100-2 through direct communication will be described below as an example.

As shown in FIG. 43, in step S801, the UE 100-1 transmits SCI to the UE 100-2 in the control region through direct communication. In the present embodiment, SCI is information for notifying a radio resource that is allocated for transmitting data through direct communication. Specifically, the SCI includes allocation information of radio resources indicating a plurality of radio resources that are distributed and arranged in the time direction in a data region. It is noted that the SCI includes a destination identifier addressed to the UE 100-2. The UE 100-2 that receives the SCI knows a radio resource in which data is transmitted, on the basis of the SCI (allocation information).

In step S802, the UE 100-1 transmits a normal packet (normal priority packet) by using the radio resource indicated by the allocation information (first radio resource including a plurality of resources for repeated transmission). The normal packet has a priority that is lower (for example, a normal priority) than a high priority packet. The UE 100-2 receives data on the basis of the allocation information.

It is noted that the UE 100-2 repeatedly transmits a normal packet four times. The UE 100-2 combines the packets received four times, and acquires a normal packet.

In step S803, high priority data (high priority packet) having a higher priority than the data scheduled to be transmitted (untransmitted normal packet) is generated in the UE 100-1.

In step S804, the UE 100-1 transmits a high priority packet before a normal packet by using the radio resource indicated by the allocation information (second radio resource). That is, the UE 100-1 interrupts the data being transmitted with a high priority packet, and preferentially transmits the high priority packet. In this way, the UE 100-1 uses the radio resource allocated for a normal packet that is scheduled to be transmitted, for transmitting the high priority packet.

It is noted that if the re-transmission (four-time repeated transmission) of the normal packet that is being transmitted has not ended, the UE 100-1 starts the transmission of the high priority packet after the re-transmission of the normal packet is completed. Thus, it is possible for the UE 100-2 to appropriately receive (acquire) the normal packet and the high priority packet without combining the normal packet and the high priority packet.

The UE 100-1 may transmit information indicating that the packet (data) transmitted by using the second radio resource is a high priority packet (data) rather than a normal packet (data) that is scheduled to be transmitted. For example, along with a high priority packet, the UE 100-1 is capable of transmitting bit information indicating the high priority packet. The UE 100-1 may transmit information indicating a high priority packet separately from the high priority packet. The UE 100-1 may transmit information indicating a high priority packet either before or after the high priority packet.

If a priority is associated with a logical channel, the UE 100-1 is capable of assuming that a priority is associated with a logical channel identifier (LCID). Therefore, the UE 100-1 is capable of transmitting a high priority packet by using an LCID having a higher priority than an LCID for the normal packet that is scheduled to be transmitted. That is, the UE 100-1 is capable of transmitting a high priority packet including an LCID corresponding to a logical channel having a higher priority than a logical channel used in the transmission of a normal packet. The UE 100-1 is capable of transmitting the high priority packet using the logical channel having a high priority.

It is noted that information concerning the priority of a logical channel (group) and an LCID may be notified to each UE 100 based on transmission (unicast or broadcast) from the eNB 200. Each UE 100 may include the above-described information concerning the priority by presetting (pre-configured). It is noted that when a priority is associated with a logical channel group, the UE 100-1 may perform the above-described operation by using an identifier of the logical channel group (LCG ID: Logical Channel Group ID).

On the other hand, the UE 100-2 receives a high priority packet that is transmitted by using the second radio resource, on the basis of the allocation information. Upon receiving information indicating that the packet transmitted by using the second radio resource is a high priority packet rather than a normal packet that is scheduled to be transmitted, the UE 100-2 may determine that the received packet is a high priority packet. Further, the UE 100-2 may determine that the received packet is a high priority packet on the basis of the LCID. Specifically, by receiving an LCID having a higher priority than an LCID included in the packets received until then, the UE 100-2 may determine that the packet received in step S803 is of a high priority. If the contents of the packet received in step S803 are not related to the packets received until then, the UE 100-2 may determine that the packet received in step S803 is a high priority packet.

In step S805, the UE 100-1 resumes the transmission of the normal packet. After transmitting all high priority packets, the UE 100-1 resumes the transmission of the normal packet. As described above, the UE 100-1 may transmit information indicating a normal packet. The UE 100-1 may transmit a normal packet by using an LCID having a low priority.

The UE 100-2 receives the normal packet. The UE 100-1 may determine that the received packet is a normal packet through information indicating a normal packet and/or an LCID having a low priority.

Thereafter, when not all of the normal packets that are scheduled to be transmitted have been transmitted, the UE 100-1 is capable of transmitting new SCI by using a radio resource of the next control region to transmit the untransmitted normal packets.

As described above, even when a high priority packet is generated after notifying the SCI, the UE 100-1 is capable of transmitting the high priority packet before transmitting the control information in the next control region. Therefore, the UE 100-1 is capable of transmitting the high priority packet within the permissible delay, because of which it is possible to appropriately transmit data through direct communication.

(First Modification of Seventh Embodiment)

Figure 44:
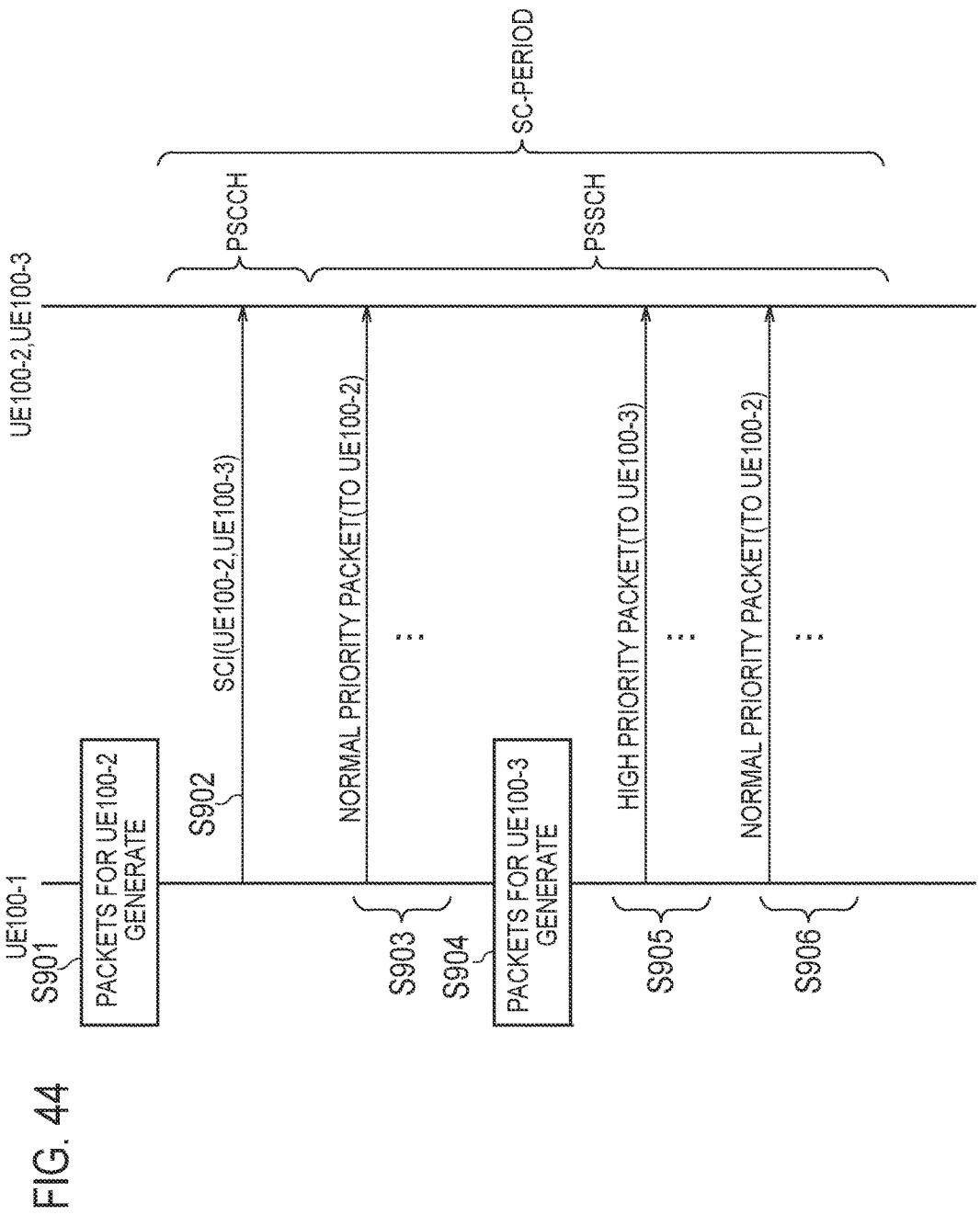
FIG. 44 is a sequence diagram for describing an operation according to a first modification of the seventh embodiment.

Next, a first modification of the seventh embodiment will be described by using FIG. 44. FIG. 44 is a sequence diagram for describing an operation according to the first modification of the seventh embodiment.

In the seventh embodiment described above, the communication partner of the UE 100-1 was the UE 100-2 alone, and the transmission target of a normal packet and a high priority packet was the same. In the present modification, a case in which the transmission target of a normal packet and a high priority packet is different will be described. It is noted that the description of parts that are similar to at least any one of the above-described embodiments will be omitted.

As shown in FIG. 44, in step S901, a packet (normal packet) that is to be transmitted to the UE 100-2 is generated in the UE 100-1. It is noted that although the UE 100-2 and the UE 100-3 are the communication partners of the UE 100-1, the UE 100-1 does not generate a packet to be transmitted to the UE 100-3. In this way, even when there are a plurality of communication partners, packets to be transmitted are not necessarily generated for all communication partners.

In step S902, the UE 100-1 transmits SCI. In addition to a destination identifier of the UE 100-2, which is the transmission target of the packet that is scheduled to be transmitted, the UE 100-1 includes a destination identifier of the UE 100-3, which is a candidate terminal that could be the transmission target of a high priority packet, in the SCI.

The UE 100-1 estimates a candidate terminal that could be the transmission target of a high priority packet. For example, the UE 100-1 may estimate a UE for public safety (ProSe-enabled Public Safety UE) as a candidate terminal. The UE 100-1 may estimate a candidate terminal before transmitting each SCI. The UE 100-1 may estimate a candidate terminal only before transmitting SCI for the first time. When transmitting an SCI thereafter, the UE 100-1 may omit the estimation of the candidate terminal and may include a destination identifier of a candidate terminal estimated in the past.

Further, the UE 100-1 may estimate a candidate terminal that could be the transmission target of a high priority packet on the basis of the identifier of the transmission target (destination identifier). For example, if the UE 100-1 has received a high priority packet in the past, the UE 100-1 may estimate the UE indicated by the identifier of the transmission source of the high priority packet as the candidate terminal. If the transmission target of a high priority packet to be generated is decided, the UE 100-1 may consider the transmission target as the candidate terminal. The UE 100-1 may decide an important UE (for example, a UE used at operational headquarters) as the candidate terminal. The UE 100-1 may decide an important UE (that is, the candidate terminal) on the basis of the information of the application level (ProSe Function).

Further, the UE 100-1 may estimate a UE that is not the transmission target of a predetermined-time packet (that is, the UE in the case when a predetermined time has elapsed after the transmission of a packet addressed to the UE) as the candidate terminal, when high priority data occurs. The UE 100-1 may estimate a UE that is the transmission target of a packet within a predetermined time (that is, the UE in the case when a predetermined time has not elapsed after the transmission of a packet addressed to the UE) as the candidate terminal. The UE 100-1 may start a timer for measuring the predetermined time when a packet is transmitted. When the timer expires, the UE 100-1 estimates a UE that is the transmission source of the packet that acts as the trigger for starting the timer as the candidate terminal. The UE 100-1 that performs direct communication with a plurality of UEs may start and stop the timers for measuring the predetermined time for each transmission-target UE. The UE 100-1 may estimate the UE corresponding to an expired timer as the candidate terminal. It is noted that the UE 100-1 may reset (or stop) the timer corresponding to a UE that has already terminated the direct communication.

Even when the candidate terminal is not the transmission target of a packet that is scheduled to be transmitted, the UE 100-1 includes a destination identifier of the candidate terminal (UE 100-3) in the SCI. Therefore, regardless of the fact that a high priority packet does not occur, the UE 100-1 includes the destination identifier of the candidate terminal in the SCI. By storing the destination identifier of the candidate terminal in a field that is separate from the destination identifier for a normal packet, the UE 100-1 may clearly specify the destination identifier of the candidate terminal. It is noted that as described above in the second embodiment, the UE 100-1 is capable of notifying a plurality of destination identifiers through one SCI.

Since the destination identifier of the UE 100-3 is included in the SCI, the UE 100-3 monitors the radio resource (PSSCH) indicated by the allocation information included in the SCI.

In step S903, similar to step S802, the UE 100-1 transmits a normal packet. The UE 100-2 receives the normal packet. Since the destination identifier of the UE 100-3 is included in the SCI, the UE 100-3 receives the normal packet. If, for example, the destination identifier included in the received packet (header) does not indicate the UE 100-3, the UE 100-3 is capable of discarding the received packet. The UE 100-3 may perform an operation similar to "(H) Reception of data" in the above-described second embodiment.

In step S904, a high priority packet is generated in the UE 100-1. The high priority packet is a packet that is addressed to the UE 100-3.

In step S905, similar to step S803, the UE 100-1 transmits a high priority packet. The UE 100-1 includes the destination identifier of the UE 100-3 in the (MAC subheader of the) high priority packet. Since the destination identifier included in the received packet (high priority packet) does not indicate the UE 100-2, the UE 100-2 discards the received packet. Since the destination identifier included in the received packet (high priority packet) indicates the UE 100-2, the UE 100-3 decodes the received packet rather than discarding the packet. As a result, the UE 100-3 is capable of receiving a high priority packet within an SC period in which the high priority packet is generated.

Step S906 corresponds to step S805.

As described above, even when the transmission target of a high priority packet that is generated is different from the transmission target of a normal packet, the UE 100-1 is capable of transmitting the high priority packet within the permissible delay.

(Second Modification of Seventh Embodiment)

Next, a second modification of the seventh embodiment will be described. In the first modification of the seventh embodiment, by including, in the control information, the destination identifier of the candidate terminal that could be the transmission target of a high priority packet, the UE 100-3, which is the candidate terminal, performed monitoring of the radio resource (PDSCH) indicated by the allocation information. In the present modification, by notifying the destination identifier of the candidate terminal beforehand, the candidate terminal monitors the radio resource indicated by the allocation information even when the control information does not include the destination identifier of the candidate terminal.

Firstly, the UE 100-1 estimates the candidate terminal that could be the transmission target of a high priority packet. The UE 100-1 associates the resource pool used for transmitting the high priority data with the destination identifier of the candidate terminal. If the transmission resource pool used in direct communication is decided beforehand, the UE 100-1 associates the transmission resource pool with the destination identifier of the candidate terminal.

Secondly, the UE 100-1 notifies, to the candidate terminal, the resource pool and the destination identifier of the candidate terminal that have been associated with each other. For example, the UE 100-1 is capable of notifying, to the candidate terminal, a list of destination identifiers (destination ID List) of the candidate terminal that is associated with the resource pool. The UE 100-1 is capable of notifying the list and the associated resource pool (hereinafter, called priority information) either before performing the direct communication, or during the time direct communication is being performed. The UE 100-1 is capable of notifying the priority information to the candidate terminal by the methods described below.

According to a first method, the UE 100-1 notifies the priority information to the candidate terminal via the eNB 200. The UE 100-1, for example, transmits the priority information to the eNB 200 by an SLUEInformation message. The eNB 200 notifies the priority information (or the priority information corresponding to each UE) to each UE 100 corresponding to the destination identifier included in the received priority information. For example, the eNB 200 notifies the priority information individually to each UE by an RRC Reconfiguration message. Alternatively, the eNB 200 may notify the priority information by broadcast, such as an SIB (System Information Block), etc.

According to a second method, the UE 100-1 may notify the priority information to the candidate terminal through direct discovery (direct discovery procedure) in a proximity service. It is noted that the priority information may not only include a list of destination identifiers of the candidate terminal and the associated resource pool, but also information indicating the priority of the resource pool (for example, High/Middle/Low). The priority of the resource pool indicates the priority with respect to other receptions (for example, reception through a different carrier, or a different resource pool). For example, the UE 100-2 is capable of performing reception by taking into consideration the priority of the resource pool depending on the number of the receiver (RxChanin). Further, in order to reduce the reception process power, the UE 100-2 monitors a resource pool with a high priority, and may omit the monitoring of a resource pool with a low priority.

If the destination identifier of the UE 100-3 is included in the priority information, the UE 100-3, which is the candidate terminal, monitors the resource pool associated with the destination identifier of the UE 100-3. If the SCI from the UE 100-1 is included in the control region in the resource pool, the UE 100-3 performs the reception of the packet on the basis of the allocation information included in the SCI even when the destination identifier of the UE 100-3 is not included in the SCI.

As described above, regardless of the generation of a high priority packet, the UE 100-1 notifies beforehand, to the candidate terminal, the destination identifier of the candidate terminal as well as the associated resource pool. As a result, even when the UE 100-1 does not include the destination identifier of the candidate terminal in the control information, it is possible for the UE 100-3 to acquire a high priority packet.

(Third Modification of Seventh Embodiment)

Next, a third modification of the seventh embodiment will be described. In the third modification of the seventh embodiment, the destination identifier of the transmission target of a high priority packet is included in data (MAC subheader).

To enable a plurality of UEs including the candidate terminal to monitor a data resource, as described above in the second embodiment, the UE 100-1 that transmits the packet generates either a destination identifier (special destination identifier) indicating that the data of a plurality of destinations is included in a packet (data), or SCI including a plurality of destination identifiers. The UE 100-2 that receives the SCI monitors the radio resources in the data region.

Here, when a high priority packet is generated, the UE 100-1 stores the destination identifier of the transmission target of the high priority packet in the MAC subheader of the high priority packet (MAC PDU). If the destination identifier of the UE 100-2 is not included in the received packet, the UE 100-2 is capable of discarding the received packet. As a result, the UE 100, which is not the transmission target of the high priority packet, is capable of omitting decoding of the received packet. Further, the UE 100-2 may perform an operation similar to "(H) Reception of data" in the second embodiment.

(Fourth Modification of Seventh Embodiment)

Next, a fourth modification of the seventh embodiment will be described. In the seventh embodiment, a case in which a high priority packet is generated is described. In the present modification, a case in which a plurality of respectively different data (packets) are generated at the same timing will be described.

Case in which the Destination of a Plurality of Data is the Same

The UE 100-1 associates each of a plurality of data with an LCID when the plurality of data having the same priority is generated at the same timing. The corresponding data (packet) is transmitted by using the associated LCID. The UE 100-2 that receives the packet is capable of differentiating the packet with the help of the LCID. The UE 100-2 is capable of appropriately acquiring the plurality of data by processing each packet corresponding to the LCID.

It is noted that the UE 100-1 is capable of transmitting one SCI including one destination identifier. The UE 100-1 is capable of repeatedly transmitting one MAC PDU four times in the PHY layer. It is noted that the UE 100-1 may preferentially transmit any one data from among the plurality of data.

Case in which the Destination of a Plurality of Data is Different

When a plurality of data are generated at the same timing, then as described above in the first embodiment or the second embodiment, the UE 100-1 may notify a plurality of SCIs in one control region (SC pool), or may notify a plurality of destinations by one SCI.

Here, when the UE 100-1 transmits a plurality of data having a different destination, the transmission of data (second data) that is transmitted after the first data (first data) may be restricted. Therefore, the UE 100-1 may be restricted such that the transmission of the second data becomes difficult. For example, by reducing at least any one of the probability (txProbability) of transmitting the second data itself, the probability of performing repeated transmission (repetition), the probability of selecting a control resource in the PSCCH, and the number of data resources that is selectable by the UE, it becomes difficult for the UE 100-1 to transmit the second data. It is noted that in a case when a plurality of data are transmitted within the same SC period, the UE 100-1 is restricted for the transmission of the second data. When the UE 100-1 transmits the first data in a first SC period, and transmits the second data in a second SC period, the UE 100-1 is capable of transmitting the second data without restriction.

Further, when data is transmitted to a plurality of destinations, the resources that are available for the UE 100-1 may be restricted regardless of the priority. For example, the resources that are available for the UE 100-1 may be restricted by restricting the amount of usage of a resource block of a control resource, the number of transmission control information (the number of SCI), the transmission control probability (txProbability), the amount of usage of a resource block of a data resource, and the transmission data probability (txProbability), etc. These resource restrictions may be notified by the eNB 200 through an SIB, or may be set individually from the eNB 200, or else may be set beforehand in the UE 100-1.

By setting such a restriction, it is possible to suppress the consumption of radio resources for direct communication. Further, it is possible to suppress the inequality of the amount of usage of a radio resource between a UE that transmits one data and a UE that transmits a plurality of data. That is, as compared to a case in which a UE autonomously selects a resource, it is possible to suppress the inequality of the usage of the resource between the transmission UEs.

Further, if the priority of the second data is equal to or higher than the priority of the first data, the UE 100-1 may transmit the second data without restriction. Therefore, it is possible for the UE 100-1 to transmit the second data in the same way as the first data.

As a result, it is possible to prevent a collision between data having a low priority and data having a high priority that is transmitted by another UE, even while the UE 100-1 is transmitting high priority data.

Eighth Embodiment

Next, an eighth embodiment will be described. In the eighth embodiment, a plurality of resource pools for direct communication are provided in the same carrier.

(Operation Environment)

Figure 45:
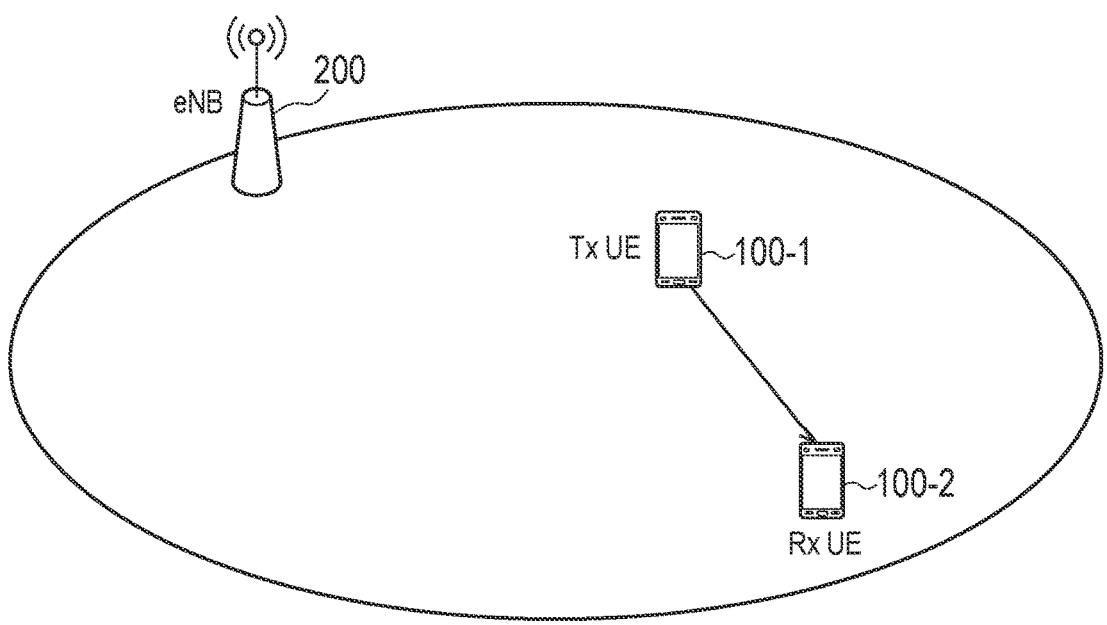
FIG. 45 is a diagram for describing an operation environment according to an eighth embodiment.

An operation environment according to the eighth embodiment will be described by using FIG. 42 and FIG. 45. FIG. 45 is a diagram for describing the operation environment according to the eighth embodiment.

As shown in FIG. 45, the UEs 100 (the UE 100-1 and the UE 100-2) are located within a cell managed by the eNB 200. The UE 100 is capable of performing cellular communication (LTE-Uu) with the eNB 200. The UE 100 is in an RRC connected state. Alternatively, the UE 100 may be in an RRC idle state. When performing communication with the eNB 200, the UE 100 may shift to the RRC connected state from the RRC idle state.

The UE 100-1 and the UE 100-2 are in a state of performing direct communication, or in a state prior to starting to perform direct communication. The UE 100-1 and the UE 100-2 are capable of performing direct communication by using the resource pool shown in FIG. 42. Specifically, the UE 100-1 transmits data (packet) to the UE 100-2 through direct communication.

(Operation According to Eighth Embodiment)

Figure 46:
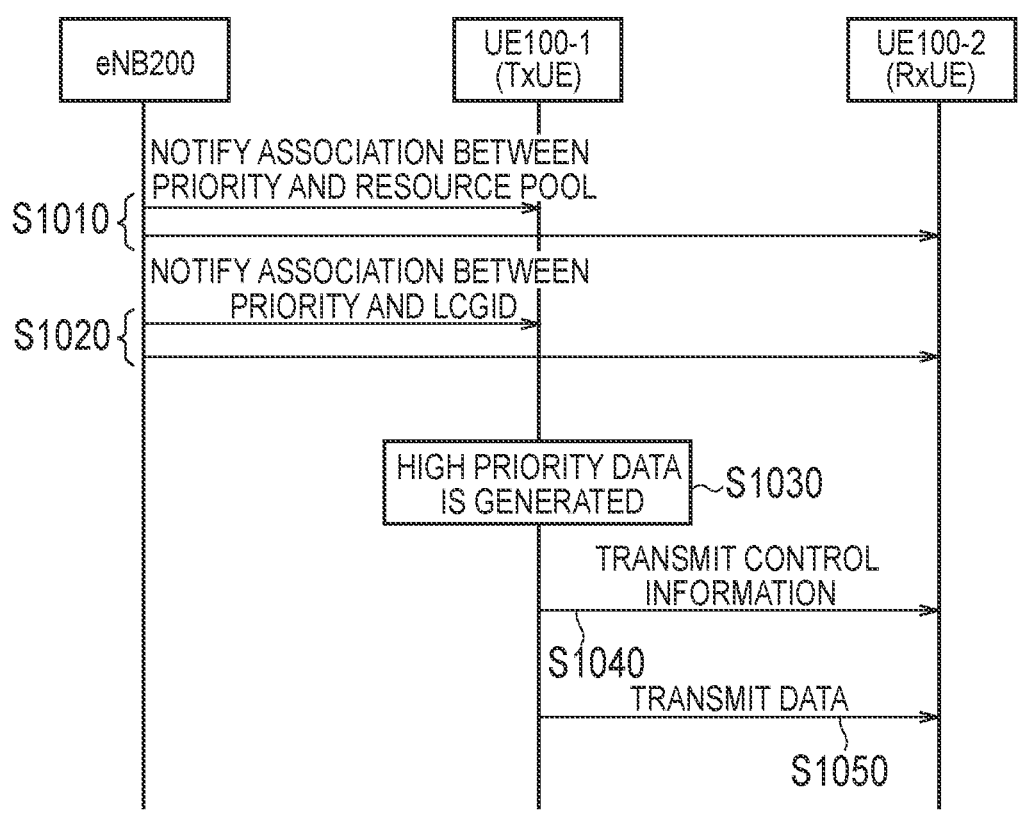
FIG. 46 is a sequence diagram for describing an operation according to the eighth embodiment.
Figure 47:
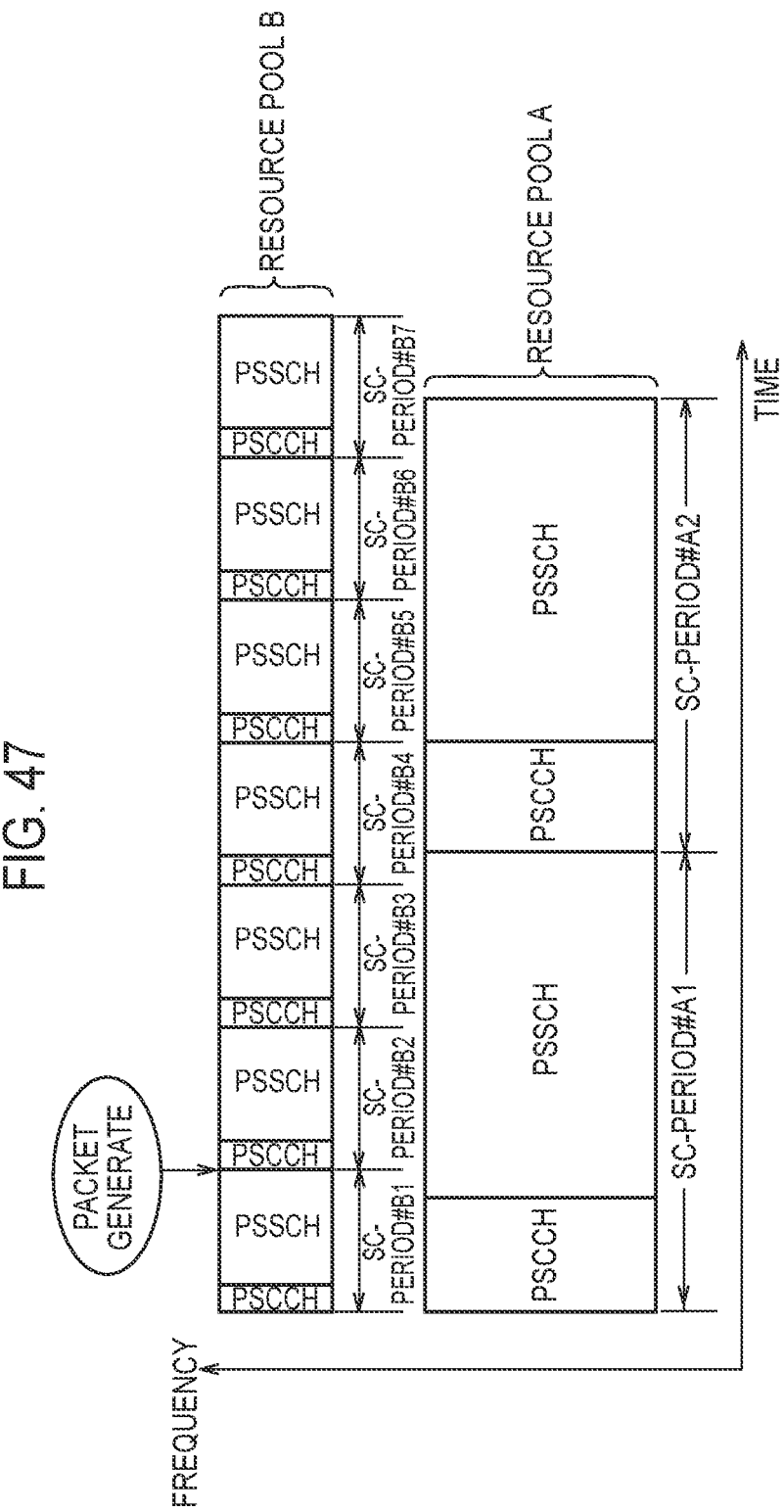
FIG. 47 is a diagram for describing the operation according to the eighth embodiment.

An operation according to the eighth embodiment will be described by using FIG. 46 and FIG. 47. FIG. 46 is a sequence diagram for describing the operation according to the embodiment. FIG. 47 is a diagram for describing the operation according to the embodiment.

The eNB 200 sets a resource pool for direct communication in the UE 100-1 and the UE 100-2 located within a cell. In the present embodiment, the eNB 200 provides a plurality of resource pools (a resource pool A and a resource pool B) in the same carrier (see FIG. 47). It is noted that the frequency to which the resource pool A and the resource B are arranged is different. The SC cycle of the resource pool B is shorter than the SC cycle of the resource pool A.

The eNB 200 allocates the radio resources of the resource pool set in the UE 100-1 and the UE 100-2 to the UE 100-1 and the UE 100-2. When allocating a data resource to the UE 100-1 and the UE 100-2, the eNB 200 does not set a data resource pool in the UE 100-1 and the UE 100-2. Rather than being allocated with a radio resource by the eNB 200, the UE 100-1 and the UE 100-2 may autonomously select a radio resource from the set resource pool. It is noted that if located outside the cell, the UE 100-1 and the UE 100-2 perform direct communication by using a previously set resource pool.

The UE 100-1 and the UE 100-2 are in a state of performing direct communication, or in a state prior to starting to perform direct communication. When transmitting data through direct communication, the UE 100-1 transmits the data (packet) to the UE 100-2 by using a control resource and a data resource of the resource pool A.

As shown in FIG. 46, in step S1010, the eNB 200 transmits, to the UEs 100 (the UE 100-1 and the UE 100-2), first priority information concerning an association between a resource pool used in direct communication and a priority. The UE 100 receives the first priority information. The eNB 200 may transmit the first priority information to the UE 100 by broadcast (for example, an SIB) or unicast (for example, an RRC Reconfiguration message). It is noted that for a UE 100 that is located outside the coverage of a cell, the first priority information may be set beforehand.

The first priority information is information in which a resource pool for direct communication and a priority are associated with each other. For example, in the first priority information, the resource pool A and a priority 0 (for example, Low priority) are associated, and the resource pool B and a priority 1 (for example, High priority) are associated with each other.

Further, the eNB 200 may transmit, to the UE 100, information concerning a mandatory resource pool for which monitoring is mandatory, from among the resource pools used for direct communication. The eNB 200 may transmit, to the UE 100, information concerning the mandatory resource pool together with the first priority information. For example, information concerning the mandatory resource pool is flag information (true/false) associated with each resource pool. For example, "true" indicates that monitoring is mandatory. "false" indicates that monitoring is not mandatory. For example, "false" is associated with the resource pool A, and "true" is associated with the resource pool B.

Upon receiving the information concerning the mandatory resource pool, the UE 100 monitors the mandatory resource pool. Specifically, the UE 100 performs a reception trial for receiving SCI in a control region within the mandatory resource pool. If SCI is included in the control region, the UE 100 monitors the data region and receives the data on the basis of the allocation information (data resource) of the radio resource within the SCI. If SCI is not included in the control region, the UE 100 does not monitor the data region.

In step S1020, the eNB 200 transmits, to the UEs 100 (the UE 100-1 and the UE 100-2), second priority information concerning the identification information of a logical channel (for example, the identifier of a logical channel group (LCG ID)) and a priority. The UE 100 receives the second priority information. The eNB 200 may transmit the second priority information to the UE 100 by broadcast (for example, an SIB) or unicast (for example, an RRC Reconfiguration message). It is noted that for a UE 100 that is located outside the coverage of a cell, the second priority information may be set beforehand.

The second priority information is information in which the identification information of a logical channel (for example, the identifier of a logical channel group (LCG ID)) and a priority are associated with each other. For example, in the second priority information, an LCG ID #1 and a priority 0 (for example, Low priority) are associated, and an LCG ID #2 and a priority 1 (for example, High priority) are associated with each other. It is noted that the identification information concerning a logical channel may be an identifier of the logical channel (LCID). Therefore, an LCID and a priority may be associated with each other.

Further, the eNB 200 may notify, to the UE 100-1, an LCG ID (or LCID) having a higher priority than a normal LCG ID (or LCID), as information concerning the priority. For example, in a priority list, an LCG ID (or LCID) having a low priority may not be described and an LCG ID (or LCID) having a high priority may be described. Therefore, the UE 100-1 may determine that an LCG ID (or LCID) that is not described in the priority list has a normal priority.

It is noted that the eNB 200 may simultaneously transmit the first priority information and the second priority information to the UE 100.

In step S1030, data having a high priority (hereinafter, called high priority data) is generated in the UE 100-1. It is noted that high priority data need not be data having a high priority. High priority data could be data (middle priority) having a higher priority than data (for example, low priority) that the UE 100-1 transmits by using a control resource of a control resource pool.

The UE 100-1 selects the resource pool B that has a shorter cycle than the resource pool A, rather than the resource pool A that is used for transmitting normal data having a lower priority than the high priority data. That is, the UE 100-1 selects the resource pool B that is arranged repeatedly at a shorter cycle than the SC period of the resource pool A. The UE 100-1 may select a resource pool for transmitting the high priority data, on the basis of the SC cycle of the resource pool.

Further, the UE 100-1 may select the resource pool B as the resource pool for transmitting the high priority data on the basis of the first priority information. The UE 100-1 may select the resource pool B having a higher priority than the resource pool A as the resource pool for transmitting the high priority data. It is noted that when transmitting normal data having a low priority, the UE 100-1 is not capable of selecting the resource pool B that has a high priority. The resource pool B is a dedicated resource pool for high priority data that is used for transmitting data having a high priority.

Further, the UE 100-1 may select the resource pool B as the resource pool for transmitting the high priority data on the basis of information concerning a mandatory resource pool. For example, when a resource pool C that has the same priority as the resource pool B and is not a mandatory resource pool has been set, the UE 100-1 may select the resource pool B rather than the resource pool C.

The UE 100-1 selects a control resource that is selectable after high priority data is generated in the resource pool B. The UE 100-1 selects a control resource and a data resource that are capable of transmitting the high priority data at the fastest speed. Specifically, in FIG. 10, the UE 100-1 selects a control resource of the control resource pool in an SC period #B2. Further, the UE 100-1 selects a data resource of the data resource pool in the SC period #B2.

It is noted that the resource pool B and the radio resource (the control resource and/or the data resource) for the high priority data may be selected by the eNB 200. The eNB 200 is capable of selecting the resource pool B and the radio resource in the same way as the UE 100-1. The eNB 200 transmits, to the UE 100-1, control information (DCI) for notifying the selected resource pool and radio resource.

In step S1040, the UE 100-1 transmits, to the UE 100-2, SCI for notifying the data resource for transmitting the high priority data. The UE 100-1 transmits the SCI by using the selected control resource of the resource pool B. The SCI includes allocation information of a data resource of the resource pool B.

The UE 100-2 monitors, at all times, the (control resource pool of the) resource pool B having a high priority. The UE 100-2 may monitor, at all times, the resource pool B, if the resource pool B is a mandatory resource pool, on the basis of information from the eNB 200 concerning the mandatory resource pool.

The UE 100-2, which monitors the control resource pool, receives the SCI from the UE 100-1 by using a control resource of the resource pool B. The UE 100-2 understands the data resource by which data (high priority data) is transmitted, on the basis of the received SCI.

In step S1050, the UE 100-1 transmits, to the UE 100-2, the high priority data by using the data resource notified by the SCI.

Here, when transmitting normal data having a lower priority than the high priority data through direct communication, the UE 100-1 preferentially transmits the high priority data as compared to the normal data. The UE 100-1 may interrupt the transmission of the normal data at a place where it is good to stop, and may start the transmission of the high priority data. For example, when the re-transmission (four-time repeated transmission) of a packet corresponding to the normal data is not completed, the UE 100-1 may start the transmission of the high priority packet after the re-transmission of the packet is completed.

Alternatively, the UE 100-1 may immediately interrupt the transmission of the normal data, and may start the transmission of the high priority data. For example, the UE 100-1 may give priority to the transmission of high priority data as compared to the re-transmission of the packet. Therefore, the UE 100-1 may start the transmission of the high priority data even when the re-transmission of the packet of the normal data is not completed. In this case, the UE 100-1 may notify, to the UE 100-2, the fact that the transmission of the normal data has been interrupted. As a result, the UE 100-2 retains the normal data that has been received till halfway, without discarding the data. When the UE 100-2 does not receive, from the UE 100-1, the notification of the fact that the UE 100-1 has interrupted the transmission of the normal data, the UE 100-2 may discard the normal data that has been received till halfway. When the re-transmission is not completed, the UE 100-1 may start the re-transmission after the transmission of the high priority data is completed. When the UE 100-1 does not notify, to the UE 100-2, the fact that the transmission of the normal data has been interrupted, the UE 100-1 may transmit the packet for which the re-transmission is not completed as a new packet.

The UE 100-1 may notify, to the UE 100-2, the timing (Resume Timing) and/or the period (Resume Period) of resuming the interrupted transmission of the normal data. The Resume Timing is information for specifying a PSCCH time resource when the transmission of the normal data is resumed within the SC period during which the transmission of the normal data is interrupted. The Resume Period is information for specifying a period when the transmission of the normal data is resumed after the SC period during which the transmission of the normal data is interrupted. The UE 100-2 resumes the reception of the normal data on the basis of the Resume Timing and/or the Resume Period.

It is noted that the UE 100-1 may determine whether or not to complete the re-transmission of the packet of the normal data before transmitting the high priority data, on the basis of an instruction from the eNB 200. For example, the eNB 200 may include interrupt flag information (Interrupt flag) in the DCI that includes the allocation information of the radio resource. When the interrupt flag information indicates "True", the UE 100-1 transmits the high priority data even when the re-transmission of the packet is not completed. On the other hand, when the interrupt flag information indicates "False", the UE 100-1 transmits the high priority data after the re-transmission of the packet is completed. It is noted that the information about the Resume Timing and/or the Resume Period may be included in the DCI.

It is noted that when multi-cluster transmission is permitted within one carrier, the UE 100-1 may transmit the high priority data by using a data resource of the resource pool B while transmitting an untransmitted packet by using a data resource of the resource pool A.

As described above, the UE 100-1 transmits the high priority data by using a data resource of the resource pool B that has a shorter SC period than the resource pool A. In this way, when high priority data is generated, the UE 100-1 transmits the high priority data by using a radio resource of a resource pool in accordance with the SC period. Therefore, when high priority data is generated, the UE 100-1 is capable of transmitting the high priority data within the SC period during which the high priority data is generated. As a result, it is possible for the UE 100-1 to appropriately transmit data through direct communication.

[A Modification of Eighth Embodiment]

Figure 48A:
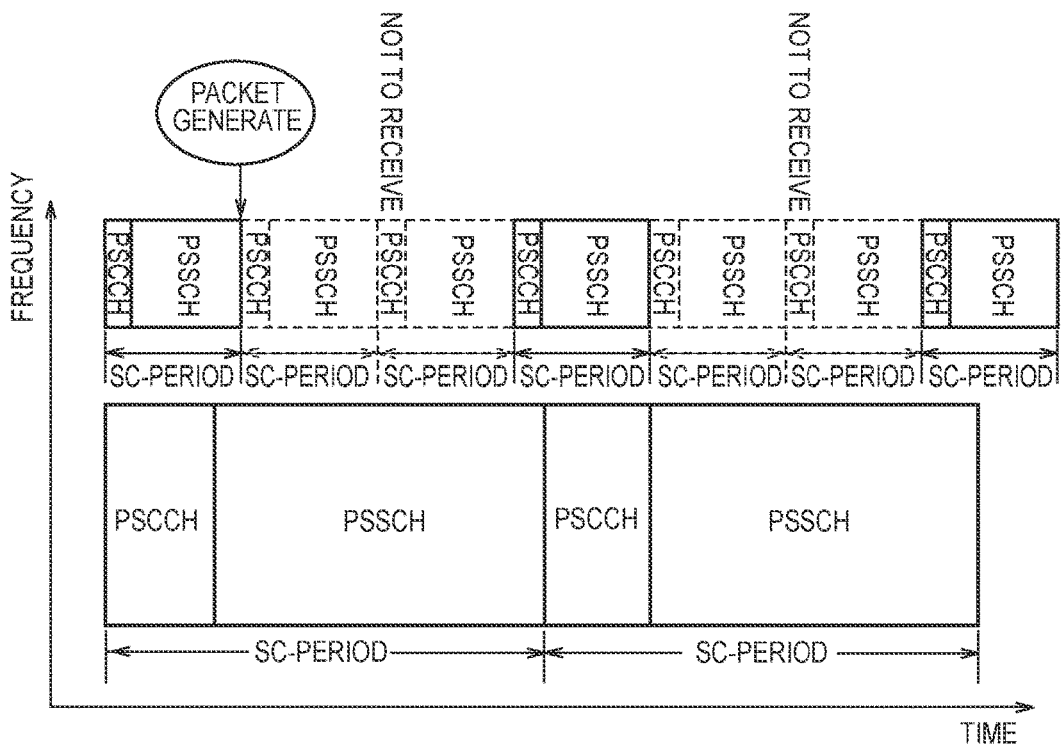
FIGS. 48A and 48B are diagrams for describing a modification of the eighth embodiment.
Figure 48B:
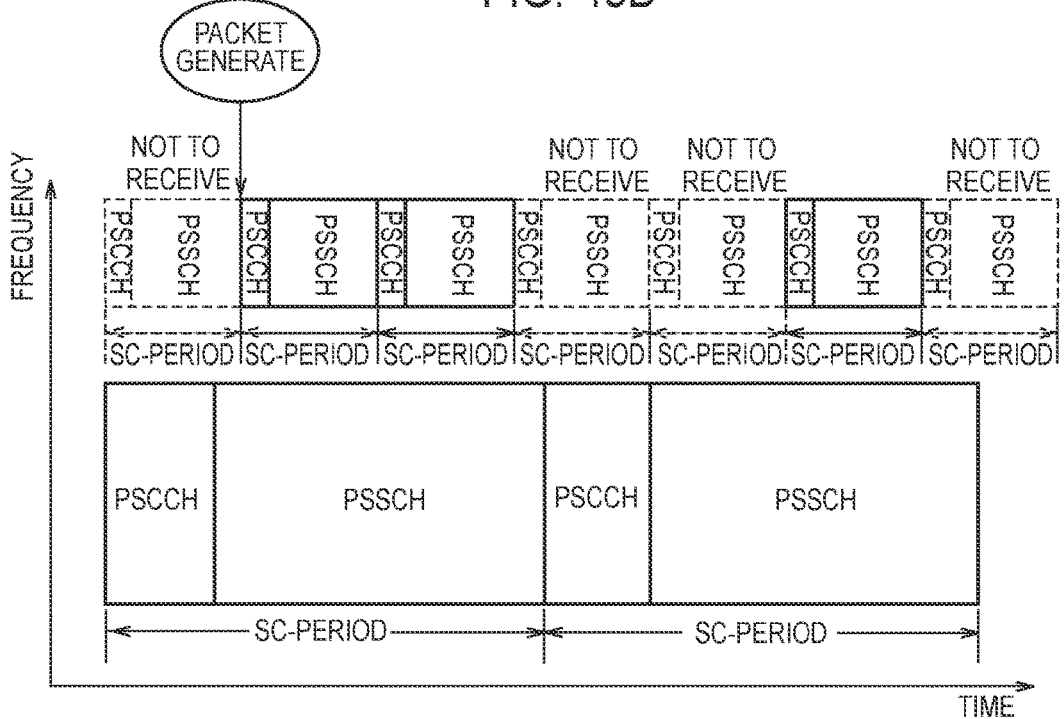

Next, a modification of the eighth embodiment will be described by using FIGS. 48A and 48B. FIGS. 48A and 48B are diagrams for describing a modification of the eighth embodiment. It is noted that description of parts similar to the first embodiment will be omitted where appropriate.

In the eighth embodiment, the UE 100-2 monitors, at all times, the resource pool B that either has a high priority, or for which monitoring is mandatory. However, there is a problem that the monitoring load of the UE 100-2 increases. Therefore, as a result of the method described below, the UE 100-2 need not perform monitoring at all times.

As shown in FIGS. 48A and 48B, the eNB 200 decides the resource pool to be (actually) monitored in the resource pool B by the UE 100-2. That is, the eNB 200 decides the monitoring frequency. The eNB 200 may set the monitoring frequency individually for each UE by unicast (for example, an RRC Reconfiguration message). The eNB 200 may notify the monitoring frequency to the UEs subordinate to the eNB 200 by broadcast (for example, an SIB). Alternatively, the monitoring frequency may be set beforehand in the UE 100-2. The UE 100-2 may notify the previously set monitoring frequency to the eNB 200.

The monitoring frequency may be decided based on the cycle of the monitoring period. In FIG. 48A, the UE 100-2 performs monitoring every three SC periods. The eNB 200 is capable of notifying, to each related UE, the monitoring cycle by any one of 1/2/3/4/8/16.

Since it is not possible to predict the timing of generation of high priority data, the monitoring frequency may be decided according to a random pattern. The eNB 200 is capable of notifying, to each related UE, the monitoring frequency decided according to a random pattern by a bitmap or a pseudo random number. In FIG. 48B, the UE 100-2 performs monitoring on the basis of a {0, 1, 1, 0, 0, 1, 0} bitmap. Further, the UE 100-2 may perform monitoring at the monitoring frequency decided by using a pseudo random number based on an individual identifier for each UE.

The UE 100-1 receives, from the eNB 200, monitoring information (that is, the monitoring frequency of the UE 100-2) concerning the resource pool monitored by the UE 100-2. The UE 100-1 transmits the high priority data by using the control resource and the data resource selected on the basis of the monitoring information.

The monitoring frequency is decided such that the interval in the time direction of the resource pools monitored by the UE 100-2 is shorter than the SC period of the resource pool A having a low priority. As a result, it is possible to reduce the monitoring load of the UE 100-2 while also reducing a transmission delay in the high priority data.

Ninth Embodiment

Figure 49:
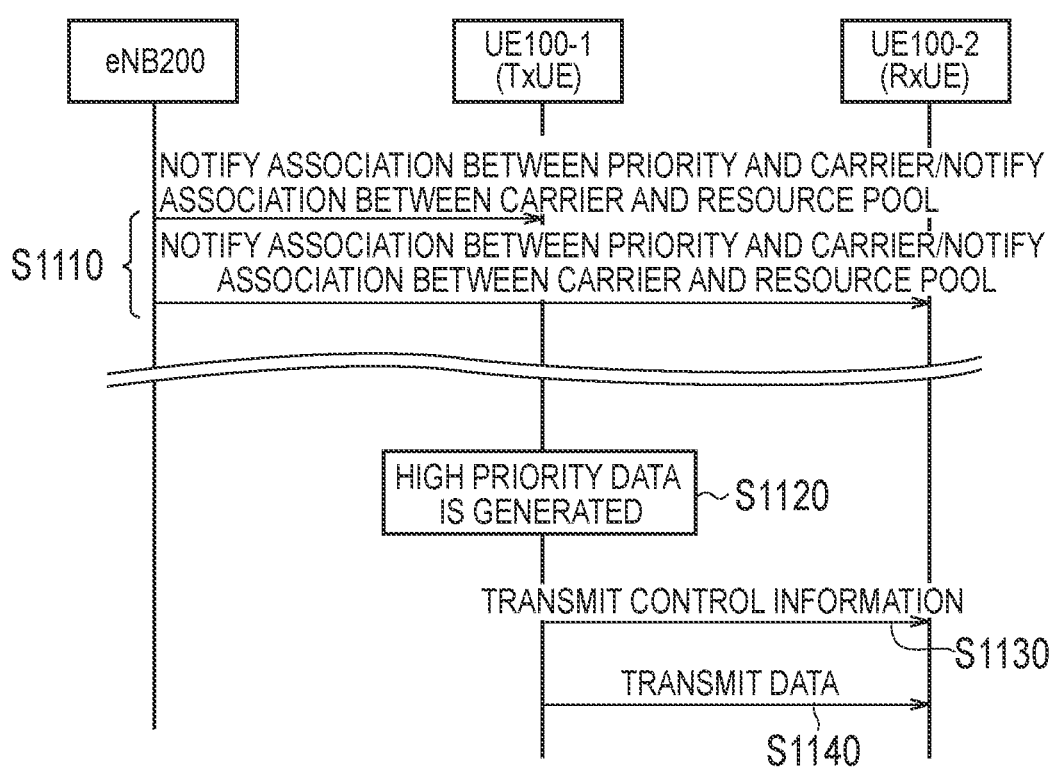
FIG. 49 is a sequence diagram for describing an operation according to a ninth embodiment.
Figure 50:
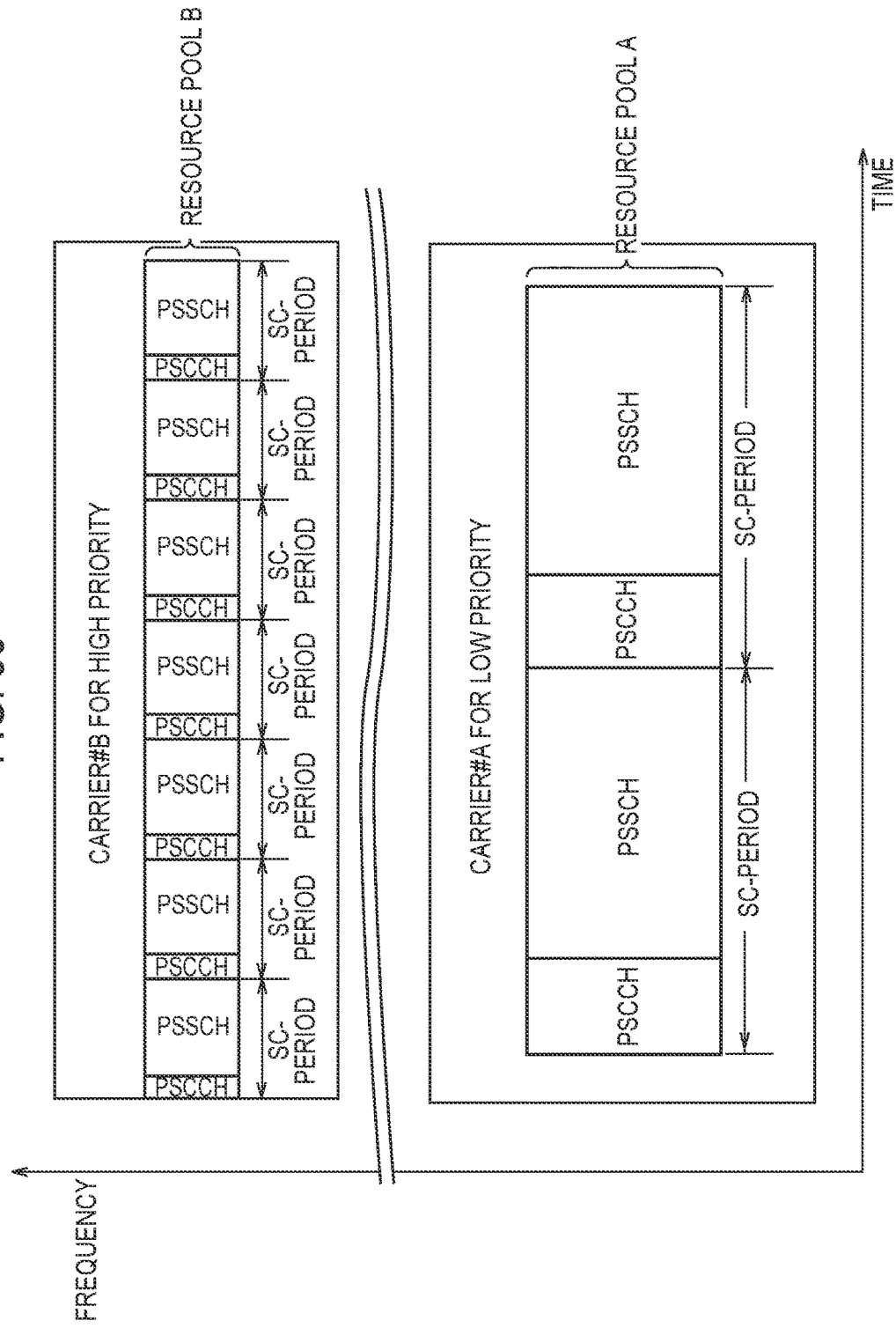
FIG. 50 is a diagram for describing the operation according to the ninth embodiment.

Next, a ninth embodiment will be described by using FIG. 49 and FIG. 50. FIG. 49 is a sequence diagram for describing an operation according to the ninth embodiment. FIG. 49 is a diagram for describing the operation according to the ninth embodiment. It is noted that description of parts similar to the eighth embodiment will be omitted where appropriate.

In the eighth embodiment, the resource pool A and the resource pool B are provided in the same carrier. In the ninth embodiment, the resource pool A and the resource pool B are provided in different carriers (see FIG. 50).

As shown in FIG. 49, in step S1110, the eNB 200 transmits, to the UEs 100 (the UE 100-1 and the UE 100-2), third priority information concerning an association between a carrier and a priority. The UE 100 receives the third priority information. The eNB 200 may transmit the third priority information to the UE 100 by broadcast (for example, an SIB 18) or unicast (for example, an RRC Reconfiguration message). It is noted that for a UE 100 that is located outside the coverage of a cell, the third priority information may be set beforehand. Further, the UE 100 may transmit the third priority information to a surrounding UE 100 by direct discovery.

The third priority information is information in which a carrier and a priority are associated with each other. For example, in the third priority information, a carrier A and a priority 0 (for example, Low priority) are associated, and a carrier B and a priority 1 (for example, High priority) are associated with each other. It is noted that a plurality of priorities may be associated with one carrier. For example, a carrier A and a priority 0 are associated, and a carrier B and priorities 1, 2, 3 are associated with each other.

In the third priority information, a carrier and identification information of a logical channel group may be associated with each other. Here, the identification information of the logical channel group is associated with the priority. The eNB 200 notifies the association between the identification information of the logical channel group and the priority to the UE 100. As a result, the UE 100 is capable of understanding the priority of the carrier even when the carrier and the priority are not directly associated.

Further, the eNB 200 transmits, to the UEs 100 (the UE 100-1 and the UE 100-2), fourth priority information concerning an association between a carrier and a resource pool used for direct communication. The UE 100 receives the fourth priority information.

The fourth priority information may include information about a resource pool used for direct communication that is associated with each carrier. The eNB 200 may transmit the fourth priority information corresponding to a carrier for each carrier. Therefore, the eNB 200 may transmit, through an SIB (for example, an SIB 18), the fourth priority information that is associated with a first carrier by the first carrier, and may transmit the fourth priority information that is associated with a second carrier by the second carrier. That is, the eNB 200 may transmit an SIB including the fourth priority information in accordance with the number of carriers. Alternatively, the eNB 200 may transmit a plurality of fourth priority information to which an index has been added, and may transmit information indicating the association between each carrier and the index. The UE 100 confirms the fourth priority information of the corresponding index.

It is noted that as described in the eighth embodiment, when a plurality of resource pools are provided in the same carrier, the carrier and resource pool may be associated with a priority. For example, a carrier A and a resource pool A are associated with a priority 0, a carrier A and a resource pool B are associated with a priority 2, and a carrier B and a resource pool C are associated with a priority 1.

Steps S1120 to S1140 correspond to steps S1030 to S1050. It is noted that the UE 100-1 is capable of selecting the resource pool B that is provided in a carrier having a higher priority than a carrier used in the transmission of the normal data as the resource pool for transmitting the high priority data.

It is noted that the UE 100-1 may notify, to the eNB 200, the number of transmission chains (Tx Chain) indicating the number of carriers that are transmittable simultaneously. Further, the UE 100-2 may notify, to the eNB 200, the number of reception chains (Rx Chain) indicating the number of carriers that are receivable simultaneously. Each of the UE 100-1 and the UE 100-2 may notify, to the eNB 200, UE capability information (UE Capability) including information concerning the number of transmission chains (for example, "commSimultaneousTx", "commSupportB ands", "commSupportedBandsPerBC", etc.) and information concerning the number of reception chains (for example, "commSupportedBandsPerBC", "commSupportBands", etc.).

It is noted that "commSimultaneousTx" is information indicating whether the UE is permitted to perform simultaneous transmission in a band indicated by "commSupportedBandsPerBC" (that is, a band that supports simultaneous reception among the bands indicated by "commSupportBands"). "commSupportBands" is information indicating a band (frequency band) in which the UE supports direct communication. "commSupportedBandsPerBC" is information indicating a band (frequency band) in which the UE supports simultaneous reception in direct communication and cellular communication (EUTRA).

The eNB 200 is capable of deciding the third priority information (the association between a carrier and a priority) on the basis of at least either one of the number of transmission chains of the UE 100-1 and the number of reception chains of the UE 100-2, according to the information notified by the UE 100.

When, for example, the number of reception chains of the UE 100-2 is two, the eNB 200 may set one high priority carrier for the reception chain for cellular communication (specifically, a DL (for example, PDCCH reception)), and for the reception chain for high priority data reception. Alternatively, the eNB 200 may determine that the probability of simultaneous occurrence of the high priority data is low, and may set two high priority carriers. In this case, the UE 100-1 is capable of transmitting the high priority data by using a resource pool for direct communication from either of the high priority carriers, and the UE 100-2 is capable of receiving the high priority data from the UE 100-1 by monitoring both the high priority carriers. It is noted that the eNB 200-1 may decide the third priority information by taking into consideration the information provided below.

Firstly, a case in which a carrier and a priority have a 1-to-1 correspondence relationship will be described.

In the case of the condition: "Cellular communication (DL)>Direct communication (High Priority)>Direct communication (Low Priority)", a reception UE requires a total of three reception chains, namely a reception chain (High) for cellular communication (DL), a reception chain (Middle) for direct communication (High Priority), and a reception chain (Low) for direct communication (Low Priority). When the reception UE abandons the reception of the direct communication (Low Priority), two reception chains are required.

The same is applicable in the case of the condition: "Cellular communication (DL)=Direct communication (High Priority)>Direct communication (Low Priority)".

In the case of the condition: "Cellular communication (DL)=Direct communication (High Priority)=Direct communication (Low Priority)", the reception UE is capable of selecting the desired carrier, and therefore, at least one or more reception chains are required.

When the reception UE is located outside the coverage of a cell, the reception UE requires a total of two reception chains, namely a reception chain for the direct communication (High Priority), and a reception chain for the direct communication (Low Priority).

Secondly, a case in which a plurality of priorities are associated with one carrier will be described. This is a case in which one or more resource pools for direct communication are provided in one carrier. The number of carriers in which a resource pool for direct communication has been provided is assumed to be N.

In the case of the condition: "Cellular communication (DL)>Direct communication", the reception UE requires a reception chain for cellular communication (DL), and a reception chain for each carrier in which a resource pool for direct communication has been provided. That is, the reception UE requires "1+N" number of reception chains.

In the case of the condition: "Cellular communication (DL)=Direct communication", the reception UE requires at least a reception chain for each carrier in which a resource pool for direct communication has been provided. That is, the reception UE requires N or more number of reception chains.

Further, the UE 100-2 may perform monitoring on the basis of the priority associated with the carrier, and the number of reception chains. For example, when the number of reception chains is one, the UE 100-2 monitors a carrier with a high priority. Further, if a carrier A and a carrier B have the same priority, and the priority of a carrier C is lower than that of the carrier A and the carrier B, the UE 100-2 may monitor either one of the carrier A or the carrier B, and may not monitor the carrier C.

Tenth Embodiment

Next, a tenth embodiment will be described. The description of contents that are similar to at least any one of the above-described each embodiments will be omitted.

(Operation Environment)

Figure 51:
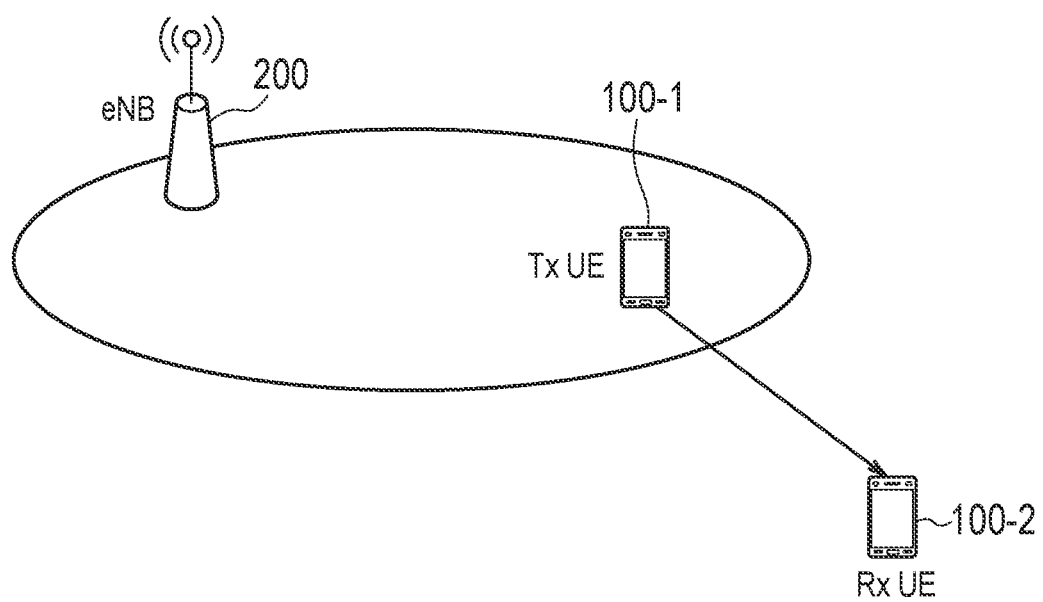
FIG. 51 is a diagram for describing an operation environment according to a tenth embodiment.

An operation environment according to the tenth embodiment will be described by using FIG. 42 and FIG. 51. FIG. 51 is a diagram for describing the operation environment according to the tenth embodiment.

As shown in FIG. 51, the UE 100-1 is located in a cell managed by the eNB 200, and is capable of performing cellular communication (LTE-Uu) with the eNB 200. The UE 100-1 is in an RRC connected state. Alternatively, the UE 100-1 is in an RRC idle state. When performing communication with the eNB 200, the UE 100-1 may shift to the RRC connected state from the RRC idle state.

The UE 100-2 is located outside the cell managed by the eNB 200. The UE 100-2 may be a remote UE. The UE 100-1 may be a relay UE that serves the remote UE.

The UE 100-1 and the UE 100-2 are in a state of performing direct communication, or in a state prior to starting to perform direct communication. The UE 100-1 and the UE 100-2 are capable of performing direct communication by using the resource pool shown in FIG. 42.

(Operation According to Tenth Embodiment)

Figure 52:
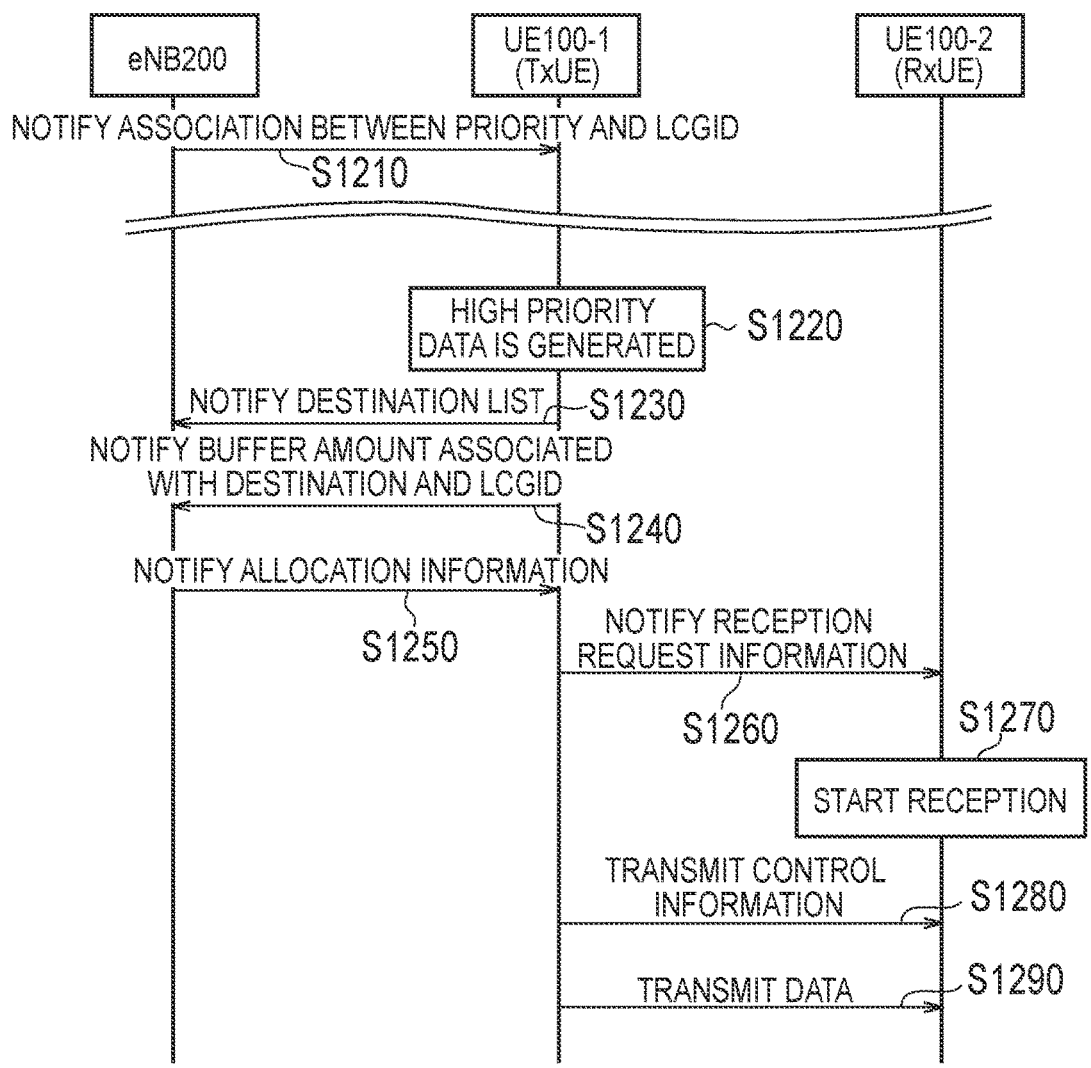
FIG. 52 is a sequence diagram for describing an operation according to the tenth embodiment.
Figure 53:
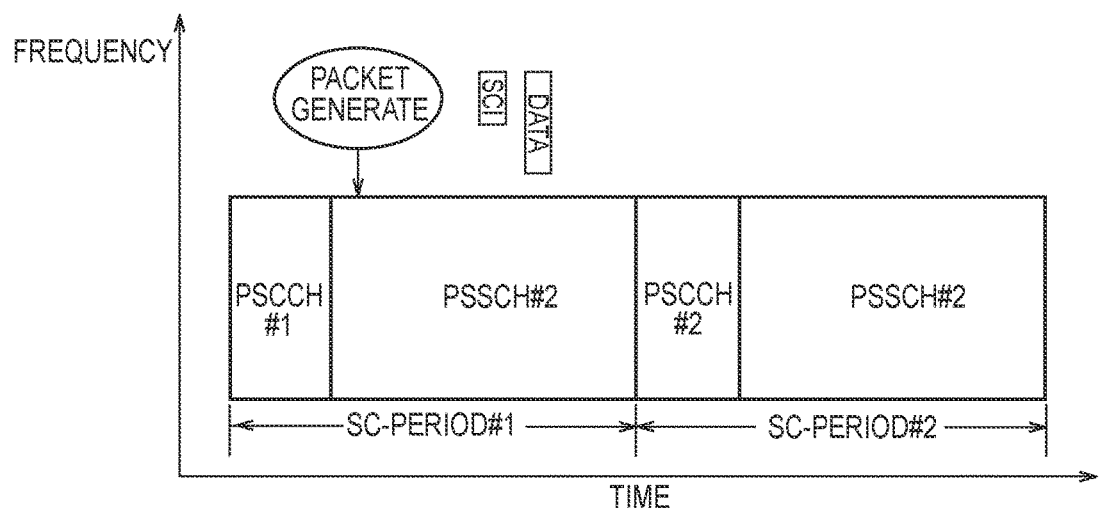
FIG. 53 is a diagram for describing the operation according to the tenth embodiment.

An operation according to the tenth embodiment will be described by using FIG. 52 and FIG. 53. FIG. 52 is a sequence diagram for describing the operation according to the embodiment. FIG. 53 is a diagram for describing the operation according to the embodiment.

As shown in FIG. 52, in step S1210, the eNB 200 notifies, to the UE 100-1, information concerning the priority of identification information of a logical channel (for example, the identifier of a logical channel group (LCG ID)). The eNB 200 may notify, to the UE 100-1, a priority list indicating the association between the priority and the LCG ID. For example, in the list, a priority 0 (for example, Low priority) and an LCG ID #1 are associated, and a priority 1 (for example, High priority) and an LCG ID #2 are associated with each other. It is noted that the identification information concerning a logical channel may be an identifier of the logical channel (LCID). Therefore, an LCID and a priority may be associated with each other.

Further, the eNB 200 may notify, to the UE 100-1, an LCG ID (or LCID) having a higher priority than a normal LCG ID (or LCID), as information concerning the priority. For example, in a priority list, an LCG ID (or LCID) having a low priority may not be described and an LCG ID (or LCID) having a high priority may be described. Therefore, the UE 100-1 may determine that an LCG ID (or LCID) that is not described in the priority list has a normal priority.

The eNB 200 may notify, to the UE 100-1, information concerning the priority (hereinafter, the priority list) by broadcast (for example, an SIB), or may be notify the same to the UE 100-1 by unicast (for example, an RRC Reconfiguration message).

The UE 100-1 understands the association between the priority and the LCG ID on the basis of the received priority list.

The eNB 200 transmits, to the UE 100-1, setting information for setting a control resource pool before the UE 100-1 and the UE 100-2 perform direct communication. As a result, the eNB 200 performs the setting of a control resource pool in the UE 100-1. The control resource pool is set in the UE 100-1 on the basis of the setting information. The UE 100-1 performs direct communication with the UE 100-2 by using the set control resource pool. Specifically, in direct communication, the UE 100-1 autonomously selects a control resource from the set control resource pool. Alternatively, the UE 100-1 may be allocated, by the eNB 200, with a control resource from the set control resource pool.

Further, the eNB 200 transmits, to the UE 100-1, setting information for setting a data resource pool. As a result, the eNB 200 performs the setting of a data resource pool in the UE 100-1. The data resource pool is set in the UE 100-1 on the basis of the setting information. The UE 100-1 performs direct communication with the UE 100-2 by using the set data resource pool. In the present embodiment, the UE 100-1 autonomously selects a data resource from the set control resource pool in direct communication. Since a data resource pool has been set for the UE 100-1, a data resource is not allocated by the eNB 200 as long as data with a high priority is not generated, as described later.

On the other hand, since the UE 100-2 is located outside the coverage of the cell, the UE 100-2 performs direct communication with the UE 100-1 by using the previously set control and data resource pools. When located within a cell of the eNB 200, and if a control and a data resource pool are not set beforehand in the UE 100-2 (for example, a USIM (Universal Subscriber Identity Module)), the UE 100-2 may receive the setting information of a control and a data resource pool to set the control and data resource pools beforehand on the basis of the setting information. In direct communication, the UE 100-2 autonomously selects the radio resources (control resource and data resource) from the previously set control and data resource pools.

In step S1220, data having a high priority (hereinafter, called the high priority data) is generated in the UE 100-1. When data is generated on a logical channel belonging to an LCG that has a high priority (or a corresponding bearer), the UE 100-1 may recognize that high-priority data has been generated. When high priority data is generated, the UE 100-1 generates a buffer status report (SL-BSR: Sidelink Buffer Status Report) in a proximity service. The contents of the SL-BSR will be described later (see step S1240).

It is noted that high priority data need not be data having a high priority. High priority data could be data (middle priority) having a higher priority than data (for example, low priority) that the UE 100-1 transmits by using a control resource of a control resource pool.

In step S1230, the UE 100-1 transmits a destination list to the eNB 200. The destination list includes a destination identifier (Destination ID) indicating a partner of direct communication. For example, the UE 100-1 is capable of transmitting the destination list by an SLUEInformation message.

It is noted that the UE 100-1 may transmit the destination list to the eNB 200 before the high priority data is generated. For example, if there is any change in the destination list, the UE 100-1 may transmit the destination list to the eNB 200 before the high priority data is generated. Further, the UE 100-1 may omit step S1230 if the eNB 200 is aware of the partner of direct communication.

In step S1240, the UE 100-1 notifies, to the eNB 200, the buffer status report (SL-BSR) in the proximity service as information indicating that high priority data has been generated. The SL-BSR is a buffer status report for direct communication. The SL-BSR includes information indicating the buffer amount of the high priority data. The UE 100-1 transmits the SL-BSR to the eNB 200 in consideration of the priority.

For example, when the high priority data is generated, the UE 100-1 may transmit the SL-BSR to the eNB 200 as a top priority. The UE 100-1 may preferentially transmit the SL-BSR concerning the high priority data as compared to a buffer status report in cellular communication (Cellular BSR (Buffer Status Report)). Therefore, the UE 100-1 may preferentially transmit, to the eNB 200, the SL-BSR including the buffer amount (data amount) of the high priority data as compared to the SL-BSR including the buffer amount (data amount) of normal data that is transmitted through direct communication, not the BSR for cellular communication and the high priority data. Further, if the high priority data is the data for public safety, the UE 100-1 may transmit the data to the eNB 200 as a top priority.

The UE 100-1 includes the index of the destination identifier, an LCG ID, and a buffer amount associated with the LCG ID in the SL-BSR. Here, the UE 100-1 decides the LCG ID to be included in the SL-BSR on the basis of the priority list received from the eNB 200. Specifically, the UE 100-1 decides an LCG ID having a priority corresponding to the priority of the high priority data as the LCG ID to be included in the SL-BSR. Further, the UE 100-1 includes the data amount of the high priority data as the buffer amount corresponding to the decided LCG ID in the SL-BSR.

For example, the UE 100-1 decides the LCG ID #2 associated with priority 2, not the LCG ID #1 associated with priority 1, as the LCG ID to be included in the SL-BSR.

On the other hand, the eNB 200 receives the SL-BSR from the UE 100-1. The eNB 200 allocates the radio resource for the high priority data on the basis of the determination list and the SL-BSR. Specifically, the eNB 200 allocates a radio resource such that the UE 100-1 transmits the high priority data to the destination (UE 100-2) corresponding to the index of the destination identifier included in the SL-BSR from among the destinations included in the destination list.

The eNB 200 determines whether or not the SL-BSR received from the UE 100-1 is information indicating the generation of the high priority data, on the basis of the LCG ID included in the SL-BSR. Specifically, the eNB 200 determines whether or not the SL-BSR includes an LCG ID having a priority corresponding to the priority of the high priority data. When an LCG ID (LCG ID #2) having a high priority is included, the eNB 200 determines that the SL-BSR is information indicating the generation of high priority data (that is, high priority data is generated in the UE 100-1). On the other hand, when an LCG ID (LCG ID #1) having a low priority is included, the eNB 200 determines that the SL-BSR is not information indicating the generation of high priority data (that is, high priority data is not generated in the UE 100-1).

It is noted that when receiving the SL-BSR from the UE 100-1 regardless of the fact that the UE 100-1 autonomously selects a radio resource for the SCI and the data, the eNB 200 may determine that the SL-BSR is information indicating the generation of high priority data.

Upon receiving information (SL-BSR) indicating the generation of high priority data from the UE 100-1, the eNB 200 allocates a radio resource for the high priority data. Specifically, the eNB 200 allocates, to the UE 100-1, a radio resource that is located temporally before the control resource pool arranged after the generation of the high priority data, as the radio resource for the high priority data. For example, the eNB 200 allocates, to the UE 100-1, a radio resource that is located outside the data resource pool set in the UE 100-1, and that is located temporally before the control resource that is selectable by the UE 100-1 after the generation of the high priority data, as the radio resource for the high priority data. As shown in FIG. 53, in the present embodiment, the eNB 200 allocates a control resource for the SCI and a data resource for the data as radio resources for the high priority data.

The eNB 200 allocates, to the UE 100-1, a radio resource having a frequency different from the radio resource pools (the control resource pool and the data resource pool) for direct communication in a frequency direction. The eNB 200 may allocate a radio resource for cellular communication to the UE 100. The eNB 200 is capable of allocating, to the UE 100, a radio resource that does not cause interference in cellular communication (a radio resource that is not allocated to a cellular UE from among the radio resources for cellular communication), on the basis of scheduling of the radio resource for cellular communication. It is noted that in order to avoid causing interference in the direct communication performed by another UE, the eNB 200 allocates, to the UE 100-1, a radio resource that is not located in the data resource pool.

Further, the eNB 200 allocates, to the UE 100-1, a radio resource that is located before the radio resource that is selectable by the UE 100-1 after the generation of the high priority data (a data resource from the PSSCH #2 in FIG.

53), in a time direction. Specifically, the eNB 200 allocates, to the UE 100-1, a radio resource of an SC period #1 (a period of a PSSCH #1) that is before an SC period #2. As a result, the UE 100-1 is capable of transmitting, to the UE 100-2, the high priority data before the SC period #2 by using a radio resource allocated from the eNB 200.

Further, when allocating, to the UE 100-1, a radio resource that is not located in the data resource pool, the eNB 200 may allocate a radio resource with a similar arrangement to a radio resource for the sidelink. Specifically, the eNB 200 may allocate a control resource for the PSCCH, which constitutes two resource blocks (RBs) in the time direction. Further, the eNB 200 may allocate the data resource for the PSSCH so that the data is repeatedly transmitted four times in the time direction.

In this way, when high priority data is generated regardless of the fact that the UE 100-1 autonomously selects a data resource from the data resource pool, the UE 100-1 transmits, to the eNB 200, information (SL-BSR) indicating that high priority data has been generated.

In step S1250, the eNB 200 notifies, to the UE 100-2, allocation information of a radio resource that is allocated for the high priority data. The UE 100-1 receives the allocation information of the radio resource. In this way, a radio resource for the high priority data is allocated to the UE 100-1.

The eNB 200 is capable of notifying, to the UE 100-1, the allocation information of the radio resource, on the basis of DCI. The eNB 200 may notify, to the UE 100-1, the allocation information of the radio resource along with flag information (for example, an urgency flag) indicating a radio resource allocated for the high priority data, through DCI (DCI format 0) for assigning the uplink control information. The UE 100-1 is capable of understanding that the received allocation information of the radio resource is the allocation information of the radio resource for transmitting the high priority data, on the basis of the flag information.

In step S1260, the UE 100-1 notifies, to the UE 100-2, reception request information that acts as a trigger for the operation for receiving the high priority data (reception operation). After receiving the allocation information from the eNB 200, the UE 100-1 is capable of notifying the reception request information to the UE 100-2. For example, the UE 100-1 notifies the reception request information to the UE 100-2 after a predetermined time from the time of reception of the allocation information. The predetermined time may be notified from the eNB 200 to the UE 100-1 as timing offset information (Timing offset), along with the allocation information of the radio resource. The predetermined time may be a timing (fixed timing) that is previously defined. For example, if the eNB 200 understands the timing when the UE 100-1 is capable of notifying the reception request information to the UE 100-2, the eNB 200 may notify the allocation information at a time that is before the predetermined time (for example four subframes) from the timing. The eNB 200 may notify, to the UE 100-1, a plurality of radio resources for notifying the reception request information after receiving the allocation information of the radio resource. The UE 100-1 is capable of notifying the reception request information to the UE 100-2 by using at least any one of the plurality of radio resources. It is noted that the UE 100-1 may notify the reception request information to the UE 100-2 before receiving the allocation information of the radio resource.

As described below, the UE 100-2, for example, is capable of notifying the reception request information to the UE 100-2 on the basis of at least any one of the physical sidelink broadcast channel (PSBCH) that carries the information concerning the system and synchronization, a synchronization signal in the proximity service, and a discovery signal in the proximity service.

The UE 100-1, for example, may include flag information indicating the reception request information in the PBSCH. For example, the UE 100-2 performs the reception operation on the basis of the flag information (1 bit) included in the PBSCH. When, for example, the flag information indicates "0", the UE 100-2 performs the reception operation by assuming the flag information as the reception request information. On the other hand, when the flag information indicates "1", the UE 100-2 does not perform the reception operation.

The UE 100-2 may include, in the synchronization signal, identification information (SLSS ID) for an emergency that is separated from identification information (SLSS ID) included in a normal synchronization signal. For example, the identification information (336-511) for an emergency is provided in addition to the identification information (0-335) of a normal synchronization signal. The UE 100-1 transmits a synchronization signal including the identification information for an emergency. Upon receiving the synchronization signal including the identification information for an emergency, the UE 100-2 performs the reception operation.

From among two offsets concerning the transmission time of the synchronization signal, the UE 100-1 may transmit the synchronization signal by using an offset that is different from the offset used in a cell based on an instruction from the eNB 200. The UE 100-2 performs the reception operation upon receiving the synchronization signal for which an offset different from the offset used in the synchronization signal received until then has been used. Alternatively, the UE 100-2 performs the reception operation upon receiving the synchronization signal for which an offset different from the offset indicated by the eNB 200 has been used.

If the UE 100-1 is capable of transmitting a discovery signal within the SC period during which the high priority data is generated, the UE 100-1 may transmit a discovery signal including the reception request information. For example, if the cycle of the transmission period of the discovery signal is shorter than the SC period (cycle), the UE 100-1 is capable of transmitting a discovery signal. Further, if the transmission period of a discovery signal overlaps the period of a data resource in a time direction, the UE 100-1 is capable of transmitting a discovery signal. For example, if the conditions "(Discovery offset)=(Communication offset)+(Communication Period/2)" and "(Discovery Period)=(Communication Period)" are satisfied, the UE 100-1 is capable of transmitting a discovery signal. It is noted that the Discovery offset indicates the offset value from the reference value of the transmission period of the discovery signal. Communication offset indicates the offset value from the reference value of the SC period. Communication Period indicates the SC period.

In step S1270, the UE 100-2 starts the reception operation for receiving the high priority data in response to the reception of the reception request information. The UE 100-2 performs the reception operation (monitoring) by assuming the entire predetermined frequency band (carrier) as the PSCCH region. The predetermined frequency band may be a previously set fixed value. Alternatively, information indicating the predetermined frequency band may be included in the reception request information. If located within a cell of the eNB 200, the UE 100-2 may receive, from the eNB 200, the information indicating the predetermined frequency band either by broadcast (for example, an SIB) or unicast (for example, an RRC Reconfiguration message).

The UE 100-2 may perform the reception operation from the time of receiving the reception request information until the predetermined time elapses. The UE 100-2 may perform the reception operation from the time of receiving the reception request information until the time of receiving, from the UE 100-1, stop information requesting to stop the reception operation. Alternatively, the UE 100-2 may perform the reception operation until the reception of the specified number of information (packets). The UE 100-2 may perform the reception operation until the reception of the SCI and/or data from the UE 100-1. The UE 100-2 may receive, from the eNB 200, information concerning the reception operation (such as information about which reception operation to perform) either by broadcast (for example, an SIB) or unicast (for example, an RRC Reconfiguration message). Alternatively, information concerning the reception operation may be included in the reception request information. Alternatively, the UE 100-2 may perform the reception operation on the basis of the previously set information (fixed).

In step S1280, the UE 100-1 transmits the SCI for notifying the data resource for transmitting the high-priority data on the basis of the allocation information of the radio resource from the eNB 200. It is noted that in the present embodiment, the allocation information of the radio resource from the eNB 200 includes not only the data resource for transmitting the high priority data, but also the control resource for transmitting the SCI.

The UE 100-2 understands the data resource used in the transmission of the high priority data on the basis of the received SCI. The UE 100-2 terminates the reception operation upon receiving the SCI and/or data.

In step S1290, the UE 100-1 transmits the high priority data on the basis of the allocation information of the radio resource from the eNB 200. The UE 100-2 receives the high priority data on the basis of the data resource included in the SCI.

Here, when transmitting normal data having a lower priority than the high priority data, the UE 100-1 preferentially transmits the high priority data as compared to the normal data. The UE 100-1 may interrupt the transmission of the normal data at a place where it is good to stop, and may start the transmission of the high priority data. For example, when the re-transmission (four-time repeated transmission) of a packet corresponding to the normal data is not completed, the UE 100-1 may start the transmission of the high priority packet after the re-transmission of the packet is completed.

Alternatively, the UE 100-1 may immediately interrupt the transmission of the normal data, and may start the transmission of the high priority data. For example, the UE 100-1 may start the transmission of the high priority data even when the re-transmission of a packet of the normal data is not completed. In this case, the UE 100-1 may notify, to the UE 100-2, the fact that the transmission of the normal data has been interrupted. As a result, the UE 100-2 retains the normal data that has been received till halfway, without discarding the data. When the UE 100-2 does not receive, from the UE 100-1, the notification of the fact that the UE 100-1 has interrupted the transmission of the normal data, the UE 100-2 may discard the normal data that has been received till halfway. When the re-transmission is not completed, the UE 100-1 may start the re-transmission after the transmission of the high priority data is completed. When the UE 100-1 does not notify, to the UE 100-2, the fact that the transmission of the normal data has been interrupted, the UE 100-1 may transmit the packet for which the re-transmission is not completed as a new packet.

The UE 100-1 may notify, to the UE 100-2, the timing (Resume Timing) and/or the period (Resume Period) of resuming the interrupted transmission of the normal data. The Resume Timing is information for specifying a PSCCH time resource when the transmission of the normal data is resumed within the SC period during which the transmission of the normal data is interrupted. The Resume Period is information for specifying a period when the transmission of the normal data is resumed after the SC period during which the transmission of the normal data is interrupted. The UE 100-2 resumes the reception of the normal data on the basis of the Resume Timing and/or the Resume Period.

It is noted that the UE 100-1 may determine whether or not to complete the re-transmission of the packet of the normal data before transmitting the high priority data, on the basis of an instruction from the eNB 200. For example, the eNB 200 may include interrupt flag information (Interrupt flag) in the DCI that includes the allocation information of the radio resource. When the interrupt flag information indicates "True", the UE 100-1 transmits the high priority data even when the re-transmission of the packet is not completed. On the other hand, when the interrupt flag information indicates "False", the UE 100-1 transmits the high priority data after the re-transmission of the packet is completed. It is noted that the information about the Resume Timing and/or the Resume Period may be included in the DCI.

It is noted that when multi-cluster transmission is permitted within one carrier, the UE 100-1 may transmit the high priority data while transmitting an untransmitted packet by using a data resource of the data resource pool.

As described above, when high priority data is generated, the UE 100-1 is capable of transmitting the high priority data within the SC period during which the high priority data is generated. As a result, it is possible for the UE 100-1 to appropriately transmit data through direct communication. Further, since the eNB 200 allocates a radio resource that is not located in the radio resource pool for direct communication, it is possible to suppress the interference in cellular communication and direct communication.

Other Embodiments

A case in which the UE 100-1 is a relay UE and the UE 100-2 to UE 100-4 are remote UEs is described above; however, this is not limiting. The contents of the above-described each embodiment may be applied to a case in which a UE 100-1 that is not a relay UE transmits data to each of a plurality of UEs 100 (for example, see FIG. 7).

In the "(A2) Second method" in the above-described first embodiment, the index may be specified according to the notification timing of the SL grant (DCI), as described in the above-described third embodiment. In this way, it is possible to implement each operation in the above-described first through third embodiments by combining, as appropriate.

In the above description, an embodiment in which an assignment of a plurality of SCIs is selected in a way that there is no conflict in the time direction, is described. A case in which a plurality of SCIs are transmitted by a continuous radio resource in a frequency direction (PRB: Physical Resource Block) will be described below.

When a plurality of SCIs are transmitted by a continuous PRB in the frequency direction, it is necessary for the reception UE to know how many SCI are transmitted by the continuous PRB. It is noted that in the current situation, the reception UE performs the reception process under the prerequisite that assignment is performed by one PRB.

A first method includes a method of assuming a plurality of patterns at the reception UE side, and then performing the reception process for the assumed number of patterns. By performing the reception process for the assumed number of patterns, the reception UE is capable of receiving a plurality of SCIs that are continuous in the frequency direction.

Figure 54:
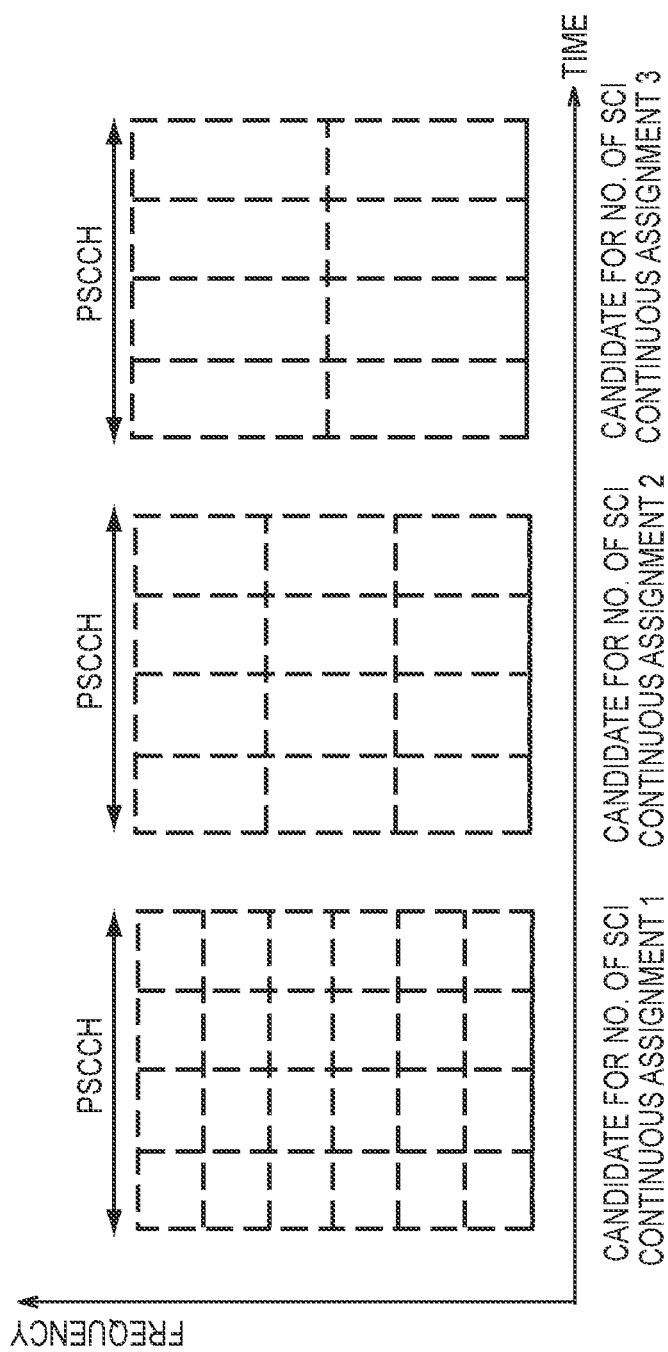
FIG. 54 is a diagram for describing an operation according to other embodiments.

Since the processed amount may be huge depending on the number of patterns, it is preferable to reduce the number of patterns as much as possible. The methods of reducing the number of patterns include restricting the number of assignments of an SCI on a continuous PRB in the frequency direction, and/or restricting the assignment region. For example, the number of continuous assignments of the SCI is restricted to 1, 2, 3, and the assignment region is restricted as shown in FIG. 54. As shown in FIG. 54, the larger the number of continuous assignments of the SCI, the smaller the assignment region becomes.

A second method includes a method of linking the number of PRBs assigned continuously in the frequency direction (hereinafter, called the number of continuous PRBs) with the resource pool for transmitting the SCI so as to fix the number of continuous PRBs. In order to satisfy the fixed number (the number of continuous PRBs) that is linked with the resource pool, the transmission UE transmits a plurality of SCIs by using the PRBs that continue in the frequency direction. The reception UE performs the reception processing by assuming that the plurality of SCIs corresponding to the fixed number (the number of continuous PRBs) that is linked with the resource pool will be transmitted by using the PRBs that continue in the frequency direction.

Here, if the fixed number linked with the resource pool, and the number of SCI to be transmitted are different, the transmission UE may have to include unnecessary information in order to match the number of SCI to be transmitted and the fixed number.

Figure 55:
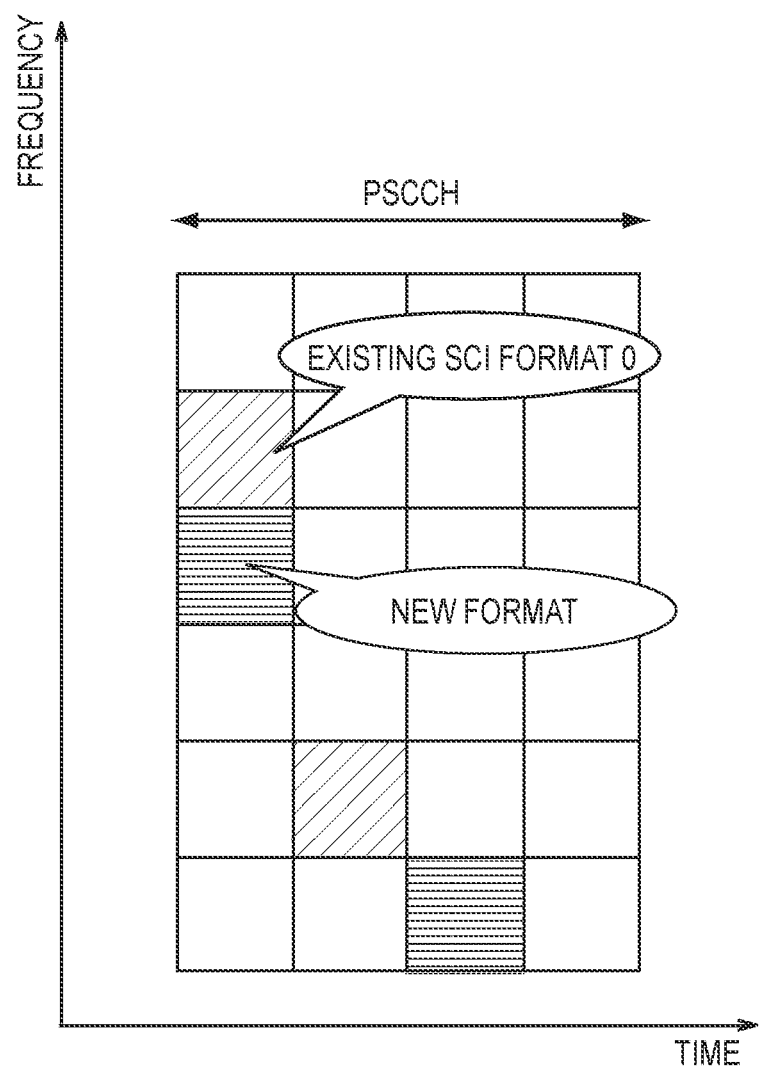
FIG. 55 is a diagram for describing an operation according to other embodiments.

In such a case, a method in which the transmission UE transmits new SCI for which another SC-Period has been specified is assumed. As shown in FIG. 55, by specifying another SC-Period or another resource pool, efficient resource usage is made possible.

FIG. 56 shows an SCI transmission format in which another SC-Period is specified. "periodIndicatorField" is a parameter that specifies the SC-Period. The SCI is the difference with respect to the SC-Period that has been transmitted.

FIG. 57 shows a new resource pool configuration parameter. numMulpleSCIs is the number of SCIs transmitted by the continuous PRBs in the frequency direction.

The third method includes a method of performing transmission by using an OFDM signal. Since the restrictions of Single Carrier transmission are no longer valid, it becomes possible to perform transmission by PRBs that are continuous and non-continuous in the frequency direction.

The fourth method includes a method of performing multi-cluster transmission. The restrictions of Single Carrier transmission are no longer valid, and thus it becomes possible to perform transmission by PRBs that are continuous and non-continuous in the frequency direction. It is noted that multi-cluster transmission is a method of assuming the assignment of PRBs that are continuous in the frequency direction as one cluster, and then transmitting multiple such clusters at the same timing.

Any of the above-described first through fourth methods may be combined and implemented.

Figure 58:
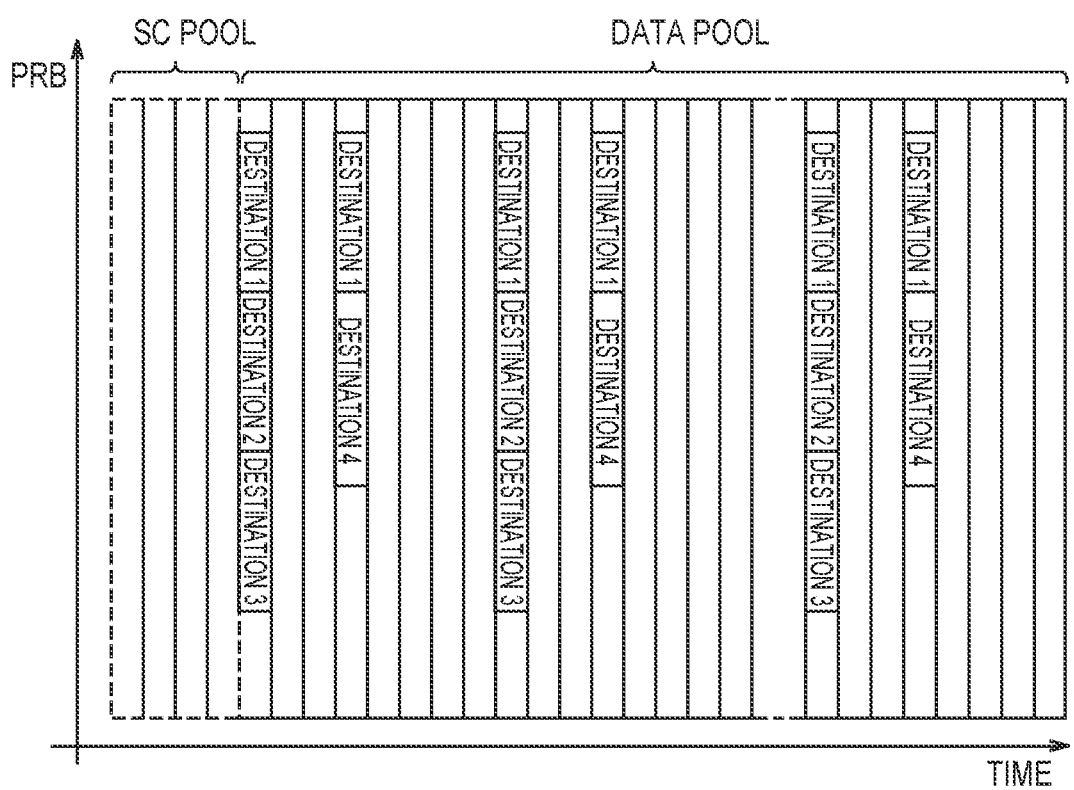
FIG. 58 is a diagram for describing an operation according to other embodiments.
Figure 59:
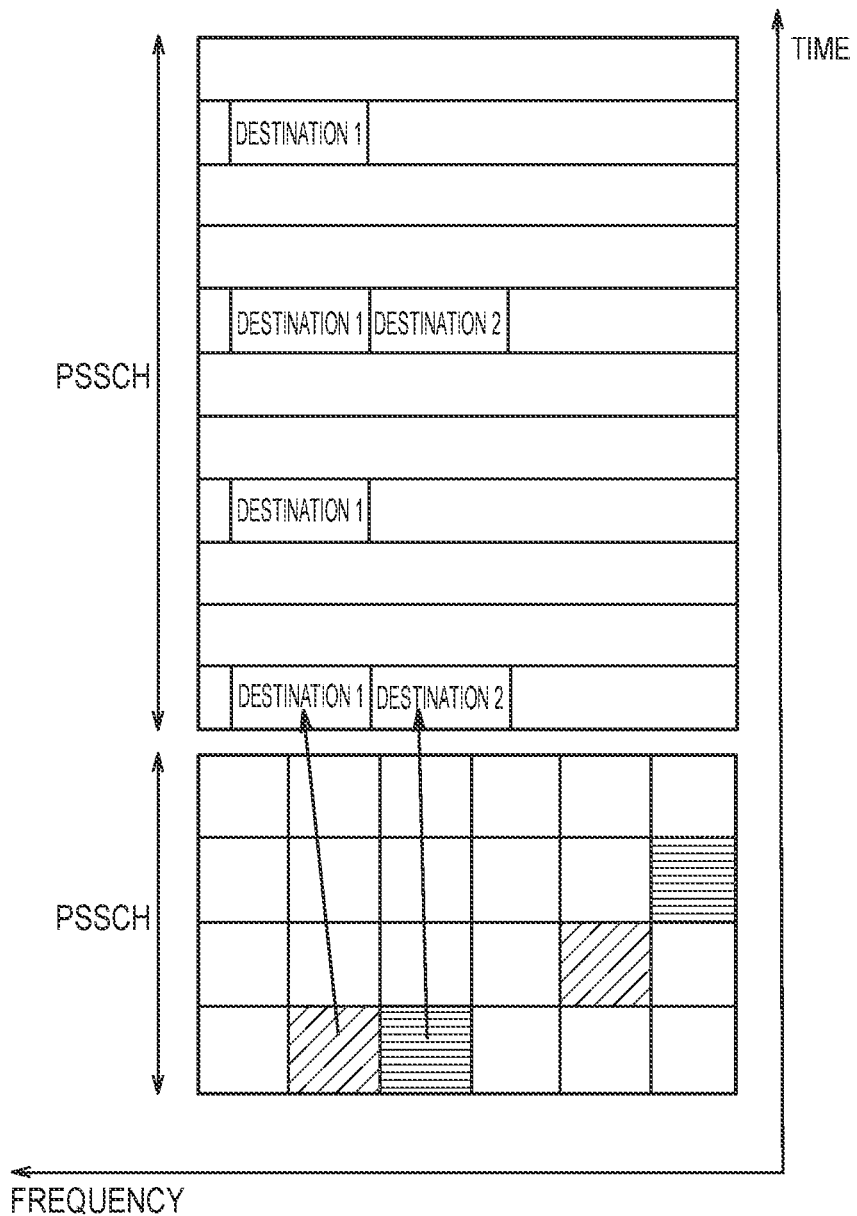
FIG. 59 is a diagram for describing an operation according to other embodiments.

If it is possible to transmit a plurality of SCIs by a PRB that is continuous in a frequency direction, then as shown in FIG. 58, the transmission UE is capable of selecting a plurality of radio resources for data transmission so that the plurality of resources for transmitting data to each of a plurality of destinations (Destinations 1 to 4) are arranged in a continuous manner in the frequency direction. As shown in FIG. 59, when data is transmitted by a PRB that is continuous in the frequency direction, the data to be transmitted is selected from the plurality of SCIs transmitted by the PRB that is continuous in the frequency direction. The reception UE acquires information about the data region assigned to the PRB that is continuous in the frequency direction from the plurality of received SCIs, and then performs the reception process. From the data for which the reception process is performed, the reception UE discards the data other than that addressed to the Destination ID of the reception UE.

In the above-described first and second modifications of the seventh embodiment, a case in which the UE 100-1 notifies beforehand, to a candidate terminal, the destination identifier of the candidate terminal is described; however, this is not limiting. For example, if the UE 100-3 recognizes that the UE 100-3 is a candidate terminal, the UE 100-3 may receive a packet on the basis of the allocation information included in the SCI even when the destination identifier of the UE 100-3 is not included in the SCI. It is noted that when, for example, the UE 100-3 is a UE for public safety, the UE 100-3 recognizes itself as a candidate terminal. Further, when the UE 100-3 is an important UE (that is recognizable at the application level), the UE 100-3 may recognize itself as a candidate terminal in at least either of the case when a packet is not received from the UE 100-1 for a predetermined period, and the case when a packet is received from the UE 100-1 within a predetermined time. The UE 100-3 may maintain a timer for measuring the predetermined time from the last time a packet was received.

In the above description, high priority data is generated in the UE 100-1; however, this is not limiting. If high priority data is generated at the network side, the operation described above may be implemented. For example, the operation described above may be implemented in a case where high priority data that must be transmitted to the UE 100-2, which is the remote UE, is generated at the network side.

In the ninth embodiment described above, a case where a priority relation exists between cellular communication and direct communication is described; however, this is not limiting. For example, even in a case where a priority relation exists between cellular communication, direct communication, and direct discovery, the UE 100 and the eNB 200 may perform a similar operation as that described above.

For example, the UE 100-2 may perform monitoring on the basis of the priority (and the number of reception chains of the UE 100-2) associated with the carrier, when the priority is associated with not only a carrier to which a resource pool for direct discovery is set (a carrier for direct discovery), but also a carrier to which a resource pool for direct discovery is set (a carrier for direct communication).

Further, the eNB 200 may decide the third priority information (an association between a carrier and a priority) in consideration of the carrier for direct discovery. For example, in the case of the condition: "Cellular communication (DL)>Direct communication>Direct discovery", the eNB 200 may add a priority to each carrier, decide the third priority information, and decide a carrier to be set in the UE 100, so that the priority of the carrier for the direct discovery does not exceed the priority of the carrier for direct communication.

It is noted that even when any one of the following conditions is defined, for example, the UE 100 and the eNB 200 may perform an operation similar to the operation described above, in consideration of the priority of the carrier (and/or the resource pool).

"Direct communication=Direct discovery"

"Direct communication (High Priority)>Direct communication (Low Priority)>Direct discovery"

"Direct communication (High Priority)>Direct communication (Low Priority)=Direct discovery"

"Direct communication>Direct discovery (High Priority)>Direct discovery (Low Priority)"

"Direct communication=Direct discovery (High Priority)>Direct discovery (Low Priority)"

"Direct communication (High Priority)>Direct communication (Low Priority)>Direct discovery (High Priority)>Direct discovery (Low Priority)"

"Direct communication (High Priority)>Direct communication (Low Priority)=Direct discovery (High Priority)>Direct discovery (Low Priority)"

"Direct communication (High Priority)>Direct discovery (High Priority)>Direct communication (Low Priority)>Direct discovery (Low Priority)"

In the above description, a case in which the UE 100-1 is located within the coverage of a cell, and the UE 100-2 is located outside the coverage of the cell (the so-called partial coverage) is assumed; however, this is not limiting. The above-described operation may also be implemented in a case in which both the UE 100-1 and the UE 100-2 are located within the coverage of the cell.

In the above description, in order to transmit data having a normal priority, the UE 100-1 autonomously selects a control resource and a data resource by using the set resource pool; however the eNB 200 may allocate a control resource and a data resource to the UE 100-1 from a resource pool for direct communication. When high priority data is generated, the eNB 200 is capable of allocating, to the UE 100-1, for example, a radio resource located temporally before the next control resource pool, and located outside the resource pool for direct communication. It is noted that even when the eNB 200 allocates a control resource (and a data resource), there is a possibility of occurrence of a delay in the high priority data when the control resource pools are arranged at an interval in the time direction. Therefore, it is effective that the eNB 200 allocates, to the UE 100-1, a radio resource that is located temporally before the control resource pool arranged after the generation of the high priority data.

Further, the eNB 200 may allocate, to the UE 100, a radio resource located within the data resource pool for direct communication and located temporally before the next control resource pool, as the radio resource for control information and for data communication. For example, when the number of UEs that perform direct communication by using the data resource pool is less, the probability of occurrence of interference is low, and therefore, the eNB 200 may allocate, to the UE 100, a radio resource located within the data resource pool for direct communication as the radio resource for the high priority data.

In the above description, high priority data is generated in the UE 100-1; however, this is not limiting. If high priority data is generated at the network side, the operation described above may be implemented. For example, the operation described above may be implemented in a case where high priority data that must be transmitted to the UE 100-2, which is the remote UE, is generated at the network side. In this case, the eNB 200 transmits the allocation information of a radio resource for the high priority data, to the UE 100-1, without receiving information indicating the generation of high priority data from the UE 100-1.

In the above description, the UE 100-1 transmits an SL-BSR to the eNB 200 as information indicating the generation of high priority data; however, this is not limiting. The UE 100-1 may transmit, to the eNB 200, a request for allocation of a radio resource for the high priority data (for example, an SLUEInformation message). The eNB 200 may transmit, to the UE 100-1, the allocation information of a radio resource in response to the reception of the request for allocation of the radio resource.

In the above description, the UE 100-1 transmits SCI for notifying the location of the data resource used in the transmission of the high priority data; however, this is not limiting. The UE 100-1 may transmit the high priority data without transmitting SCI. The UE 100-1 may include information corresponding to the SCI for the high priority data in the reception request information. Alternatively, if located within a cell of the eNB 200, the UE 100-1 may receive the information corresponding to the SCI for the high priority data either by broadcast (for example, an SIB) or unicast (for example, an RRC Reconfiguration message). Upon receiving the reception request information, the UE 100-2 is capable of performing the operation for receiving the high priority data on the basis of the information corresponding to the SCI. Further, the UE 100-2 may perform the reception operation on the basis of the previously set information (fixed). Alternatively, after receiving the reception request information, the UE 100-2 may monitor all radio resources (including radio resources that are not located in the data resource pool) by which the high priority data can be transmitted. The UE 100-2 may perform monitoring from the time of receiving the reception request information until the predetermined time elapses. The UE 100-2 may perform monitoring from the time of receiving the reception request information until the time of receiving, from the UE 100-1, stop information requesting to stop the reception operation. Alternatively, the UE 100-2 may perform monitoring until the reception of the specified number of information (packets).

In each of the above-described embodiments, as one example of a mobile communication system, the LTE system is described. However, the present disclosure is not limited to the LTE system, and the present disclosure may be applied to systems other than the LTE system.

[Additional Remarks]

In this additional remarks, we discuss enhancements to ProSe Direct Communication for UE-to-Network Relay.

(1) Latency Requirement of the UE-to-Network Relay

One of the use cases of the UE-to-Network Relay is group communication service. The group communication service enabler (GCSE) has performance requirements presented below. The UE-to-Network Relay Operation should be required to satisfy these GCSE latency requirements.

The time from when a UE requests to join an ongoing Group Communication to the time that it receives the Group Communication should be less than or equal to 300 ms.

The end to end delay for media transport for Group Communications should be less than or equal to 150 ms.

The GCSE system shall support multiple distinct Group Communications in parallel; basically, one UE must be capable of supporting simultaneously more than one distinct Group Communication sessions. All groups should satisfy the GCSE latency requirements.

Observation 1: UE-to-Network Relay latency should satisfy GCSE latency requirements.

(2) Latency Issue on UE-to-Network Relay

End-to-end delay of the GCSE when using UE-to-Network Relay is analyzed. The following table is end-to-end delay for media transport when using unicast bearers for media delivery (Table 1). Period 1 and 5 are estimation results of D2D links latency. The UE-to-Network links latency is assumed minimum one-way transmission.

TABLE 1

| Period | Descriptions | Minimum latency | Detailed assumption |
| --- | --- | --- | --- |
| 1 | Transmitting Group Member UE → UE-to-Network Relay | 6~46 ms | sidelink transmission: Mode2 SC-Period: 40 ms # of PSCCH subframes: 2 |
| 2 | UE-to-Network Relay → eNB | 10 ms | |
| 3 | eNB → SGW/PGW → GCSE AS → eNB | 20 ms | |
| 4 | eNB → UE-to-Network Relay | 10 ms | |
| 5 | UE-to-Network Relay → Receiving Group Member UE | 10~50 ms | sidelink transmission: Mode1 SC-Period: 40 ms # of PSCCH subframes: 2 |
| — | Total time | 56~136 ms | |

The current Rel-12 specification is restricted to a single SCI transmission within a SC-Period. In Mode 1, the received sidelink grant (i.e. DCI format 5) to be configured sidelink grant occurring in the subframes starting at the beginning of the first available SC-Period which starts at least 4 subframes after the subframe in which the sidelink grant was received, overwriting a previously configured sidelink grant occurring in the same SC-Period. In Mode 2, the sidelink grant is selected from the resource pool configured by upper layers.

Figure 60:
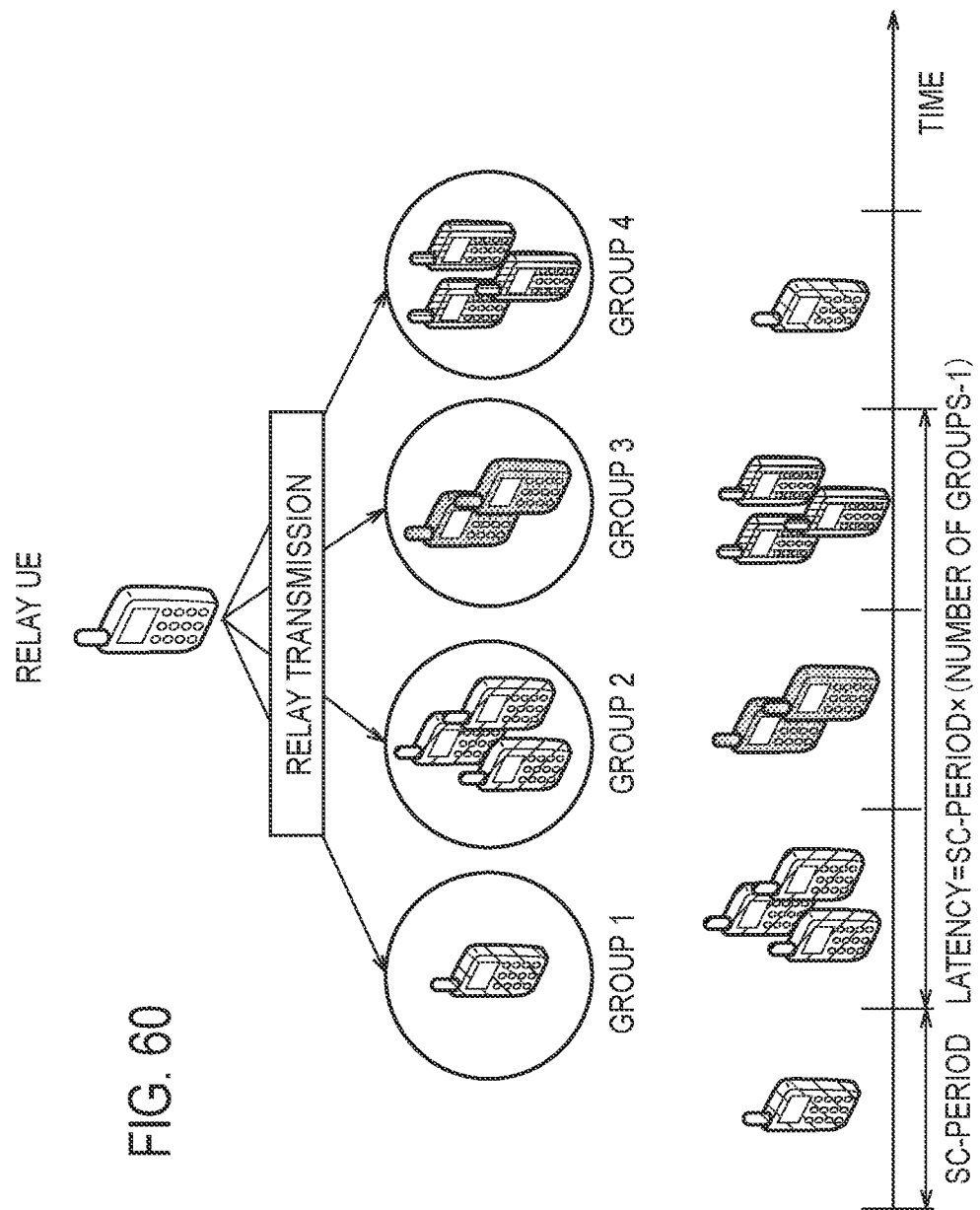
FIG. 60 is a diagram for describing a latency problem of a UE-to-Network relay.

If Relay UE has traffic to relay to multiple groups, data transmission is delayed for SC-Period×(number of groups−1) (see FIG. 1) (See FIG. 60). As a result, if more four of groups are under the control of Relay UE, some groups cannot satisfy the GCSE latency requirements (56 ms×3=168 ms>150 ms).

Proposal 1: Rel-13 should support multiple SCIs transmission within a SC-Period.

(3) Enhancements to D2D communication for UE-to-Network Relay

The following three options are available for the multiple SCIs that can be considered.

Figure 61:
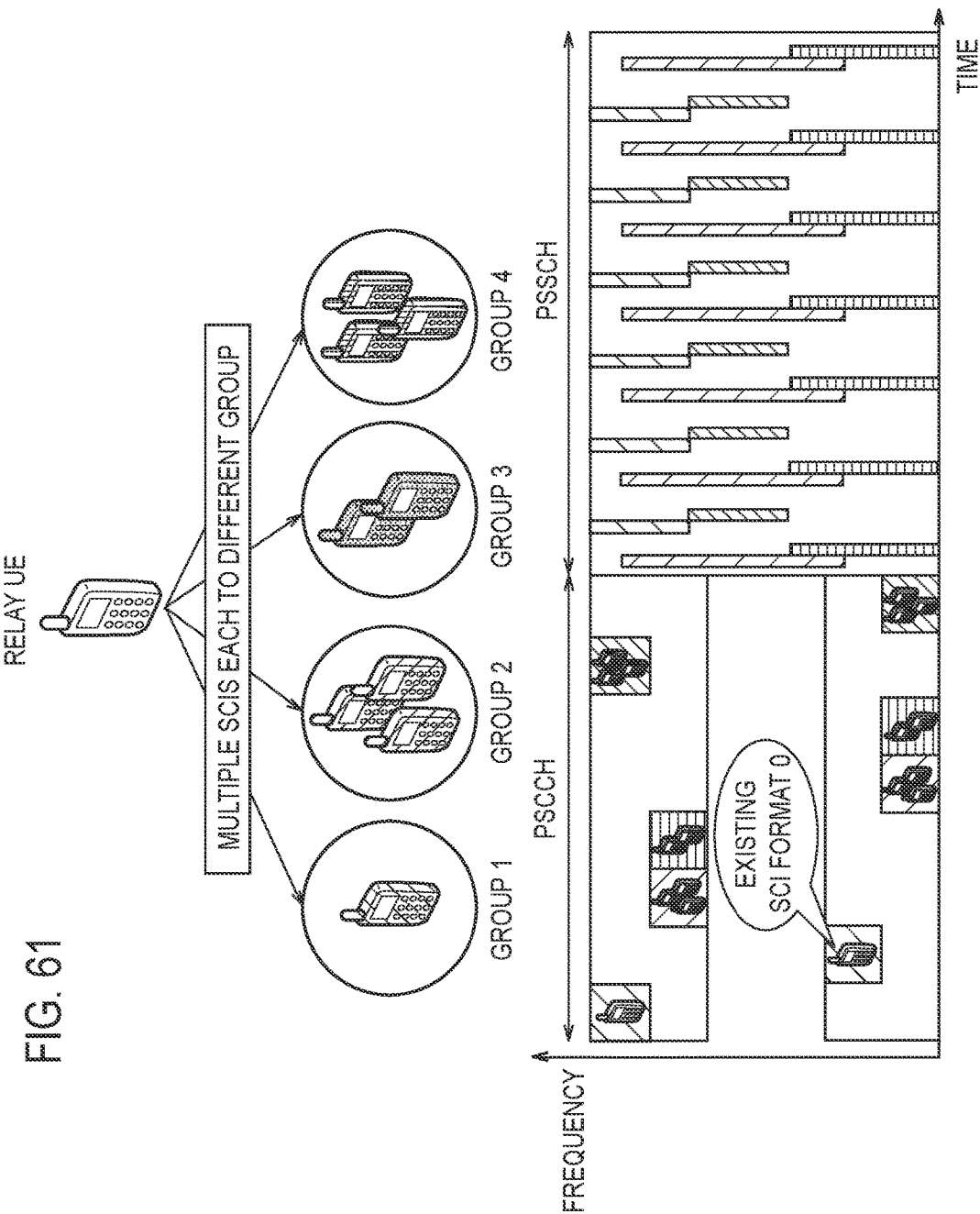
FIG. 61 is a diagram for describing an example of an Option 1.

Option 1: multiple SCIs each to different destination group within a SC-Period (FIG. 61)

Figure 62:
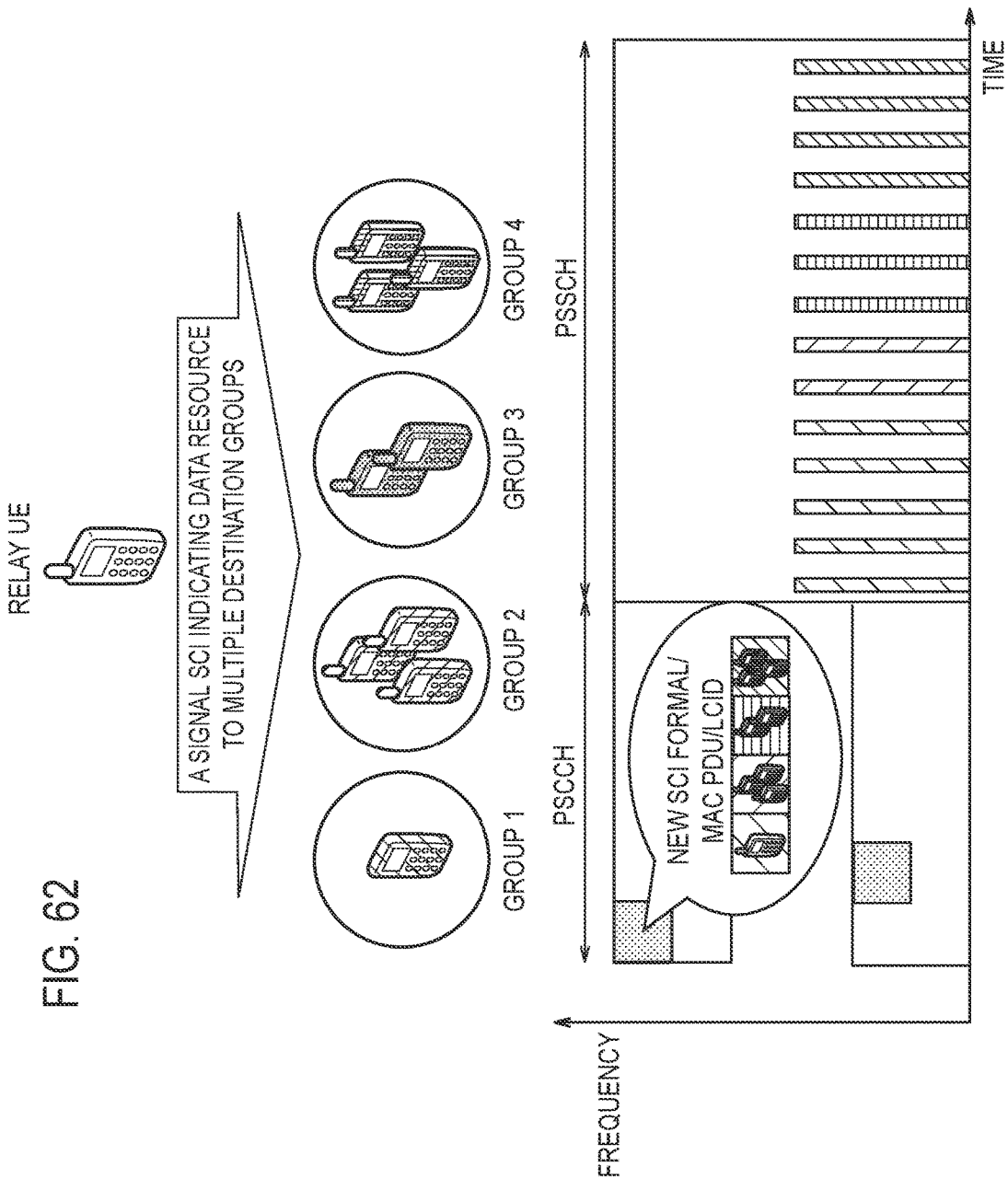
FIG. 62 is a diagram for describing an example of an Option 2.

Option 2: a single SCI indicating data resource to multiple destination groups within a SC-Period (FIG. 62)

Figure 63:
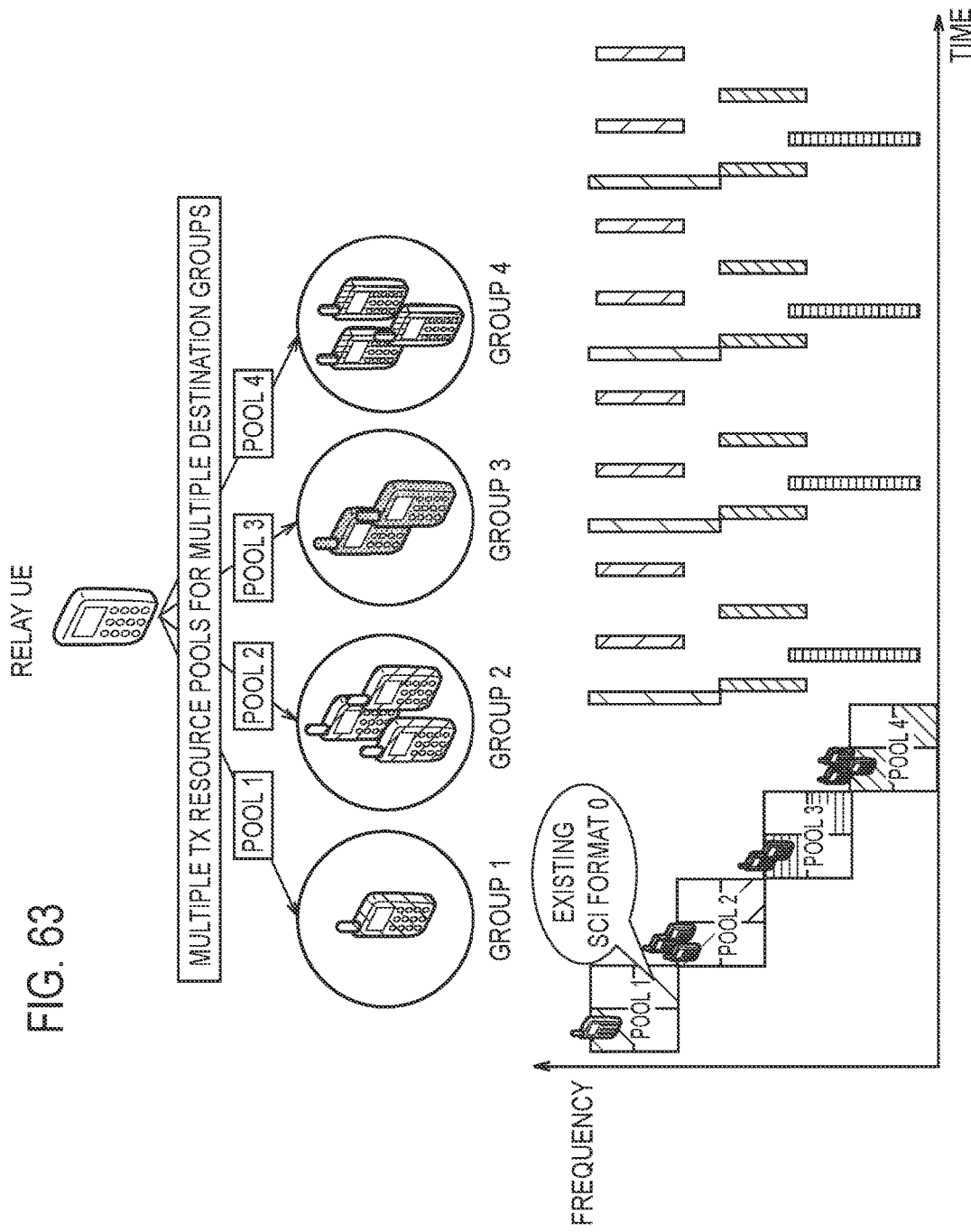
FIG. 63 is a diagram for describing an example of an Option 3.

Option 3: multiple TX resource pools for multiple destination groups (FIG. 63)

We consider both Mode 1 and Mode 2 w.r.t. these options.

(3.1) Consideration on Mode 1

(3.1.1) Option 1

The eNB indicates a single SCI TX resource in DCI format 5. If the Option 1 is applied then it will need enhancements to indicate multiple PSCCH and PSSCH resources.

No impact for the Rel-12 D2D UE since the Option 1 can use the same SCI format 0 in current specification.

(3.1.2) Option 2

The eNB indicates a single SCI TX resource in DCI format 5. If the Option 2 is applied then it will need enhancements to indicate multiple PSCCH and PSSCH resources. The SCI format 0 indicates a single L1-Destination ID. If the Option 2 is applied then it will need enhancements to indicate multiple L1-Destination IDs.

If MAC PDU/LCID indicates multiple destinations, it has restrictions that multiplexed groups can be only the same L1-Destination ID due to filter L1-Destination ID in current specification.

No backward compatibility for the Rel-12 D2D UE since the Option 2 needs new SCI format/MAC PDU/LCID.

(3.1.3) Option 3

The eNB indicates a single SCI TX resource in DCI format 5. If the Option 3 is applied then it will need enhancements to indicate multiple PSCCH and PSSCH resources in each TX resource pools.

If the UE adds new destinations, the eNB should configure new TX resource pools.

The receiver UEs power consumption increases since it will require the UEs to monitor multiple TX resource pools.

The Option 3 has the possibility of increase in delay compared to both the Option 1 and the Option 2.

No impact for the Rel-12 D2D UE since the Option 3 can use the same SCI format 0 in the current specification.

(3.2) Consideration on Mode 2

(3.2.1) Option 1

The UE randomly selects a SCI TX resource from the resource pool configured by upper layers. The random function shall be such that each of the allowed selections can be chosen with equal probability. If the Option 1 is applied then it will need to restrict resource selection in order to avoid resource collision in time domain.

If TX resource pools are shared with multiple Relay UEs, it has the possibility of resource collision increase when using the Option 1.

No impact for the Rel-12 D2D UE since the Option 1 can use the same SCI format 0 in current specification.

(3.2.2) Option 2 SCI format 0 indicates a single L1-Destination ID. If the Option 2 is applied then it will need enhancements to indicate multiple L1-Destination IDs.

If MAC PDU/LCID indicates multiple destinations, it has restrictions that multiplexed groups can be only the same L1-Destination ID due to filter L1-Destination ID in current specification.

No backward compatibility for the Rel-12 D2D UE since the Option 2 needs new SCI format/MAC PDU/LCID.

(3.2.3) Option 3

If the UE adds new destinations, the eNB should configure new TX resource pools.

The receiver UEs power consumption increases since it will require the UEs to monitor multiple TX resource pools.

The Option 3 has the possibility of increase in delay compared to both the Option 1 and the Option 2.

No impact for the Rel-12 D2D UE since the Option 3 can use the same SCI format 0 in the current specification.

TABLE 2

| | | Mode 1 | Mode 2 |
|---|---|---|---|
| Option 1 | pros | No impact for Rel-12 D2D UE | No impact for Rel-12 D2D UE |
| | cons | Need enhancements to indicate multiple PSCCH/PSSCH resources | Need enhancements to restrict resource selection Increase resource collision between Relay UEs |
| Option 2 | pros | — | — |
| | cons | Need enhancements to indicate multiple PSCCH/PSSCH resources Need enhancements to indicate multiple destinations No backward compatibility for Rel-12 D2D UE | Need enhancements to indicate multiple destinations No backward compatibility for Rel-12 D2D UE |
| Option 3 | pros | No impact for Rel-12 D2D UE | No impact for Rel-12 D2D UE |
| | cons | Need enhancements to indicate multiple PSCCH/PSSCH resources in each TX resource pools Difficult for addition new destinations The receiver UEs power consumption increases Increase in delay compared to both Option 1 and Option 2 | Difficult for addition new destinations The receiver UEs power consumption increases Increase in delay compared to both Option 1 and Option 2 |

The above table is the summary of the consideration result (Table 2).

As an above discussion, we think the Option 1 is preferable to both the Option 2 and the Option 3 in terms of standardization impacts and backward compatibility.

Proposal 2: Rel-13 should support multiple SCIs each to different destination within a SC-Period.

The invention claimed is:

1. A communication method, comprising:
   transmitting an RRC (Radio resource Control) message to a radio terminal by a base station, the RRC message including a list indicating association between an identification of a logical channel group and a priority;
   generating, by the radio terminal, a buffer status report for direct communication to be performed between the radio terminal and another radio terminal without passing through the base station; and
   transmitting the buffer status report to the base station by the radio terminal, wherein
   the buffer status report includes an index of a destination identifier, an identifier of the logical channel group, and a buffer amount associated with the identifier of the logical channel group, the destination identifier being associated with the another radio terminal, and
   in the generating the buffer status report, the radio terminal generates the buffer status report based on the list.

2. The communication method according to claim 1, wherein
   in the generating the buffer status report, the radio terminal periodically includes a buffer amount associated with a logical channel group having a higher priority than a buffer amount associated with a logical channel group having a lower priority, into the buffer status report on a basis of the list.

3. The communication method according to claim 1, comprising
   transmitting, from the base station to the radio terminal, information for determining whether or not to allow the radio terminal to transmit plurality of control information for the direct communication in one sidelink control period configured by a control region in which control information for the direct communication is arranged and a data region in which data for the direct communication is arranged.

4. A radio terminal, comprising:
   a receiver configured to receive, from a base station, an RRC (Radio resource Control) message including a list indicating association between an identification of a logical channel group and a priority;
   a controller configured to generate a buffer status report for direct communication to be performed between the radio terminal and another radio terminal without passing through the base station; and
   a transmitter configured to transmit the buffer status report to the base station, wherein
   the buffer status report includes an index of a destination identifier, an identifier of the logical channel group, and a buffer amount associated with the identifier of the logical channel group,
   the destination identifier is associated with the another radio terminal, and
   the controller is configured to generate the buffer status report based on the list.

5. A processor for controlling a radio terminal, comprising:
   a memory communicatively coupled to the processor and including instructions, such that when executed by the processor execute the processes of:
   receiving, from a base station, an RRC (Radio resource Control) message including a list indicating association between an identification of a logical channel group and a priority;
   generating a buffer status report for direct communication to be performed between the radio terminal and another radio terminal without passing through the base station; and
   transmitting the buffer status report to the base station, wherein
   the buffer status report includes an index of a destination identifier, an identifier of the logical channel group, and a buffer amount associated with the identifier of the logical channel group,
   the destination identifier is associated with the another radio terminal, and
   the processor is configured to execute the process of generating the buffer status report based on the list.

6. A base station, comprising:
   a transmitter configured to transmit, to a radio terminal, an RRC (Radio resource Control) message including a list indicating association between an identification of a logical channel group and a priority; and
   a receiver configured to receive, from the radio terminal, a buffer status report for direct communication to be performed between the radio terminal and another radio terminal without passing through the base station, the buffer status report generated based on the list, wherein the buffer status report includes an index of a destination identifier, an identifier of the logical channel group, and a buffer amount associated with the identifier of the logical channel group, and the destination identifier is associated with the another radio terminal.

* * * * *